(12) United States Patent
Jia et al.

(10) Patent No.: US 11,343,010 B2
(45) Date of Patent: May 24, 2022

(54) POLARIZATION-DEPENDENT LOSS DETERMINING METHOD, DETECTION SYSTEM, AND OPTICAL SIGNAL TRANSMISSION STRUCTURE

(71) Applicant: Huawei Technologies Co., Ltd., Shenzhen (CN)

(72) Inventors: Wei Jia, Shenzhen (CN); Liangjia Zong, Dongguan (CN); Bing Zou, Shenzhen (CN); Lei Mao, Dongguan (CN); Chao Pan, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/357,468

(22) Filed: Jun. 24, 2021

(65) Prior Publication Data
US 2021/0320742 A1    Oct. 14, 2021

Related U.S. Application Data

(63) Continuation of application No. PCT/CN2019/127548, filed on Dec. 23, 2019.

(30) Foreign Application Priority Data

Dec. 26, 2018 (CN) .................. 201811602752.X

(51) Int. Cl.
*H04B 10/00* (2013.01)
*H04J 14/02* (2006.01)
(Continued)

(52) U.S. Cl.
CPC .... *H04J 14/0221* (2013.01); *H04B 10/07955* (2013.01); *H04B 10/2569* (2013.01); *H04B 10/6162* (2013.01)

(58) Field of Classification Search
CPC ........ H04J 14/0221; H04J 14/06; H04J 14/02; H04B 10/07955; H04B 10/2569;
(Continued)

(56) References Cited

U.S. PATENT DOCUMENTS 6,104,477 A    8/2000  Yoshida et al.
6,760,149 B2 * 7/2004  Roberts ............... H04B 10/077
                                                       359/337
(Continued)

FOREIGN PATENT DOCUMENTS

CN    1459037 A    11/2003
CN    2896248 Y     5/2007
(Continued)

OTHER PUBLICATIONS

Wang H., et al., "High precision automatic test systems for polarization-dependent loss", The 41st Research Institute of CETC, Qing dao 266555, China, Journal of Applied Optics, 2006, 27( 1), 6 pages.
(Continued)

*Primary Examiner* — Hanh Phan
(74) *Attorney, Agent, or Firm* — Conley Rose, P.C.

(57) ABSTRACT

A polarization-dependent loss (PDL) determining method includes obtaining two groups of optical powers within first duration, selecting at least one group of target optical powers that satisfy a same power constraint from the two groups of optical powers, where each group of target optical powers includes a first target power and a second target power from the two groups of optical powers, and determining a PDL of the optical device based on the at least one group of target optical powers.

21 Claims, 18 Drawing Sheets

---

Obtain two groups of optical powers within first duration, where an optical power satisfying a same power constraint exists in each of the two groups of optical powers within the first duration — 101

Select at least one group of target optical powers that satisfy the same power constraint from the two groups of optical powers, where each group of target optical powers includes a first target power and a second target power from the two groups of optical powers — 102

Determine a polarization-dependent loss PDL of the optical device based on the at least one group of target optical powers — 103

(51) Int. Cl.
*H04B 10/079* (2013.01)
*H04B 10/2569* (2013.01)
*H04B 10/61* (2013.01)

(58) Field of Classification Search
CPC .......... H04B 10/6162; H04B 10/07953; H04B 10/2507; H04B 10/0779; H04B 10/0793
USPC .. 398/79, 158, 159, 152, 65, 33, 34, 38, 25, 398/26, 27, 147, 81, 160, 83, 48; 356/73.1, 364
See application file for complete search history.

(56) References Cited

U.S. PATENT DOCUMENTS

| | | | |
|---|---|---|---|
| 8,059,958 | B1 | 11/2011 | Jiang et al. |
| 8,705,167 | B2 * | 4/2014 | Akasaka ............... H01S 3/1308 359/341.4 |
| 2003/0111998 | A1 | 6/2003 | Koh et al. |
| 2003/0160951 | A1 | 8/2003 | Babin et al. |
| 2004/0196449 | A1 | 10/2004 | Paduch |
| 2009/0141274 | A1 | 6/2009 | Szafraniec et al. |
| 2009/0213453 | A1 | 8/2009 | Yao |
| 2015/0125143 | A1 | 5/2015 | Vassilieva et al. |
| 2016/0241341 | A1 | 8/2016 | Endo et al. |
| 2018/0123700 | A1 | 5/2018 | Li et al. |

FOREIGN PATENT DOCUMENTS

| | | |
|---|---|---|
| CN | 102201864 A | 9/2011 |
| CN | 202339264 U | 7/2012 |
| CN | 103954435 A | 7/2014 |
| CN | 204269345 U | 4/2015 |
| CN | 105915288 A | 8/2016 |
| CN | 108023643 A | 5/2018 |
| CN | 108613795 A | 10/2018 |

OTHER PUBLICATIONS

Huihui, L. et al, "An Accurate and Robust PDL Monitor by Digital Signal Processing in Coherent Receiver," 2018 Optical Fiber Communications Conference and Exposition (OFC), Jun. 14, 2018, 3 pages.

Panfeng et al.,"Measurement of Polarization Dependent Loss by Two SOPs",College of Information Science and Engineering, vol. 36, No. 12, Dec. 2007, 3 pages.

Yan, L.-S., et al., "Demonstration of In-line Monitoring and Compensation of Polarization-Dependent Loss for Multiple Channels," IEEE Photonics Technology Letters, vol. 14, No. 6, Jun. 2002, 3 pages.

Wang, T., et al., "Effect of the Polarization Dependent Loss on the Orthogonality of Channels in Polarization Division Multiplexing System", Chinese Journal of Lasers,vol. 36 No. 4, Apr. 2009, 5 pages.

Zigang et al.,"Study of Theory and Technology of Glass Uptical Waveguide Power Splitter and its Properties", Soochow University, Apr. 2005, 113 pages.

* cited by examiner

POLARIZATION-DEPENDENT LOSS DETERMINING METHOD, DETECTION SYSTEM, AND OPTICAL SIGNAL TRANSMISSION STRUCTURE

CROSS-REFERENCE TO RELATED APPLICATIONS

This is a continuation of International Patent Application No. PCT/CN2019/127548 filed on Dec. 23, 2019, which claims priority to Chinese Patent Application No. 201811602752. X filed on Dec. 26, 2018. The disclosures of the aforementioned applications are hereby incorporated by reference in their entireties.

TECHNICAL FIELD

This application relates to the field of optical communication technologies, and in particular, to a polarization-dependent loss (PDL) determining method, a detection system, and an optical signal transmission structure.

BACKGROUND

With development of science and technology, optical fiber communication has become a main transmission mode in the field of optical communication technologies. A transmission link (or an optical signal transmission link) for optical fiber communication is configured with a large quantity of optical devices, for example, an erbium-doped fiber amplifier (EDFA) and a wavelength selective switch (WSS). Because an optical device has a PDL, an optical signal is easily distorted when passing through the optical device, thereby affecting transmission performance of optical fiber communication.

A related technology provides an optical signal PDL detection apparatus. The detection apparatus may implement an optical signal PDL detection method. During transmission of an optical signal, the optical signal passes through the detection apparatus. The PDL detection apparatus includes an optical signal splitter, a polarization splitter, an optoelectronic detector, and a digital signal processor that are sequentially disposed. After the optical signal passes through the detection apparatus, the detection apparatus may detect a PDL to which the optical signal is subject.

However, the optical signal PDL detection apparatus in the related technology can detect only the PDL of the optical signal, but can hardly detect a PDL of an optical device through which the optical signal passes. Therefore, a method that can accurately detect a PDL of an optical device is urgently required.

SUMMARY

Embodiments of this application provide a PDL determining method, a detection system, and an optical signal transmission structure, to determine a PDL of an optical device.

According to a first aspect, an example embodiment of this application provides a PDL determining method. The method is applied to a detection system including an optical device, and the method includes obtaining two groups of optical powers within first duration, where an optical power satisfying a same power constraint exists in each of the two groups of optical powers within the first duration, the two groups of optical powers are optical-path output powers of two polarization principal axes of the optical device, or the two groups of optical powers are an input power for inputting a first optical signal to the optical device and an output power for outputting the first optical signal from the optical device, the first optical signal is a signal with any wavelength in an optical signal input to the optical device, and the first optical signal is any polarization signal in a polarization multiplexing signal, or the first optical signal is a single-polarization signal, selecting at least one group of target optical powers that satisfy the same power constraint from the two groups of optical powers, where each group of target optical powers includes a first target power and a second target power respectively from the two groups of optical powers, and determining a PDL of the optical device based on the at least one group of target optical powers.

In the PDL determining method provided in this embodiment of this application, the at least one group of target optical powers that satisfy the same power constraint can be selected from the obtained two groups of optical powers, and the PDL of the optical device can be determined based on the at least one group of target optical powers. Therefore, the PDL of the optical device can be accurately determined.

Optionally, if the two groups of optical powers are the optical-path output powers of the two polarization principal axes of the optical device, obtaining two groups of optical powers within first duration includes splitting the optical signal input to the optical device into a first polarization signal and a second polarization signal, where polarization directions of the first polarization signal and the second polarization signal are perpendicular, converting the first polarization signal to obtain a third polarization signal, where polarization directions of the third polarization signal and the second polarization signal are the same, and detecting, within the first duration, a first output power of a signal with a specified energy proportion in the third polarization signal, and detecting a second output power of a signal with the specified energy proportion in the second polarization signal, where the two groups of optical powers are the first output power and the second output power.

In an implementation, the optical device includes a switching engine and a power detection port, the second polarization signal forms at least one light spot on the switching engine, the third polarization signal forms at least one light spot on the switching engine, and the light spots formed on the switching engine by the second polarization signal and the third polarization signal coincide, and detecting a first output power of a signal with a specified energy proportion in the third polarization signal, and detecting a second output power of a signal with the specified energy proportion in the second polarization signal includes for a target region in which each light spot is located, loading, by using the switching engine, phase information to both a second polarization signal and a third polarization signal that correspond to a first region, so that the third polarization signal corresponding to the first region is transmitted to the power detection port, and the second polarization signal corresponding to the first region is transmitted in a direction away from the power detection port, and detecting, by using the power detection port, a first output power of the received third polarization signal, and for the target region in which each light spot is located, loading, by using the switching engine, phase information to both a second polarization signal and a third polarization signal that correspond to a second region, so that the second polarization signal corresponding to the second region is transmitted to the power detection port, and the third polarization signal corresponding to the second region is transmitted in a direction away from the power detection port, and detecting, by using the power detection port, a second output power of the received second polarization signal, where both the first region and the second region are located in the target region, the first region and the second region correspond to same light spot energy, and a ratio of light spot energy corresponding to each of the first region and the second region to light spot energy corresponding to the target region is the specified energy proportion.

Further, for a target region in which each light spot is located, loading, by using the switching engine, phase information to both a second polarization signal and a third polarization signal that correspond to a first region, so that the third polarization signal corresponding to the first region is transmitted to the power detection port, and the second polarization signal corresponding to the first region is transmitted in a direction away from the power detection port, and detecting, by using the power detection port, a first output power of the received third polarization signal includes, for the target region in which each light spot is located, loading, by using the switching engine, first phase information and third phase information to both the second polarization signal and the third polarization signal that correspond to the first region, so that the third polarization signal corresponding to the first region is transmitted to the power detection port, and the second polarization signal corresponding to the first region is transmitted in the direction away from the power detection port, and detecting, by using the power detection port, the first output power of the received third polarization signal, and for the target region in which each light spot is located, loading, by using the switching engine, phase information to both a second polarization signal and a third polarization signal that correspond to a second region, so that the second polarization signal corresponding to the second region is transmitted to the power detection port, and the third polarization signal corresponding to the second region is transmitted in a direction away from the power detection port, and detecting, by using the power detection port, a second output power of the received second polarization signal includes, for the target region in which each light spot is located, loading, by using the switching engine, second phase information and fourth phase information to both the second polarization signal and the third polarization signal that correspond to the second region, so that the second polarization signal corresponding to the second region is transmitted to the power detection port, and the third polarization signal corresponding to the second region is transmitted in the direction away from the power detection port, and detecting, by using the power detection port, the second output power of the received second polarization signal, where a first direction in which the first phase information is loaded and a third direction in which the third phase information is loaded are both perpendicular to a propagation direction of the optical signal input to the optical device, a second direction in which the second phase information is loaded and a fourth direction in which the fourth phase information is loaded are both perpendicular to the propagation direction of the optical signal input to the optical device, the first direction is perpendicular to the third direction, the second direction is perpendicular to the fourth direction, the first direction and the second direction are dispersion directions, and the dispersion direction is an arrangement direction of at least one light spot formed on the switching engine by optical signals with different wavelengths in a polarization signal.

Further, there are two power detection ports in total, and the two power detection ports include a first power detection port and a second power detection port.

In this case, for a target region in which each light spot is located, loading, by using the switching engine, phase information to both a second polarization signal and a third polarization signal that correspond to a first region, so that the third polarization signal corresponding to the first region is transmitted to the power detection port, and the second polarization signal corresponding to the first region is transmitted in a direction away from the power detection port, and detecting, by using the power detection port, a first output power of the received third polarization signal includes, for the target region in which each light spot is located, loading, by using the switching engine, first phase information and third phase information to both the second polarization signal and the third polarization signal that correspond to the first region, so that the third polarization signal corresponding to the first region is transmitted to the first power detection port, and the second polarization signal corresponding to the first region is transmitted in a direction away from the first power detection port, and detecting, by using the first power detection port, the first output power of the received third polarization signal, and for the target region in which each light spot is located, loading, by using the switching engine, phase information to both a second polarization signal and a third polarization signal that correspond to a second region, so that the second polarization signal corresponding to the second region is transmitted to the power detection port, and the third polarization signal corresponding to the second region is transmitted in a direction away from the power detection port, and detecting, by using the power detection port, a second output power of the received second polarization signal includes, for the target region in which each light spot is located, loading, by using the switching engine, second phase information and fourth phase information to both the second polarization signal and the third polarization signal that correspond to the second region, so that the second polarization signal corresponding to the second region is transmitted to the second power detection port, and the third polarization signal corresponding to the second region is transmitted in a direction away from the second power detection port, and detecting, by using the second power detection port, the second output power of the received second polarization signal.

Optionally, the optical device includes a polarization processing apparatus, there are two power detection ports in total, and the two power detection ports include a first power detection port and a second power detection port, for a target region in which each light spot is located, loading, by using the switching engine, phase information to both a second polarization signal and a third polarization signal that correspond to a first region, so that the third polarization signal corresponding to the first region is transmitted to the power detection port, and the second polarization signal corresponding to the first region is transmitted in a direction away from the power detection port, and detecting, by using the power detection port, a first output power of the received third polarization signal includes, for the target region in which each light spot is located, loading, by using the switching engine, third phase information to the second polarization signal and the third polarization signal that correspond to the first region, so that the third polarization signal and the second polarization signal that correspond to the first region are transmitted in a direction toward the first power detection port, and the second polarization signal corresponding to the first region is transmitted in a direction away from the first power detection port by using the polarization processing apparatus, and detecting, by using the first power detection port, the first output power of the received third polarization signal, and for the target region in which each light spot is located, loading, by using the switching engine, phase information to both a second polarization signal and a third polarization signal that correspond to a second region, so that the second polarization signal corresponding to the second region is transmitted to the power detection port, and the third polarization signal corresponding to the second region is transmitted in a direction away from the power detection port, and detecting, by using the power detection port, a second output power of the received second polarization signal includes, for the target region in which each light spot is located, loading, by using the switching engine, fourth phase information to the second polarization signal and the third polarization signal that correspond to the second region, so that the third polarization signal and the second polarization signal that correspond to the second region are transmitted in a direction toward the second power detection port, and the third polarization signal corresponding to the second region is transmitted in a direction away from the second power detection port by using the polarization processing apparatus, and detecting, by using the second power detection port, the second output power of the received second polarization signal, where a third direction in which the third phase information is loaded is perpendicular to a propagation direction of the optical signal input to the optical device, a fourth direction in which the fourth phase information is loaded is perpendicular to the propagation direction of the optical signal input to the optical device, the third direction and the fourth direction are switching directions, the switching direction is perpendicular to the dispersion direction, and the dispersion direction is an arrangement direction of at least one light spot formed on the switching engine by optical signals with different wavelengths in a polarization signal.

In another implementation, the optical device includes a switching engine and a power detection port, the second polarization signal forms at least one first light spot on the switching engine, the third polarization signal forms at least one second light spot on the switching engine, the at least one first light spot and the at least one second light spot formed on the switching engine by the second polarization signal and the third polarization signal do not coincide, and dispersion directions of the at least one first light spot and the at least one second light spot are the same, and detecting a first output power of a signal with a specified energy proportion in the third polarization signal, and detecting a second output power of a signal with the specified energy proportion in the second polarization signal includes, for a first target region in which each first light spot is located, loading, by using the switching engine, first phase information and third phase information to a third polarization signal corresponding to the first target region, so that a signal with the specified energy proportion in the third polarization signal corresponding to the first target region is transmitted to the power detection port, and detecting, by using the power detection port, a first output power of the received third polarization signal, and for a second target region in which each second light spot is located, loading, by using the switching engine, second phase information and fourth phase information to a second polarization signal corresponding to the second target region, so that a signal with the specified energy proportion in the second polarization signal corresponding to the second target region is transmitted to the power detection port, and detecting, by using the power detection port, a second output power of the received second polarization signal, where a direction in which the first phase information is loaded, a direction in which the second phase information is loaded, a direction in which the third phase information is loaded, and a direction in which the fourth phase information is loaded are all the same and are all switching directions, and the switching direction is perpendicular to a propagation direction of the optical signal input to the optical device and is perpendicular to the dispersion direction.

Further, there are two power detection ports in total, and the two power detection ports include a first power detection port and a second power detection port.

In this case, for a first target region in which each first light spot is located, loading, by using the switching engine, first phase information to a third polarization signal corresponding to the first target region, so that a signal with the specified energy proportion in the third polarization signal corresponding to the first target region is transmitted to the power detection port, and detecting, by using the power detection port, a first output power of the received third polarization signal includes, for the first target region in which each first light spot is located, loading, by using the switching engine, the first phase information and a third phase direction to the third polarization signal corresponding to the first target region, so that the signal with the specified energy proportion in the third polarization signal corresponding to the first target region is transmitted to the first power detection port, and detecting, by using the first power detection port, the first output power of the received third polarization signal, and for a second target region in which each second light spot is located, loading, by using the switching engine, second phase information to a second polarization signal corresponding to the second target region, so that a signal with the specified energy proportion in the second polarization signal corresponding to the second target region is transmitted to the power detection port, and detecting, by using the power detection port, a second output power of the received second polarization signal includes, for the second target region in which each second light spot is located, loading, by using the switching engine, the second phase information and the fourth phase information to the second polarization signal corresponding to the second target region, so that the signal with the specified energy proportion in the second polarization signal corresponding to the second target region is transmitted to the second power detection port, and detecting, by using the second power detection port, the second output power of the received second polarization signal.

Optionally, an optical power, in each of the two groups of optical powers, that satisfies the power constraint is any one of a maximum output power, a minimum output power, an average value of output powers, and a weighted average value of output powers within the first duration, or optical powers, in the two groups of optical powers, that satisfy the power constraint are powers whose probabilities are a specified probability and that are at same locations in probability distribution curves corresponding to the two groups of optical powers, where the probability distribution curve is used to reflect occurrence probabilities of different optical powers.

On this basis, there is one group of target optical powers that satisfy the same power constraint in total, that is, a group of target optical powers that includes the first target power and the second target power.

In this case, determining a PDL of the optical device based on the at least one group of target optical powers includes determining an absolute value of a difference between the first target power and the second target power as the PDL of the optical device.

Optionally, the two groups of optical powers are the input power for inputting the first optical signal to the optical device and the output power for outputting the first optical signal from the optical device, and an optical power, in each of the two groups of optical powers, that satisfies the power constraint is either a maximum power or a minimum power within the first duration.

Further, selecting at least one group of target optical powers that satisfy the same power constraint from the two groups of optical powers includes obtaining a probability distribution curve corresponding to each group of optical powers, where the probability distribution curve is used to reflect occurrence probabilities of different optical powers, and determining, in two probability distribution curves corresponding to the two groups of optical powers, at least one group of optical powers that satisfy the same power constraint as the target optical powers.

On this basis, there are two groups of target optical powers that satisfy the same power constraint in total, and each group of target optical powers includes a first target power and a second target power, and determining a PDL of the optical device based on the at least one group of target optical powers includes calculating a difference between the first target power and the second target power in each group of target optical powers to obtain a third target power and a fourth target power, and determining an absolute value of a difference between the third target power and the fourth target power as the PDL of the optical device.

Optionally, after determining a PDL of the optical device based on the at least one group of target optical powers, the method further includes compensating for the PDL of the optical device based on the determined PDL of the optical device.

Optionally, the two groups of optical powers are the optical-path output powers of the two polarization principal axes of the optical device, and the compensating for the PDL of the optical device based on the determined PDL of the optical device includes querying, based on the PDL, a correspondence between a PDL and an adjustment angle, where the adjustment angle is an angle by which a propagation angle of an optical signal is adjusted, when the PDL is recorded in the correspondence, determining an adjustment angle corresponding to the PDL, and compensating for the PDL of the optical device based on the adjustment angle.

In an implementation, the optical device includes a switching engine, the optical signal input to the optical device is split into a first polarization signal and a second polarization signal, the first polarization signal is converted to obtain a third polarization signal, polarization directions of the third polarization signal and the second polarization signal are the same, the second polarization signal forms at least one light spot on the switching engine, the third polarization signal forms at least one light spot on the switching engine, and dispersion directions of the at least one light spot formed by the second polarization signal and the at least one light spot formed by the third polarization signal are the same, and compensating for the PDL of the optical device based on the adjustment angle includes, for a target region in which each light spot is located, loading, by using the switching engine, third phase information to a fourth polarization signal corresponding to the target region, so that a first included angle is increased by the adjustment angle, where the first included angle is an included angle between an actual transmission optical-path through which the fourth polarization signal is reflected from the switching engine and an ideal transmission optical-path through which the fourth polarization signal is reflected from the switching engine, and the ideal transmission optical-path is a transmission optical-path with maximum coupling efficiency, or for a target region in which each light spot is located, loading, by using the switching engine, fourth phase information to a fifth polarization signal corresponding to the target region, so that a second included angle is decreased by the adjustment angle, where the second included angle is an included angle between an actual transmission optical-path through which the fifth polarization signal is reflected from the switching engine and an ideal transmission optical-path through which the fifth polarization signal is reflected from the switching engine, where the fourth polarization signal is a polarization signal, in the first polarization signal and the second polarization signal, that has a greater maximum-first-output-power within the first duration, the fifth polarization signal is a polarization signal, in the first polarization signal and the second polarization signal, that has a smaller maximum-first-output-power within the first duration, and a direction in which the third phase information is loaded and a direction in which the fourth phase information is loaded are both the same as or perpendicular to the dispersion direction.

In another implementation, the optical device includes a switching engine, the optical signal input to the optical device is split into a first polarization signal and a second polarization signal, the first polarization signal is converted to obtain a third polarization signal, polarization directions of the third polarization signal and the second polarization signal are the same, the second polarization signal forms at least one light spot on the switching engine, the third polarization signal forms at least one light spot on the switching engine, and dispersion directions of the at least one light spot formed by the second polarization signal and the at least one light spot formed by the third polarization signal are the same, and compensating for the PDL of the optical device based on the adjustment angle includes performing a plurality of compensation processes until an obtained current PDL of the optical device reaches a specified PDL threshold, where the compensation process includes for a target region in which each light spot is located, loading, by using the switching engine, fifth phase information to a polarization signal corresponding to the target region, where the fifth phase information makes a first included angle increase and a second included angle decrease, where the first included angle is an included angle between an actual transmission optical-path through which the fourth polarization signal is reflected from the switching engine and an ideal transmission optical-path through which the fourth polarization signal is reflected from the switching engine, the second included angle is an included angle between an actual transmission optical-path through which the fifth polarization signal is reflected from the switching engine and an ideal transmission optical-path through which the fifth polarization signal is reflected from the switching engine, the fourth polarization signal is a polarization signal, in the first polarization signal and the second polarization signal, that has a greater maximum-first-output-power within the first duration, the fifth polarization signal is a polarization signal, in the first polarization signal and the second polarization signal, that has a smaller maximum-first-output-power within the first duration, the third region is a region used for port switching for the optical signal, and a direction of the fifth phase information is the same as or perpendicular to the dispersion direction.

Optionally, there is one power detection port in total, and a loading time period of the first phase information and the third phase information is different from that of the second phase information and the fourth phase information.

Optionally, the optical device is disposed on an optical signal transmission link, and the method further includes obtaining a maximum optical-path output power and a minimum optical-path output power of any one of the two groups of optical powers within the first duration, and determining an absolute value of a difference between the maximum optical-path output power and the minimum optical-path output power as an accumulated PDL at a location of the optical device on the transmission link within the first duration.

Optionally, the first duration is duration in which a polarization direction of the optical signal input to the optical device can traverse all polarization directions.

Optionally, the optical device is a WSS.

In the PDL determining method provided in this embodiment of this application, the at least one group of target optical powers that satisfy the same power constraint can be selected from the obtained two groups of optical powers, and the PDL of the optical device can be determined based on the at least one group of target optical powers. On a basis of ensuring a function of the optical device, the PDL of the optical device can be accurately determined. In addition, based on the determined PDL of the optical device, compensation may be further performed on the PDL of the optical device, and the accumulated PDL before the optical device on the transmission link within the first duration is determined.

According to a second aspect, an embodiment of this application provides a detection system. The detection system includes an optical power detector, where the optical power detector is connected to an optical device and is configured to detect an optical power, and a controller configured to obtain two groups of optical powers within first duration from optical powers detected by the optical power detector, where an optical power satisfying a same power constraint exists in each of the two groups of optical powers within the first duration, the two groups of optical powers are optical-path output powers of two polarization principal axes of the optical device, or the two groups of optical powers are an input power for inputting a first optical signal to the optical device and an output power for outputting the first optical signal from the optical device, the first optical signal is a signal with any wavelength in an optical signal input to the optical device, and the first optical signal is any polarization signal in a polarization multiplexing signal, or the first optical signal is a single-polarization signal, where the controller is configured to select at least one group of target optical powers that satisfy the same power constraint from the two groups of optical powers, where each group of target optical powers includes a first target power and a second target power respectively from the two groups of optical powers, and the controller is configured to determine a PDL of the optical device based on the at least one group of target optical powers.

Optionally, the two groups of optical powers are the optical-path output powers of the two polarization principal axes of the optical device, and the optical device includes a polarization processing apparatus configured to split the optical signal input to the optical device into a first polarization signal and a second polarization signal, where polarization directions of the first polarization signal and the second polarization signal are perpendicular, and a conversion component configured to convert the first polarization signal to obtain a third polarization signal, where polarization directions of the third polarization signal and the second polarization signal are the same, where the optical power detector is configured to detect, within the first duration, a first output power of a signal with a specified energy proportion in the third polarization signal, and detect a second output power of a signal with the specified energy proportion in the second polarization signal, where the two groups of optical powers are the first output power and the second output power.

Optionally, the optical device includes a switching engine and a power detection port, the second polarization signal forms at least one light spot on the switching engine, the third polarization signal forms at least one light spot on the switching engine, and the light spots formed on the switching engine by the second polarization signal and the third polarization signal coincide, the controller is configured to, for a target region in which each light spot is located, load, by using the switching engine, phase information to both a second polarization signal and a third polarization signal that correspond to a first region, so that the third polarization signal corresponding to the first region is transmitted to the power detection port, and the second polarization signal corresponding to the first region is transmitted in a direction away from the power detection port, where the optical power detector is configured to detect, by using the power detection port, a first output power of the received third polarization signal, and for the target region in which each light spot is located, load, by using the switching engine, phase information to both a second polarization signal and a third polarization signal that correspond to a second region, so that the second polarization signal corresponding to the second region is transmitted to the power detection port, and the third polarization signal corresponding to the second region is transmitted in a direction away from the power detection port, where the optical power detector is configured to detect, by using the power detection port, a second output power of the received second polarization signal, where both the first region and the second region are located in the target region, the first region and the second region correspond to same light spot energy, and a ratio of light spot energy corresponding to each of the first region and the second region to light spot energy corresponding to the target region is the specified energy proportion.

Optionally, the controller is configured to, for the target region in which each light spot is located, load, by using the switching engine, first phase information and third phase information to both the second polarization signal and the third polarization signal that correspond to the first region, so that the third polarization signal corresponding to the first region is transmitted to the power detection port, and the second polarization signal corresponding to the first region is transmitted in the direction away from the power detection port, where the optical power detector is configured to detect, by using the power detection port, the first output power of the received third polarization signal, and the controller is configured to, for the target region in which each light spot is located, load, by using the switching engine, second phase information and fourth phase information to both the second polarization signal and the third polarization signal that correspond to the second region, so that the second polarization signal corresponding to the second region is transmitted to the power detection port, and the third polarization signal corresponding to the second region is transmitted in the direction away from the power detection port, where the optical power detector is configured to detect, by using the power detection port, the second output power of the received second polarization signal, where a first direction in which the first phase information is loaded and a third direction in which the third phase information is loaded are both perpendicular to a propagation direction of the optical signal input to the optical device, a second direction in which the second phase information is loaded and a fourth direction in which the fourth phase information is loaded are both perpendicular to the propagation direction of the optical signal input to the optical device, the first direction is perpendicular to the third direction, the second direction is perpendicular to the fourth direction, the first direction and the second direction are dispersion directions, and the dispersion direction is an arrangement direction of at least one light spot formed on the switching engine by optical signals with different wavelengths in a polarization signal.

Optionally, there are two power detection ports in total, and the two power detection ports include a first power detection port and a second power detection port, the controller is configured to, for the target region in which each light spot is located, load, by using the switching engine, first phase information and third phase information to both the second polarization signal and the third polarization signal that correspond to the first region, so that the third polarization signal corresponding to the first region is transmitted to the first power detection port, and the second polarization signal corresponding to the first region is transmitted in a direction away from the first power detection port, where the optical power detector is configured to detect, by using the first power detection port, the first output power of the received third polarization signal, and the controller is configured to, for the target region in which each light spot is located, load, by using the switching engine, second phase information and fourth phase information to both the second polarization signal and the third polarization signal that correspond to the second region, so that the second polarization signal corresponding to the second region is transmitted to the second power detection port, and the third polarization signal corresponding to the second region is transmitted in a direction away from the second power detection port, where the optical power detector is configured to detect, by using the second power detection port, the second output power of the received second polarization signal.

Optionally, the optical device includes the polarization processing apparatus, there are two power detection ports in total, and the two power detection ports include a first power detection port and a second power detection port, the controller is configured to, for the target region in which each light spot is located, load, by using the switching engine, third phase information to the second polarization signal and the third polarization signal that correspond to the first region, so that the third polarization signal and the second polarization signal that correspond to the first region are transmitted in a direction toward the first power detection port, where the polarization processing apparatus is configured to implement that the second polarization signal corresponding to the first region is transmitted in a direction away from the first power detection port, and the optical power detector is configured to detect, by using the first power detection port, the first output power of the received third polarization signal, and the controller is configured to, for the target region in which each light spot is located, load, by using the switching engine, fourth phase information to the second polarization signal and the third polarization signal that correspond to the second region, so that the third polarization signal and the second polarization signal that correspond to the second region are transmitted in a direction toward the second power detection port, where the polarization processing apparatus is configured to implement that the third polarization signal corresponding to the second region is transmitted in a direction away from the second power detection port, and the optical power detector is configured to detect, by using the second power detection port, the second output power of the received second polarization signal, where a third direction in which the third phase information is loaded is perpendicular to a propagation direction of the optical signal input to the optical device, a fourth direction in which the fourth phase information is loaded is perpendicular to the propagation direction of the optical signal input to the optical device, the third direction and the fourth direction are switching directions, the switching direction is perpendicular to the dispersion direction, and the dispersion direction is an arrangement direction of at least one light spot formed on the switching engine by optical signals with different wavelengths in a polarization signal.

Optionally, the optical device includes a switching engine and a power detection port, the second polarization signal forms at least one first light spot on the switching engine, the third polarization signal forms at least one second light spot on the switching engine, the at least one first light spot and the at least one second light spot formed on the switching engine by the second polarization signal and the third polarization signal do not coincide, and dispersion directions of the at least one first light spot and the at least one second light spot are the same, the controller is configured to, for a first target region in which each first light spot is located, load, by using the switching engine, first phase information and third phase information to a third polarization signal corresponding to the first target region, so that a signal with the specified energy proportion in the third polarization signal corresponding to the first target region is transmitted to the power detection port, where the optical power detector is configured to detect, by using the power detection port, a first output power of the received third polarization signal, and the controller is configured to, for a second target region in which each second light spot is located, load, by using the switching engine, second phase information and fourth phase information to a second polarization signal corresponding to the second target region, so that a signal with the specified energy proportion in the second polarization signal corresponding to the second target region is transmitted to the power detection port, where the optical power detector is configured to detect, by using the power detection port, a second output power of the received second polarization signal, where a direction in which the first phase information is loaded, a direction in which the second phase information is loaded, a direction in which the third phase information is loaded, and a direction in which the fourth phase information is loaded are all the same and are all switching directions, and the switching direction is perpendicular to a propagation direction of the optical signal input to the optical device and is perpendicular to the dispersion direction.

Optionally, there are two power detection ports in total, and the two power detection ports include a first power detection port and a second power detection port, the controller is configured to, for the first target region in which each first light spot is located, load, by using the switching engine, the first phase information and a third phase direction to the third polarization signal corresponding to the first target region, so that the signal with the specified energy proportion in the third polarization signal corresponding to the first target region is transmitted to the first power detection port, where the optical power detector is configured to detect, by using the first power detection port, the first output power of the received third polarization signal, and the controller is configured to, for the second target region in which each second light spot is located, load, by using the switching engine, the second phase information and the fourth phase information to the second polarization signal corresponding to the second target region, so that the signal with the specified energy proportion in the second polarization signal corresponding to the second target region is transmitted to the second power detection port, where the optical power detector is configured to detect, by using the second power detection port, the second output power of the received second polarization signal.

Optionally, an optical power, in each of the two groups of optical powers, that satisfies the power constraint is any one of a maximum output power, a minimum output power, an average value of output powers, and a weighted average value of output powers within the first duration, or optical powers, in the two groups of optical powers, that satisfy the power constraint are powers whose probabilities are a specified probability and that are at same locations in probability distribution curves corresponding to the two groups of optical powers, where the probability distribution curve is used to reflect occurrence probabilities of different optical powers.

Optionally, there is one group of target optical powers that satisfy the same power constraint in total, that is, a group of target optical powers that includes the first target power and the second target power, and the controller is configured to determine an absolute value of a difference between the first target power and the second target power as the PDL of the optical device.

Optionally, the two groups of optical powers are the input power for inputting the first optical signal to the optical device and the output power for outputting the first optical signal from the optical device, and an optical power, in each of the two groups of optical powers, that satisfies the power constraint is either a maximum power or a minimum power within the first duration.

Optionally, the controller is configured to obtain a probability distribution curve corresponding to each group of optical powers, where the probability distribution curve is used to reflect occurrence probabilities of different optical powers, and determine, in two probability distribution curves corresponding to the two groups of optical powers, at least one group of optical powers that satisfy the same power constraint as the target optical powers.

Optionally, there are two groups of target optical powers that satisfy the same power constraint in total, and each group of target optical powers includes a first target power and a second target power, and the controller is configured to calculate a difference between the first target power and the second target power in each group of target optical powers to obtain a third target power and a fourth target power, and determine an absolute value of a difference between the third target power and the fourth target power as the PDL of the optical device.

Optionally, the detection system further includes a first optical beam splitter and a second optical beam splitter, where the first optical beam splitter is connected to an input end of the optical device, the second optical beam splitter is connected to an output end of the optical device, and the optical power detector is separately connected to the first optical beam splitter and the second optical beam splitter, the first optical beam splitter is configured to obtain, through splitting, a signal with partial energy from an optical signal input to the optical device, and transmit the signal obtained through splitting to the optical power detector, so that the optical power detector performs power detection, the second optical beam splitter is configured to obtain, through splitting, a signal with partial energy from an optical signal output from the optical device, and transmit the signal obtained through splitting to the optical power detector, so that the optical power detector performs power detection, and the optical power detector is configured to detect a power of any polarization signal in a polarization multiplexing signal with any wavelength, or is configured to detect a power of a single-polarization signal with any wavelength.

Optionally, the controller is further configured to, after determining the PDL of the optical device based on the at least one group of target optical powers, compensate for the PDL of the optical device based on the determined PDL of the optical device.

Optionally, the two groups of optical powers are the optical-path output powers of the two polarization principal axes of the optical device, and the controller is configured to query, based on the PDL, a correspondence between a PDL and an adjustment angle, where the adjustment angle is an angle by which a propagation angle of an optical signal is adjusted, when the PDL is recorded in the correspondence, determine an adjustment angle corresponding to the PDL, and compensate for the PDL of the optical device based on the adjustment angle.

Optionally, the optical device includes a switching engine, the optical signal input to the optical device is split into a first polarization signal and a second polarization signal, the first polarization signal is converted to obtain a third polarization signal, polarization directions of the third polarization signal and the second polarization signal are the same, the second polarization signal forms at least one light spot on the switching engine, the third polarization signal forms at least one light spot on the switching engine, and dispersion directions of the at least one light spot formed by the second polarization signal and the at least one light spot formed by the third polarization signal are the same, and the controller is configured to, for a target region in which each light spot is located, load, by using the switching engine, third phase information to a fourth polarization signal corresponding to the target region, so that a first included angle is increased by the adjustment angle, where the first included angle is an included angle between an actual transmission optical-path through which the fourth polarization signal is reflected from the switching engine and an ideal transmission optical-path through which the fourth polarization signal is reflected from the switching engine, and the ideal transmission optical-path is a transmission optical-path with maximum coupling efficiency, or for a target region in which each light spot is located, load, by using the switching engine, fourth phase information to a fifth polarization signal corresponding to the target region, so that a second included angle is decreased by the adjustment angle, where the second included angle is an included angle between an actual transmission optical-path through which the fifth polarization signal is reflected from the switching engine and an ideal transmission optical-path through which the fifth polarization signal is reflected from the switching engine, where the fourth polarization signal is a polarization signal, in the first polarization signal and the second polarization signal, that has a greater maximum-first-output-power within the first duration, the fifth polarization signal is a polarization signal, in the first polarization signal and the second polarization signal, that has a smaller maximum-first-outputpower within the first duration, and a direction in which the third phase information is loaded and a direction in which the fourth phase information is loaded are both the same as or perpendicular to the dispersion direction.

Optionally, the optical device includes a switching engine, the optical signal input to the optical device is split into a first polarization signal and a second polarization signal, the first polarization signal is converted to obtain a third polarization signal, polarization directions of the third polarization signal and the second polarization signal are the same, the second polarization signal forms at least one light spot on the switching engine, the third polarization signal forms at least one light spot on the switching engine, and dispersion directions of the at least one light spot formed by the second polarization signal and the at least one light spot formed by the third polarization signal are the same, and the controller is configured to perform a plurality of compensation processes until an obtained current PDL of the optical device reaches a specified PDL threshold, where the compensation process includes, for a target region in which each light spot is located, loading, by using the switching engine, fifth phase information to a polarization signal corresponding to the target region, where the fifth phase information makes a first included angle increase and a second included angle decrease, where the first included angle is an included angle between an actual transmission optical-path through which the fourth polarization signal is reflected from the switching engine and an ideal transmission optical-path through which the fourth polarization signal is reflected from the switching engine, the second included angle is an included angle between an actual transmission optical-path through which the fifth polarization signal is reflected from the switching engine and an ideal transmission optical-path through which the fifth polarization signal is reflected from the switching engine, the fourth polarization signal is a polarization signal, in the first polarization signal and the second polarization signal, that has a greater maximum-first-output-power within the first duration, the fifth polarization signal is a polarization signal, in the first polarization signal and the second polarization signal, that has a smaller maximum-first-output-power within the first duration, the third region is a region used for port switching for the optical signal, and a direction of the fifth phase information is the same as or perpendicular to the dispersion direction.

Optionally, there is one power detection port in total, and a loading time period of the first phase information and the third phase information is different from that of the second phase information and the fourth phase information.

Optionally, the optical device is disposed on an optical signal transmission link, and the controller is further configured to obtain a maximum optical-path output power and a minimum optical-path output power of any one of the two groups of optical powers within the first duration, and determine an absolute value of a difference between the maximum optical-path output power and the minimum optical-path output power as an accumulated PDL at a location of the optical device on the transmission link within the first duration.

Optionally, the first duration is duration in which a polarization direction of the optical signal input to the optical device can traverse all polarization directions.

Optionally, the optical device is a WSS.

In the detection system provided in this embodiment of this application, on a basis of ensuring a function of the optical device, the PDL of the optical device can be accurately determined, and compensation is performed on the PDL of the optical device. In addition, the accumulated PDL before the location of the optical device on the transmission link within the first duration may be further determined.

According to a third aspect, an embodiment of this application provides an optical signal transmission structure. The optical signal transmission structure includes at least one optical device, and a detection system corresponding to an optical device in the at least one optical device. The detection system includes the detection system in the second aspect.

Optionally, the optical signal transmission structure includes a reconfigurable optical add/drop multiplexer (ROADM) and at least one optical amplifier. The ROADM includes at least one WSS. The detection system is correspondingly disposed for a first WSS in the at least one WSS.

The at least one WSS is connected to the at least one optical amplifier.

Optionally, the at least one optical amplifier includes a first-level optical amplifier and a second-level optical amplifier.

The at least one WSS is connected in series and has one input end and at least one output end. The first-level optical amplifier is connected to the input end. The second-level optical amplifier is connected to a specified output end of the at least one output end.

Optionally, the optical signal transmission structure further includes one fast polarization scrambler, and the fast polarization scrambler is disposed between the first-level optical amplifier and the input end.

Optionally, the first-level optical amplifier is configured to obtain, in advance, an additional insertion loss to be generated during compensation for a PDL of the first WSS, and after receiving an optical signal input to the first-level optical amplifier, compensate for the additional insertion loss for an optical signal input to the first WSS.

Optionally, the optical amplifier is an EDFA or a Raman amplifier.

The optical signal transmission structure provided in this embodiment of this application includes the at least one optical device, and the detection system corresponding to the optical device of the at least one optical device. Therefore, a PDL of the optical device corresponding to the detection system can be accurately detected. In addition, in the ROADM of the optical signal transmission structure, a first-level EDFA is configured to obtain, in advance, an additional insertion loss to be generated during compensation for a PDL of a specified WSS, and after receiving an optical signal input to the first-level EDFA, compensate for the additional insertion loss for an optical signal input to the specified WSS. This avoids a problem that an optical signal-to-noise ratio of an output signal of a second-level EDFA is decreased because the additional insertion loss is generated due to the compensation for the PDL of the WSS, thereby maximally avoiding deterioration of an optical signal-to-noise ratio of an entire transmission link.

According to the PDL determining method, the detection system, and the optical signal transmission structure provided in the embodiments of this application, in the PDL determining method provided in the embodiments of this application, on a basis of ensuring a function of the optical device, the PDL of the optical device can be accurately determined, accurate compensation may be further performed based on the detected PDL of the optical device, and the accumulated PDL before the location of the optical device on the transmission link within the first duration is determined. The optical signal transmission structure includes the at least one optical device, and the detection system corresponding to the optical device of the at least one optical device. Therefore, a PDL of the optical device corresponding to the detection system can be accurately detected. In the ROADM of the optical signal transmission structure, a first-level EDFA is configured to obtain, in advance, an additional insertion loss to be generated during compensation for a PDL of a specified WSS, and after receiving an optical signal input to the first-level EDFA, compensate for the additional insertion loss for an optical signal input to the specified WSS. This avoids a problem that an optical signal-to-noise ratio of a second-level EDFA is decreased because the additional insertion loss is generated due to the compensation for the PDL of the WSS, thereby maximally avoiding deterioration of an optical signal-to-noise ratio of an entire transmission link.

In this application, based on the implementations provided in the foregoing aspects, the implementations may be further combined to provide more implementations.

DESCRIPTION OF EMBODIMENTS

To make the objectives, technical solutions, and advantages of this application clearer, the following further describes the implementations of this application in detail with reference to the accompanying drawings.

Optical fiber communication is a communication mode in which an optical signal is used as an information carrier and an optical fiber is used as a transmission medium, and has advantages of a wide transmission frequency band, high anti-interference performance, a small signal attenuation, and the like. An optical fiber communications system includes a large quantity of optical signal transmission structures. The optical signal transmission structure may also be referred to as a transmission node, and the optical signal transmission structure may include at least one optical device. A PDL of the optical device causes distortion of an optical signal transmitted to the optical device, and finally causes deterioration of transmission performance of an optical signal transmission link. Therefore, accurately determining the PDL of the optical device is of great importance to the optical fiber communication.

Figure 1:
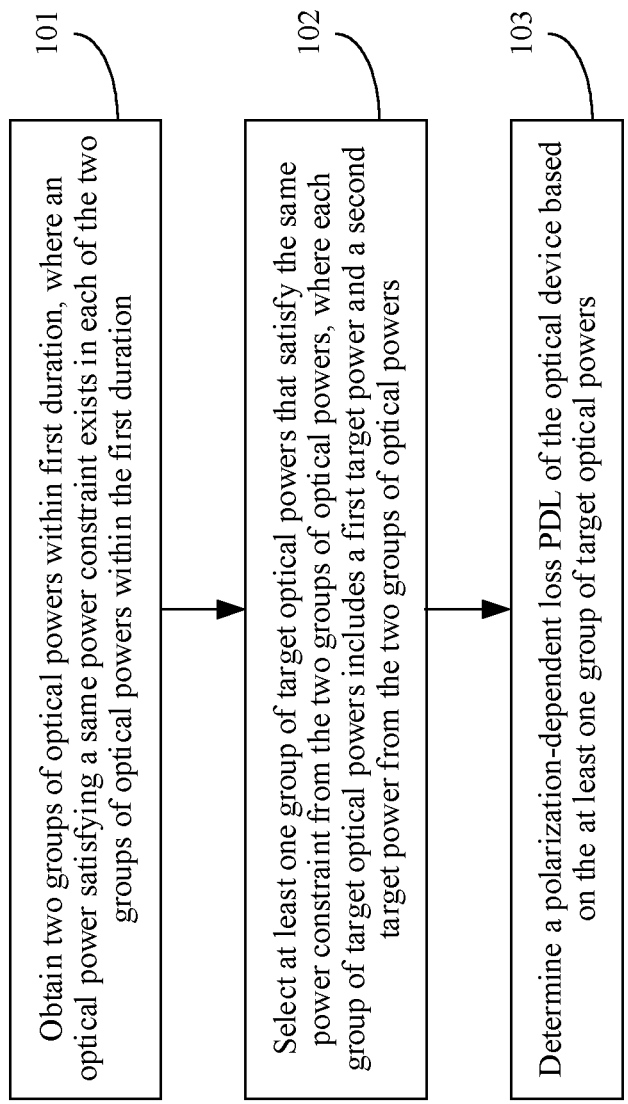
FIG. 1 is a method flowchart of a PDL determining method according to an embodiment of this application.

This application provides a PDL determining method. The method may be applied to a detection system including an optical device, and can be used to accurately determine a PDL of the optical device. As shown in FIG. 1, the method includes the following steps.

Step 101: Obtain two groups of optical powers within first duration, where an optical power satisfying a same power constraint exists in each of the two groups of optical powers within the first duration.

Step 102: Select at least one group of target optical powers that satisfy the same power constraint from the two groups of optical powers, where each group of target optical powers includes a first target power and a second target power respectively from the two groups of optical powers.

For example, it is assumed that the two groups of optical powers are a first group of optical powers and a second group of optical powers, and an optical power, satisfying the constraint, in each of the two groups of optical powers within the first duration is a maximum optical power in the group of optical powers. In this case, a selected group of target optical powers that satisfy the same constraint includes a maximum optical power in the first group of optical powers and a maximum optical power in the second group of optical powers.

Step 103: Determine a PDL of the optical device based on the at least one group of target optical powers.

In the PDL determining method provided in this embodiment of this application, the at least one group of target optical powers that satisfy the same power constraint can be selected from the obtained two groups of optical powers, and the PDL of the optical device can be determined based on the at least one group of target optical powers. Therefore, the PDL of the optical device can be accurately determined.

When step 101 is implemented, the optical device may be classified into two types of optical devices based on functions of the optical device. A first type of optical device can directly detect optical-path output powers of two polarization principal axes of the optical device by using an optical power detector, and a PDL of the optical device may be determined based on a detection result. A second type of optical device cannot directly detect optical-path output powers of two polarization principal axes of the optical device by using an optical power detector, but may detect, by using another auxiliary device, an input power of a first optical signal input to the optical device and an output power of the first optical signal, and a PDL of the optical device is detected based on a detection result. For the first type of optical device, in the PDL determining method provided in this embodiment of this application, the obtained two groups of optical powers within the first duration may be the optical-path output powers of the two polarization principal axes of the optical device. For the second type of optical device, in the PDL determining method provided in this embodiment of this application, the obtained two groups of optical powers within the first duration may be the input power for inputting the first optical signal to the optical device and the output power for outputting the first optical signal from the optical device, the first optical signal is a signal with any wavelength in an optical signal input to the optical device, and the first optical signal is any polarization signal in a polarization multiplexing signal, or the first optical signal is a single-polarization signal. It should be noted that, for the first type of optical device, the optical device may be an optical device that can split, by itself, an optical signal into a first polarization signal and a second polarization signal whose polarization directions are perpendicular, for example, the optical device may be a WSS, and a polarization splitter in the WSS may split an optical signal input to the WSS into a first polarization signal and a second polarization signal, so that the optical power detector may directly detect an output power of a polarization-principal-axis optical path through which the first polarization signal passes and an output power of a polarization-principal-axis optical path through which the second polarization signal passes, or an internal structure of the optical device may be modified, so that the optical device can split an optical signal input to the optical device into a first polarization signal and a second polarization signal, and can detect an output power of a polarization-principal-axis optical path through which the first polarization signal passes and an output power of a polarization-principal-axis optical path through which the second polarization signal passes.

The following separately describes methods for determining PDLs of the foregoing two types of optical devices. It should be noted that units of all powers mentioned in this embodiment of this application are decibel milliwatt (dBm).

To help a reader understand a first PDL determining method provided in this embodiment of this application, before the first PDL determining method is described, related characteristics of an optical device are first described herein.

The optical device usually has a first polarization principal axis and a second polarization principal axis that are orthogonal to each other and that correspond to a first polarization-principal-axis optical path and a second polarization-principal-axis optical path respectively. In optical fiber communication, a polarization multiplexing signal (referred to as an optical signal) is usually used to transmit data, and the optical signal includes two orthogonal polarization signals. When the optical signal passes through the optical device, if the two orthogonal polarization signals do not coincide with the two polarization principal axes, the two polarization principal axes of the optical device decompose each of the two orthogonal polarization signals into two polarization signal components consistent with polarization directions of the two polarization principal axis, to form a first polarization signal on the first polarization-principal-axis optical path, and form a second polarization signal on the second polarization-principal-axis optical path. That is, the first polarization signal and the second polarization signal each include two polarization components, and the two polarization components are polarization components of the two orthogonal polarization signals on the first polarization principal axis and the second polarization principal axis respectively. Certainly, if the two orthogonal polarization signals coincide with the two polarization principal axes, polarization signals on the two polarization principal axes are the two orthogonal polarization signals.

When the optical signal passes through the optical device, the first polarization principal axis of the optical device affects the first polarization signal on the first polarization-principal-axis optical path, and the second polarization principal axis affects the second polarization signal on the second polarization-principal-axis optical path. Usually, the first polarization signal and the second polarization signal are subject to different impact, that is, different insertion losses, thereby causing a PDL of the optical device. From a perspective of an optical principle, during design of each structure in the optical device, an ideal transmission optical-path for transmitting a polarization signal in the optical device needs to be simulated, to ensure normal transmission of a polarization signal. The ideal transmission optical-path is a transmission optical-path with maximum coupling efficiency or a minimum insertion loss. However, during actual use of the optical device, due to impact of factors such as an assembly location error of each component in the optical device, an ambient temperature change, and glue aging, an actual transmission optical-path of a polarization signal in the optical device deviates from the ideal transmission optical-path, resulting in energy losses of some polarization signals and more insertion losses. In addition, the first polarization signal on the first polarization-principal-axis optical path and the second polarization signal on the second polarization-principal-axis optical path are usually subject to different energy losses, that is, different insertion losses, thereby causing the PDL of the optical device.

Figure 2:
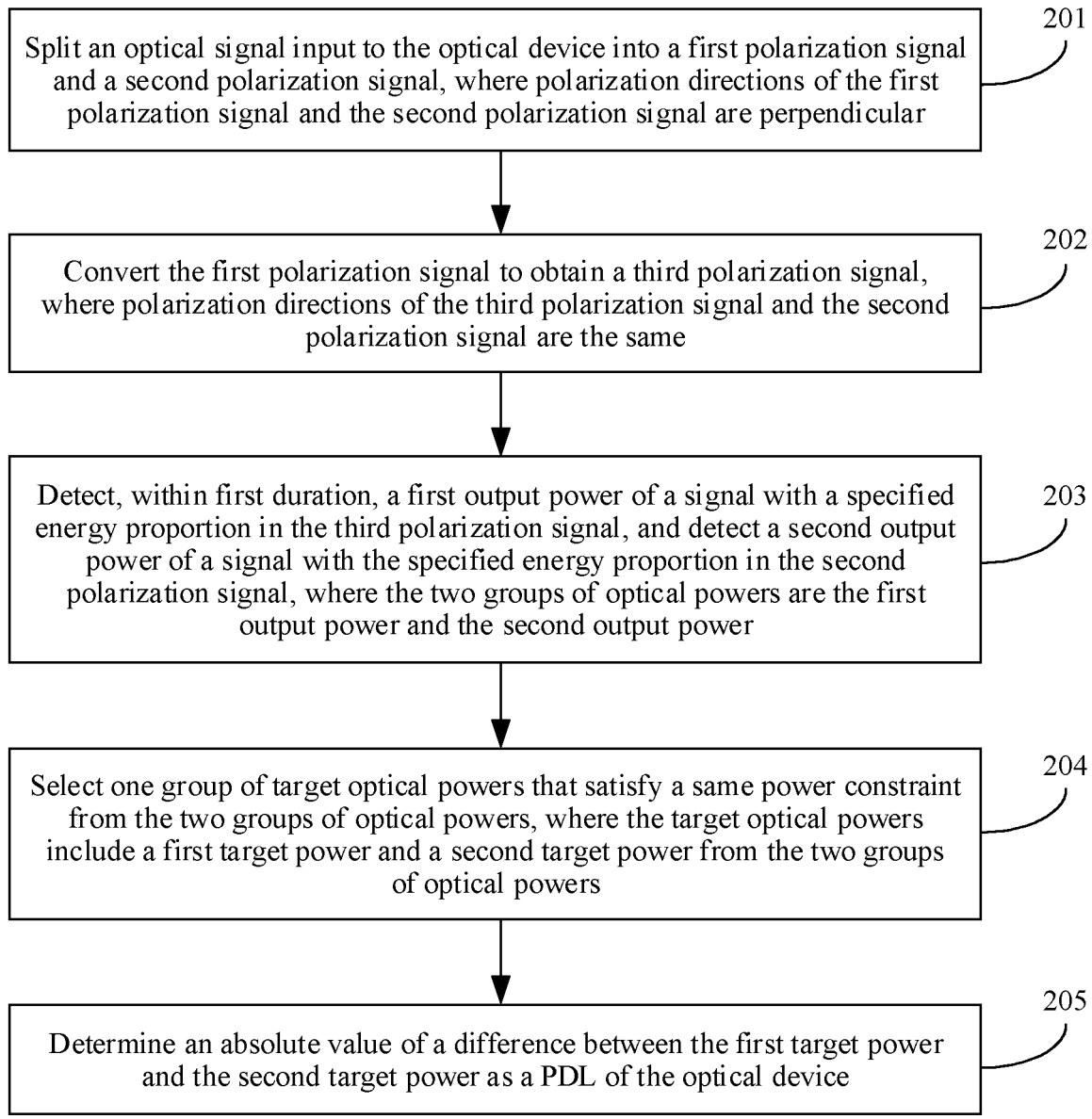
FIG. 2 is a method flowchart of another PDL determining method according to an embodiment of this application.

Based on this, in the first PDL determining method provided in this embodiment of this application, a PDL of the first type of optical device may be determined based on optical-path output powers of two polarization principal axes of the optical device. As shown in FIG. 2, the method includes the following steps.

Step 201: Split an optical signal input to the optical device into a first polarization signal and a second polarization signal, where polarization directions of the first polarization signal and the second polarization signal are perpendicular.

Step 201 may be performed by the optical device. In addition to the foregoing polarization multiplexing signal, the optical signal input to the optical device may be alternatively a single-polarization signal. Both the polarization multiplexing signal and the single-polarization signal are signals whose polarization directions change in a random manner.

Step 202: Convert the first polarization signal to obtain a third polarization signal, where polarization directions of the third polarization signal and the second polarization signal are the same.

Step 202 may be performed by the optical device.

Step 203: Detect, within first duration, a first output power of a signal with a specified energy proportion in the third polarization signal, and detect a second output power of a signal with the specified energy proportion in the second polarization signal, where the two groups of optical powers are the first output power and the second output power.

Optionally, to ensure accuracy of the determined first output power and second output power, the first duration is duration in which a polarization direction of the optical signal input to the optical device can traverse all polarization directions. The first duration may be obtained through software simulation or a manual experiment in advance. Step 203 may be performed by an optical power detector.

Figure 3:
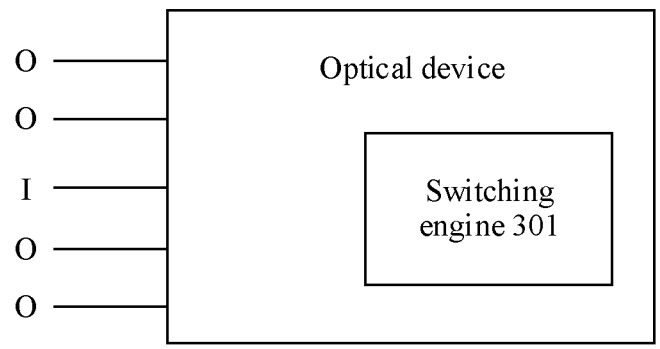
FIG. 3 is a schematic structural diagram of an optical device according to an embodiment of this application.

FIG. 3 is a schematic structural diagram of an optical device according to an example embodiment of this application. Optionally, the optical device may be a WSS. The optical device may include a signal input port I and at least one signal output port O (FIG. 2 shows a case in which there are four signal output ports). The optical device further includes a switching engine 301 and a power detection port. The power detection port may be a specified signal output port O. The power detection port is connected to the optical power detector. The optical power detector may detect a received optical power by using the power detection port. Usually, the power detection port is in a one-to-one correspondence with the optical power detector.

The switching engine of the optical device may be a liquid crystal on silicon (LCOS), a micro-electro-mechanical system (MEMS), a liquid crystal (LC), or the like. In this embodiment of this application, an example in which the switching engine is an LCOS is used for description.

The LCOS is a matrix liquid crystal display apparatus, and may control a torsion direction of liquid crystal molecules by using an external electric field. An electrode is correspondingly disposed for each pixel of the matrix liquid crystal display apparatus. By adjusting a voltage loaded to each electrode, liquid crystal deflection in a region in which a corresponding pixel is located may be separately controlled by using the electrode. An optical signal with each wavelength may be projected on the switching engine to form one light spot. When optical signals with a plurality of wavelengths are projected on the switching engine to form a plurality of light spots, because a region in which each light spot is formed on the switching engine correspondingly includes a plurality of pixels, an electrode is used to control liquid crystal deflection in the region in which the plurality of pixels are located, so that phase information of an optical signal, with a corresponding wavelength, that forms the light spot may be changed, so as to change a diffraction direction of the optical signal with the wavelength. However, if an electrode is used to control liquid crystal deflection in a region in which some of the plurality of pixels are located, phase information of an optical signal that forms a light spot corresponding to this part of pixels may be changed.

In this embodiment of this application, according to an operating principle of the switching engine, the switching engine loads phase information to a second polarization signal and a third polarization signal that correspond to a specified region in a light spot, to change diffraction directions of the second polarization signal and the third polarization signal, so that polarization signals with a specified energy proportion in the second polarization signal and the third polarization signal may be output from a specified power detection port, so as to effectively determine a PDL of the optical device based on an output power detected by the specified power detection port.

Because an optical design architecture of the optical device may vary, correspondingly, an implementation of step 203 may also vary. In this embodiment of this application, the following two implementations are used as examples for description. The two implementations separately include the following.

Figure 4:
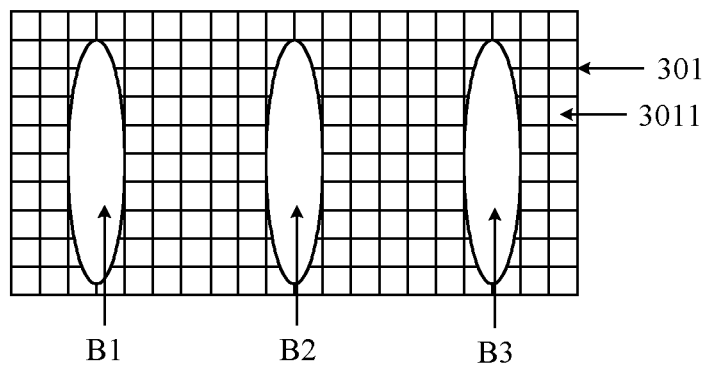
FIG. 4 is a schematic diagram of a light spot formed on a switching engine according to an embodiment of this application.

In a first implementation, the second polarization signal may form at least one light spot on the switching engine, the third polarization signal may form at least one light spot on the switching engine, and the light spots formed on the switching engine by the second polarization signal and the third polarization signal coincide, as shown in FIG. 4. FIG. 4 is a schematic diagram of some overlapping light spots of light spots formed on the switching engine 301 by the second polarization signal and the third polarization signal. FIG. 4 schematically shows a case in which a light spot B1, a light spot B2, and a light spot B3 are formed on the switching engine 301. Each light spot may correspond to one wavelength, and different light spots correspond to different wavelengths. The switching engine 301 includes a plurality of pixels 3011. A process of detecting the first output power of the third polarization signal and the second output power of the second polarization signal by using the power detection port may include the following steps.

Step X1: For a target region in which each light spot is located, the optical device loads, by using the switching engine, phase information to both a second polarization signal and a third polarization signal that correspond to a first region, so that the third polarization signal corresponding to the first region is transmitted to the power detection port, and the second polarization signal corresponding to the first region is transmitted in a direction away from the power detection port, and an optical power detector connected to the power detection port detects a first output power of the received third polarization signal.

Step X2: For the target region in which each light spot is located, the optical device loads, by using the switching engine, phase information to both a second polarization signal and a third polarization signal that correspond to a second region, so that the second polarization signal corresponding to the second region is transmitted to the power detection port, and the third polarization signal corresponding to the second region is transmitted in a direction away from the power detection port, and the optical power detector connected to the power detection port detects a second output power of the received second polarization signal.

Both the first region and the second region are located in the target region. To ensure validity of the detected first output power of the first polarization signal and the detected second output power of the second polarization signal, when the first region and the second region are divided in the target region, the first region and the second region are set to correspond to a same light spot energy proportion, and a ratio of light spot energy corresponding to each of the first region and the second region to light spot energy corresponding to the target region is the specified energy proportion. It should be noted that, when the first region and the second region correspond to same light spot energy, region areas of the first region and the second region in the target region may be the same or different.

Further, the first region and the second region may be a same region or different regions. When the first region and the second region are different regions, phase loading time periods of the first region and the second region may be the same or different. When the first region and the second region are a same region, phase loading time periods of the first region and the second region may be different, that is, the optical device may perform time-division phase loading. A process of the time-division phase loading includes loading, within a time period, phase information to both a second polarization signal and a third polarization signal that correspond to a specified region, and loading, within another time period, phase information to both a second polarization signal and a third polarization signal that correspond to a second region corresponding to the specified region, where the specified region is a same region in which the first region and the second region are located.

Optionally, there may be a plurality of manners in which the optical device loads, by using the switching engine, phase information to both a polarization signal corresponding to the first region and a polarization signal corresponding to the second region, so as to transmit only a specified polarization signal to the power detection port. A first optional implementation is loading a plurality of types of phase information. A second optional implementation is loading phase information and changing an internal structure of the optical device. In this embodiment of this application, the two optional implementations are used as examples for description.

In the first optional implementation, the optical device separately loads a plurality of types of phase information in the first region and the second region by using the switching engine. For example, step X1 may include step X11: For the target region in which each light spot is located, the optical device loads, by using the switching engine, first phase information and third phase information to both the second polarization signal and the third polarization signal that correspond to the first region, so that the third polarization signal corresponding to the first region is transmitted to the power detection port, and the second polarization signal corresponding to the first region is transmitted in the direction away from the power detection port, and the optical power detector connected to the power detection port detects the first output power of the received third polarization signal. Step X2 may include step X21: For the target region in which each light spot is located, the optical device loads, by using the switching engine, second phase information and fourth phase information to both the second polarization signal and the third polarization signal that correspond to the second region, so that the second polarization signal corresponding to the second region is transmitted to the power detection port, and the third polarization signal corresponding to the second region is transmitted in the direction away from the power detection port, and the optical power detector connected to the power detection port detects the second output power of the received second polarization signal. When a polarization signal is transmitted in a direction away from the power detection port, the power detection port cannot receive the corresponding signal. In this case, for the power detection port, the polarization signal is dissipated, or it may be considered that a detected power of the polarization signal is 0.

Light spot energy is energy of a polarization signal that forms a light spot, and the light spot energy corresponds to a power of the polarization signal that forms the light spot. A first direction in which the optical device loads the first phase information by using the switching engine and a third direction in which the optical device loads the third phase information by using the switching engine are both perpendicular to a propagation direction of the optical signal input to the optical device. A second direction in which the optical device loads the second phase information by using the switching engine and a fourth direction in which the optical device loads the fourth phase information by using the switching engine are both perpendicular to the propagation direction of the optical signal input to the optical device. The first direction is perpendicular to the third direction. The second direction is perpendicular to the fourth direction. The first direction and the second direction are dispersion directions. The dispersion direction is an arrangement direction of at least one light spot formed on the switching engine by optical signals with different wavelengths in a polarization signal. Certainly, during actual implementation of this embodiment of this application, the first direction and the second direction may be alternatively switching directions, and the switching direction is a direction perpendicular to both the dispersion direction and the propagation direction. In this case, correspondingly, the third direction and the fourth direction may be dispersion directions.

Further, because one or more power detection ports may be disposed in the optical device, a quantity of power detection ports varies, and a phase loading manner in step X1 and step X2 also varies.

In a first optional phase loading manner, when one power detection port is disposed in the optical device, in step X1 and step X2, the optical device transmits the third polarization signal corresponding to the first region and the second polarization signal corresponding to the second region to a same power detection port. To still ensure that the first output power and the second output power can be effectively detected, the optical device may set a loading time period of the first phase information and the third phase information and a loading time period of the second phase information and the fourth phase information to different loading time periods, that is, perform time-division phase loading. In this way, by using the power detection port, the first output power of the third polarization signal may be detected in one time period, and the second output power of the second polarization signal may be detected in another specified time period.

In a second optional phase loading manner, when two power detection ports are disposed in the optical device, that is, when a first detection port and a second detection port are disposed in the optical device, step X1 may include step X12: For the target region in which each light spot is located, the optical device may load, by using the switching engine, first phase information and third phase information to both the second polarization signal and the third polarization signal that correspond to the first region, so that the third polarization signal corresponding to the first region is transmitted to the first power detection port, and the second polarization signal corresponding to the first region is transmitted in a direction away from the first detection port, and an optical power detector connected to the first power detection port detects the first output power of the received third polarization signal. Step X2 may include step X22: For the target region in which each light spot is located, the optical device loads, by using the switching engine, second phase information and fourth phase information to both the second polarization signal and the third polarization signal that correspond to the second region, so that the second polarization signal corresponding to the second region is transmitted to the second power detection port, and the third polarization signal corresponding to the second region is transmitted in a direction away from the second detection port, and an optical power detector connected to the second power detection port detects the second output power of the received second polarization signal.

Because the second polarization signal and the third polarization signal form a group of overlapping light spots on the switching engine, a corresponding optical signal that forms each light spot includes not only an optical signal with a corresponding wavelength in the second polarization signal, but also an optical signal with a corresponding wavelength in the third polarization signal. When phase information is loaded in the first region and the second region of the switching engine, phase information may be loaded in both the dispersion direction and the switching direction, to diffract, to a specified power detection port, a specified polarization signal in the corresponding optical signal that forms each light spot, that is, diffract, to the second power detection port, a second polarization signal in the corresponding optical signal that forms each light spot, and diffract, to the first power detection port, a third polarization signal in the corresponding optical signal that forms each light spot.

The loading phase information in the two directions includes the following steps.

1. Load phase information in the switching direction, that is, load the third phase information in the third direction and the fourth phase information in the fourth direction. The loading phase information in the switching direction is to diffract both the second polarization signal and the third polarization signal to the first power detection port, or diffract both the second polarization signal and the third polarization signal to the second power detection port.

2. Load phase information in the dispersion direction, that is, load the first phase information in the first direction and load the second phase information in the second direction. The loading phase information in the dispersion direction is to deflect a propagation direction of the third polarization signal in the corresponding optical signal that forms each light spot so that the third polarization signal cannot be propagated to a detection port, and deflect a propagation direction of the second polarization signal so that the second polarization signal is propagated to the second power detection port, or deflect a propagation direction of the second polarization signal in the corresponding optical signal that forms each light spot so that the second polarization signal cannot be propagated to a detection port, and deflect a propagation direction of the third polarization signal so that the third polarization signal is propagated to the first power detection port. In this way, the second polarization signal and the third polarization signal in the optical signal corresponding to each light spot can be effectively separated.

Figure 5:
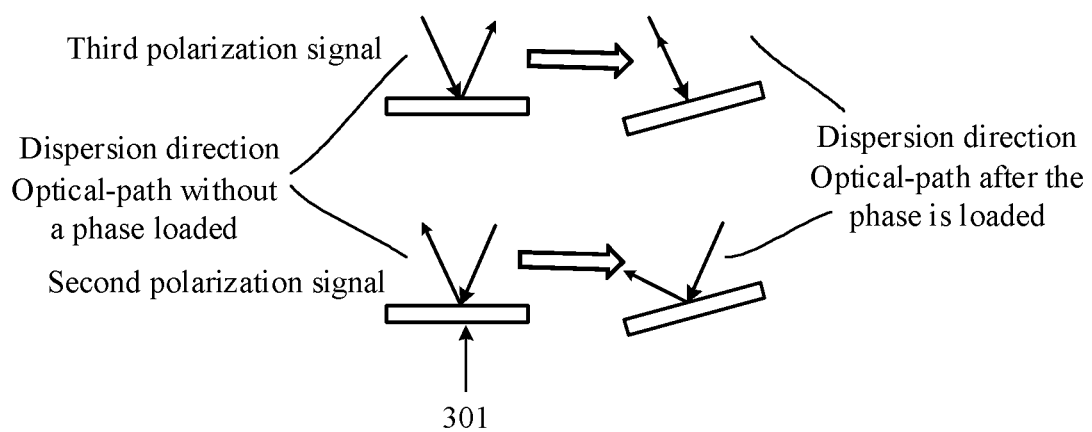
FIG. 5 is a schematic principle diagram of loading phase information in a dispersion direction according to an embodiment of this application.

The following describes a principle of loading the phase information in the dispersion direction by using an example in which the second polarization signal in the optical signal corresponding to each light spot is away from the first power detection port, and the third polarization signal is diffracted to the first power detection port. Referring to FIG. 5, the optical device controls, by using the switching engine 301, an electrode in a pixel region corresponding to each light spot, and loads periodic phase information in the dispersion direction to a pixel in the pixel region corresponding to the light spot. Therefore, an operating principle of the switching engine 301 is similar to that of a reflector that performs deflection by a specified angle in the dispersion direction returning, according to an original input optical-path, the third polarization signal that enters the reflector, and deviating, from an original input optical-path and an original output optical-path, the second polarization signal that enters the reflector, so that the second polarization signal cannot be returned according to the original input or output optical-path, that is, the second polarization signal is dissipated. In this way, the third polarization signal can be diffracted to the first power detection port, and the second polarization signal cannot be diffracted to the first power detection port, that is, a power of the second polarization signal received by the first power detection port is 0.

The switching engine of the optical device loads the phase information in the dispersion direction on a basis of loading the phase information in the switching direction, so that in a process of diffracting both the second polarization signal and the third polarization signal in the corresponding optical signal that forms each light spot to the first power detection port, the second polarization signal cannot be diffracted to the first power detection port, and only the third polarization signal is diffracted to the first power detection port, or similarly, the third polarization signal cannot be diffracted to the second power detection port, and only the second polarization signal is diffracted to the second detection port. In this way, the first output power corresponding to the third polarization signal may be detected by using the first power detection port, and the second output power corresponding to the second polarization signal may be detected by using the second power detection port.

The specified energy proportion may also vary based on different types of optical signals input to the optical device. A type of an optical signal input to the optical device may include a service signal or a test signal. The service signal is used to carry a network service and detect the PDL of the optical device. The test signal is used only to test the PDL of the optical device, but is not used to carry a network service. Specified proportions for the two types are separately described below.

When the optical signal input to the optical device is a service signal, the specified energy proportion needs to ensure a normal function of the optical device, and the specified energy proportion may be set to be not greater than a first specified proportion threshold. For example, the first specified proportion threshold may be 20% or 30%. A part of region in the target region other than the first region and the second region may be a region used for port switching for the optical signal, and is used to transmit an optical signal forming this part of region to a signal output port, that is, perform normal port switching, to carry a network service, thereby ensuring normal transmission of the service signal. Therefore, according to the PDL determining method provided in this embodiment of this application, the PDL of the optical device can be detected while the optical device carries the network service.

When the optical signal input to the optical device is a test signal, the specified energy proportion may be not greater than a second specified proportion threshold. For example, the second specified proportion threshold may be 50%. A part of region in the target region other than the first region and the second region may be an idle region (that is, an unused region).

Figure 6:
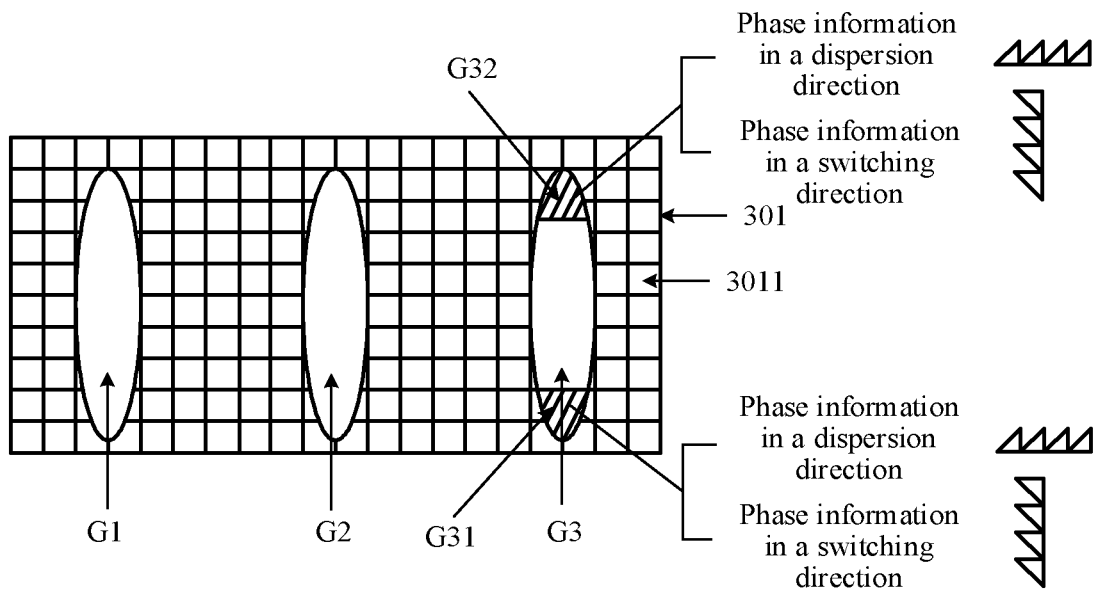
FIG. 6 is a schematic diagram of a light spot formed on another switching engine according to an embodiment of this application.

FIG. 6 shows distribution of some light spots on the switching engine. In the figure, three light spots are formed on the switching engine 201, and correspond to three target regions: a target region G1, a target region G2, and a target region G3. Using the target region G3 as an example, the target region G3 is divided into a first region G31 and a second region G32 with a specified proportion. The optical device may load first phase information and third phase information (that is, phase information in a dispersion direction and phase information in a switching direction that are shown in FIG. 6) to both a second polarization signal and a third polarization signal that correspond to the first region G31, and load second phase information and fourth phase information (that is, phase information in a dispersion direction and phase information in a switching direction that are shown in FIG. 5) to both a second polarization signal and a third polarization signal that correspond to the second region G32. The switching engine 301 includes a plurality of pixels 3011.

Optionally, the first phase information, the second phase information, the third phase information, and the fourth phase information may all be periodic phase information.

In a third optional phase loading manner, when at least three power detection ports are disposed in the optical device, two power detection ports serve as actual power detection ports, and a remaining power detection port is idle. In this case, for implementation processes of step X1 and step X2, refer to the second optional phase loading manner. Details are not described in this embodiment of this application again.

In the second optional implementation, the optical device includes a polarization processing apparatus, the polarization processing apparatus may be a polarization splitter or a half-wave plate, there are two power detection ports in total, the two power detection ports include a first power detection port and a second power detection port, and the optical device loads phase information by using the switching engine, and finally transmits a specified polarization signal to a specified detection port by using the polarization processing apparatus.

For example, step X1 may include step X13: For the target region in which each light spot is located, the optical device loads, by using the switching engine, third phase information to the second polarization signal and the third polarization signal that correspond to the first region, so that the third polarization signal and the second polarization signal that correspond to the first region are transmitted in a direction toward the first power detection port, and the second polarization signal corresponding to the first region is transmitted in a direction away from the first power detection port by using the polarization processing apparatus, and an optical power detector connected to the first power detection port detects the first output power of the received third polarization signal. Step X2 may include step X23: For the target region in which each light spot is located, the optical device loads, by using the switching engine, fourth phase information to the second polarization signal and the third polarization signal that correspond to the second region, so that the third polarization signal and the second polarization signal that correspond to the second region are transmitted in a direction toward the second power detection port, and the third polarization signal corresponding to the second region is transmitted in a direction away from the second power detection port by using the polarization processing apparatus, and an optical power detector connected to the second power detection port detects the second output power of the received second polarization signal.

A third direction in which the third phase information is loaded is perpendicular to a propagation direction of the optical signal input to the optical device. A fourth direction in which the fourth phase information is loaded is perpendicular to the propagation direction of the optical signal input to the optical device. The third direction and the fourth direction are switching directions. The switching direction is perpendicular to a dispersion direction. The dispersion direction is an arrangement direction of at least one light spot formed on the switching engine by optical signals with different wavelengths in a polarization signal.

It should be noted that the polarization processing apparatus may allow a polarization signal in a specified polarization direction to pass, while deflecting a propagation direction of a polarization signal in another polarization direction.

Figure 7:
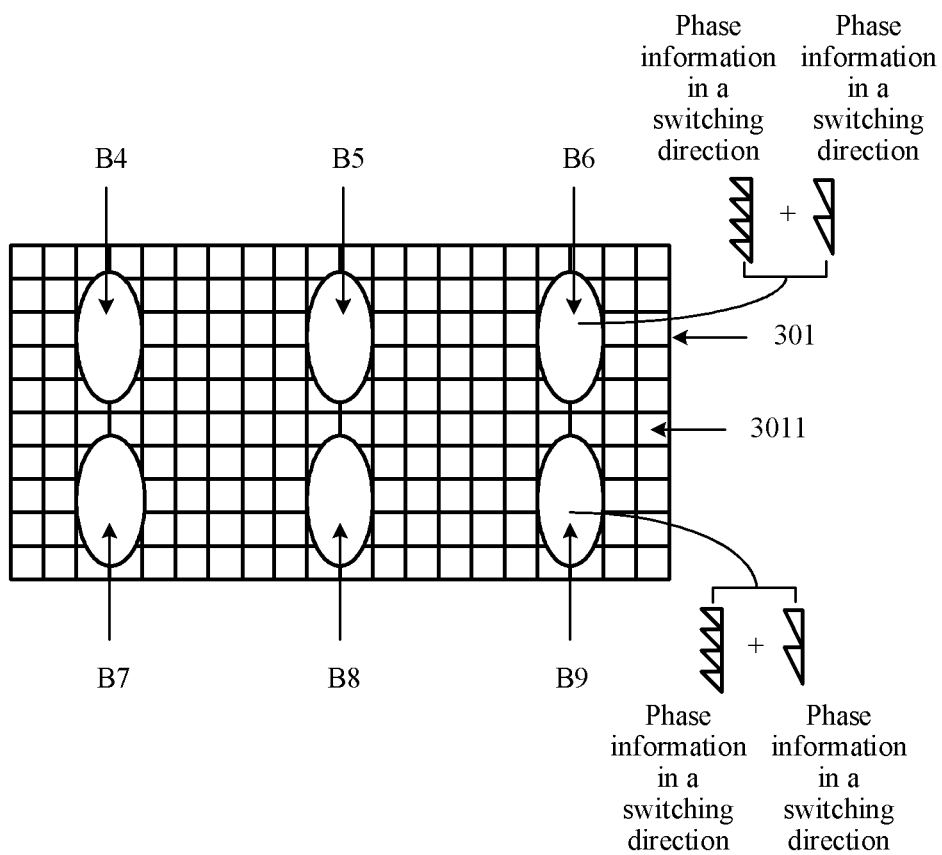
FIG. 7 is a schematic diagram of a light spot formed on another switching engine according to an embodiment of this application.

In a second implementation, the second polarization signal may form at least one first light spot on the switching engine, the third polarization signal may form at least one second light spot on the switching engine, the at least one first light spot and the at least one second light spot formed on the switching engine by the second polarization signal and the third polarization signal do not coincide, and dispersion directions of the at least one first light spot and the at least one second light spot are the same. FIG. 7 shows distribution of some light spots in the case in which the at least one first light spot and the at least one second light spot formed on the switching engine by the second polarization signal and the third polarization signal do not coincide. In FIG. 7, a light spot B4, a light spot B5, and a light spot B6 in an upper row are all first light spots, and a light spot B7, a light spot B8, and a light spot B9 in a lower row are all second light spots. The switching engine 301 includes a plurality of pixels 3011. A process of detecting the first output power of the third polarization signal and the second output power of the second polarization signal by using the power detection port may include the following steps.

Step Y1: For a first target region in which each first light spot is located, the optical device loads, by using the switching engine, first phase information and third phase information to a third polarization signal corresponding to the first target region, so that a signal with the specified energy proportion in the third polarization signal corresponding to the first target region is transmitted to the power detection port, and an optical power detector connected to the power detection port detects a first output power of the received third polarization signal.

Step Y2: For a second target region in which each second light spot is located, the optical device loads, by using the switching engine, second phase information and fourth phase information to a second polarization signal corresponding to the second target region, so that a signal with the specified energy proportion in the second polarization signal corresponding to the second target region is transmitted to the power detection port, and the optical power detector connected to the power detection port detects a second output power of the received second polarization signal.

A direction in which the optical device loads the first phase information, a direction in which the optical device loads the second phase information, a direction in which the optical device loads the third phase information, and a direction in which the optical device loads the fourth phase information are all the same and are all switching directions. The switching direction is perpendicular to a propagation direction of the optical signal input to the optical device and is perpendicular to the dispersion direction. FIG. 7 schematically shows a case in which two types of phase information in a switching direction are loaded to a third polarization signal corresponding to the first light spot B6, and two types of phase information in a switching direction are loaded to a second polarization signal corresponding to a second light spot B9.

Further, similar to the first implementation of transmitting a specified polarization signal to a detection port in the first implementation, because one or more power detection ports may be disposed in the optical device, a quantity of power detection ports varies, and a phase loading manner in step Y1 and step Y2 also varies.

In a first optional phase loading manner, when one power detection port is disposed in the optical device, in step Y1 and step Y2, the optical device transmits, to a same power detection port, a signal with the specified energy proportion in the third polarization signal corresponding to the first target region, and a signal with the specified proportion in the second polarization signal corresponding to the second target region. To still ensure that the first output power and the second output power can be effectively detected, the optical device may set a loading time period of the first phase information and the third phase information and a loading time period of the second phase information and the fourth phase information to different loading time periods. In this way, the optical power detector connected to the power detection port may detect the first output power of the third polarization signal in one time period, and the optical power detector connected to the power detection port may detect the second output power of the second polarization signal in another specified time period.

It should be noted that, one of the first phase information and the third phase information that are loaded by the switching engine to the third polarization signal corresponding to the first target region may enable the signal with the specified energy proportion in the third polarization signal to be transmitted to the power detection port for determining the PDL of the optical device, and the other phase information enables a signal (or a residual energy signal) in the third polarization signal other than the signal with the specified energy proportion to be transmitted to a signal output port for normal port switching. Similarly, one of the second phase information and the fourth phase information that are loaded by the switching engine to the second polarization signal corresponding to the second target region may enable the signal with the specified energy proportion in the second polarization signal to be transmitted to the power detection port for determining the PDL of the optical device, and the other phase information enables the signal with the specified energy proportion in the second polarization signal to be transmitted to a signal output port for normal port switching.

In a second optional phase loading manner, when two power detection ports are disposed in the optical device, that is, when a first detection port and a second detection port are disposed in the optical device, step Y1 may include step Y11: For the first target region in which each first light spot is located, the optical device may load, by using the switching engine, the first phase information and a third phase direction to the third polarization signal corresponding to the first target region, so that the signal with the specified energy proportion in the third polarization signal corresponding to the first target region is transmitted to the first power detection port, and an optical power detector connected to the first power detection port may detect the first output power of the received third polarization signal. Step Y2 may include step Y21: For the second target region in which each second light spot is located, the optical device may load, by using the switching engine, the second phase information and the fourth phase information to the second polarization signal corresponding to the second target region, so that the signal with the specified energy proportion in the second polarization signal corresponding to the second target region is transmitted to the second power detection port, and an optical power detector connected to the second power detection port may detect the second output power of the received second polarization signal.

The second polarization signal and the third polarization signal form the at least one first light spot and the at least one second light spot on the switching engine respectively, and the at least one first light spot does not coincide with the at least one second light spot. Therefore, when the second polarization signal and the third polarization signal have been separated, phase information in the dispersion direction does not need to be loaded in the first target region in which the first light spot is located or the second target region in which the second light spot is located, and only phase information in the switching direction needs to be loaded, so that the signal with the specified proportion in the third polarization signal is transmitted to the first power detection port, and the signal with the specified proportion in the second polarization signal is transmitted to the second power detection port.

It should be noted that, when the optical signal input to the optical device is a service signal, to ensure normal transmission of the service signal, the specified energy proportion may be not greater than a first specified proportion threshold, for example, the first specified proportion threshold may be 20% or 30%, or when the optical signal input to the optical device is a test signal, the specified proportion may be not greater than a second specified proportion threshold, for example, the second specified proportion threshold is 50%. During actual implementation of this embodiment of this application, two types of phase information in the switching direction may be separately loaded to the third polarization signal corresponding to the first target region and the second polarization signal corresponding to the second target region, so that a part of energy of the service signal is used for port switching, and the other part of energy is used for detecting the PDL of the optical device.

In a third optional phase loading manner, when at least three power detection ports are disposed in the optical device, two power detection ports serve as actual power detection ports, and a remaining power detection port is idle (that is, not operating). In this case, for implementation processes of step Y1 and step Y2, refer to the second optional phase loading manner. Details are not described in this embodiment of this application again.

Step 204: Select one group of target optical powers that satisfy a same power constraint from the two groups of optical powers, where the target optical powers include a first target power and a second target power respectively from the two groups of optical powers.

Based on different power constraints, optical powers that satisfy the power constraint and that are selected from the two groups of optical powers may vary, and further, a manner of obtaining the first target power and the second target power by the optical device may vary. In this embodiment of this application, the following two manners of selecting optical powers that satisfy the power constraint from the two groups of optical powers are used as examples to describe the manner of obtaining the first target power and the second target power by the optical device.

In a first manner of obtaining the first target power and the second target power, an optical power, in each of the two groups of optical powers, that satisfies the power constraint may be any one of a maximum output power, a minimum output power, an average value of output powers, and a weighted average value of output powers within the first duration.

An example in which the optical power satisfying the power constraint is the maximum output power within the first duration is used for description. A process of selecting one group of target optical powers that satisfy the same power constraint from the two groups of optical powers may include selecting a maximum output power within the first duration from the first output power, and selecting a maximum output power within the first duration from the second output power, where the two maximum output powers are optical powers satisfying the same power constraint, the maximum output power within the first duration that is selected from the first output power may be the first target power, the maximum output power within the first duration that is selected from the second output power may be the second target power, and the first target power and the second target power form the group of target optical powers.

Figure 8:
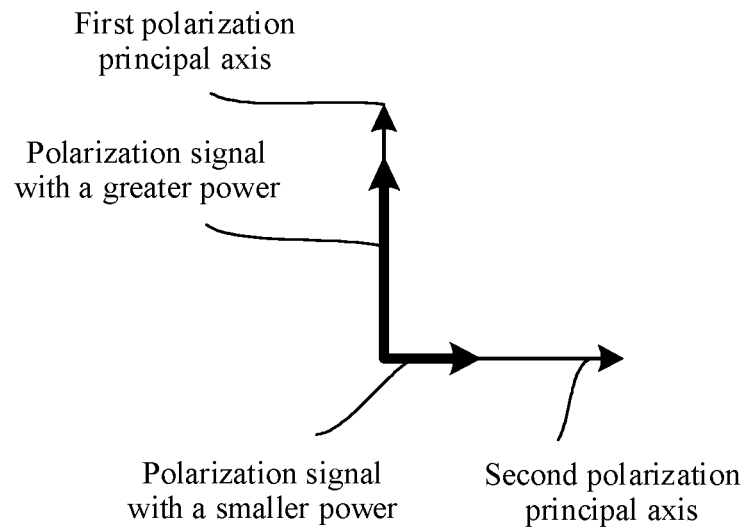
FIG. 8 is a schematic diagram in which a polarization signal overlaps with or is perpendicular to a polarization principal axis according to an embodiment of this application.
Figure 9:
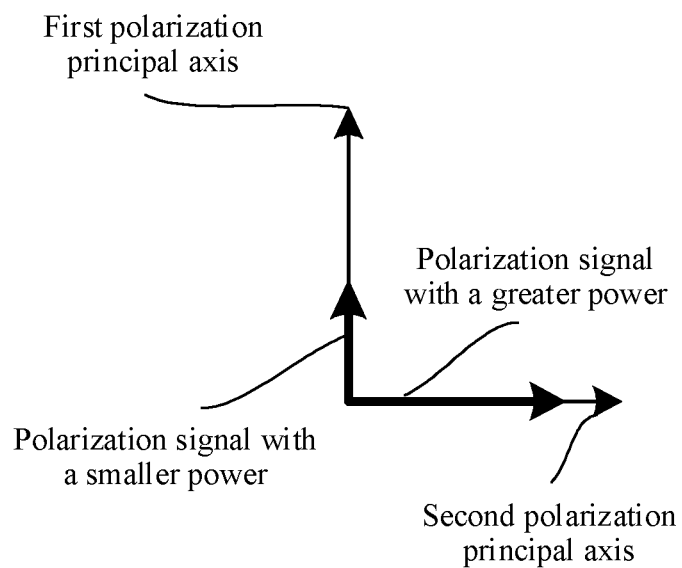
FIG. 9 is another schematic diagram in which a polarization signal overlaps with or is perpendicular to a polarization principal axis according to an embodiment of this application.

For example, a principle of selecting the maximum output power from each of the first output power and the second output power is as follows. The optical device has two polarization principal axes that are orthogonal and perpendicular: a first polarization principal axis and a second polarization principal axis, and the optical signal input to the optical device is an optical signal whose polarization direction changes in a random manner and can traverse all polarization directions. Therefore, at a specific moment, a polarization direction of a polarization signal with a greater power in the optical signal coincides with a polarization principal axis of the optical device. In this case, as shown in FIG. 8, when the polarization direction of the polarization signal with the greater power in the optical signal coincides with the first polarization principal axis, a maximum output power of a first polarization-principal-axis optical path is measured, or as shown in FIG. 9, when a polarization direction of a polarization signal with a greater power in the optical signal coincides with the second polarization principal axis, a maximum output power of a second polarization-principal-axis optical path is measured.

On a basis of this principle, in the first manner of obtaining the first target power and the second target power by the optical device, the optical device may obtain two maximum output powers of all output powers detected within the first duration, that is, a maximum power of output powers of the first polarization-principal-axis optical path and a maximum power of output powers of the second polarization-principal-axis optical path, and determine the two output powers as the first target power and the second target power.

Further, an example in which the optical power satisfying the power constraint is the minimum output power within the first duration is used for description. For a process of selecting one group of target optical powers that satisfy the same power constraint from the two groups of optical powers, refer to the foregoing case in which the optical power satisfying the power constraint is the maximum output power within the first duration. Referring to the foregoing principle, as shown in FIG. 9, when a polarization direction of a polarization signal with a smaller power in the optical signal is perpendicular to the first polarization principal axis, a minimum output power of a first polarization-principal-axis optical path is detected, or as shown in FIG. 8, when a polarization direction of a polarization signal with a smaller power in the optical signal is perpendicular to the second polarization principal axis, a minimum output power of a second polarization-principal-axis optical path is detected.

In this case, on a basis of this principle, in the first manner of obtaining the first target power and the second target power by the optical device, the optical device may obtain two minimum output powers of all output powers detected within the first duration, that is, a minimum power of output powers of the first polarization-principal-axis optical path and a minimum power of output powers of the second polarization-principal-axis optical path, and determine the two output powers as the first target power and the second target power, where the first target power and the second target power form the group of target optical powers.

In a second manner of obtaining the first target power and the second target power, optical powers, in the two groups of optical powers, that satisfy the power constraint may be powers whose probabilities are a specified probability and that are at same locations in probability distribution curves of the two groups of optical powers, where the probability distribution curve is used to reflect occurrence probabilities of different optical powers.

First, the probability distribution curves (or probability distribution histograms) of the two groups of optical powers may be obtained by collecting statistics. Then two optical powers whose probabilities are the specified probability and that are at same locations may be selected from the probability distribution curves (or the probability distribution histograms) of the two groups of optical powers, to obtain the optical powers that satisfy the same power constraint.

Figure 10:
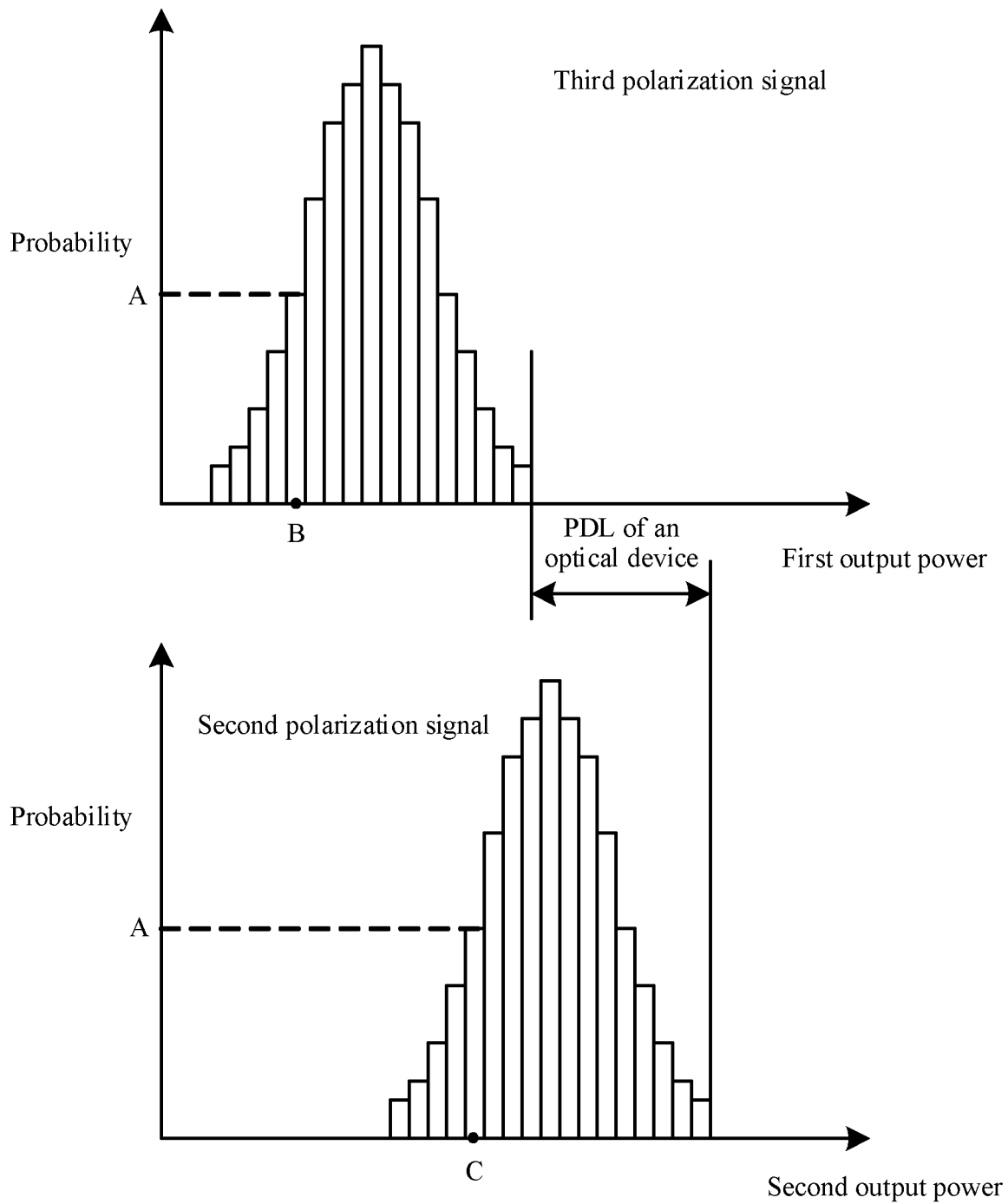
FIG. 10 is a schematic diagram in which different power values in a first output power and a second output power are distributed based on probabilities according to an embodiment of this application.

FIG. 10 shows the probability distribution histograms, obtained by collecting statistics, of the two groups of optical powers. A probability distribution histogram in an upper region shows the first output power in the two groups of optical powers. A probability distribution histogram in a lower region shows the second output power in the two groups of optical powers.

Two optical powers whose probabilities are a probability A and that are each located in a probability rising stage on a left side of each probability distribution histogram are selected from the two probability distribution histograms. As shown in FIG. 10, the two optical powers are an optical power B and an optical power C. The optical power B is the first target power, and the optical power C is the second target power. An absolute value of a difference between the first target power and the second target power, that is, |B-C|, is determined as the PDL of the optical device.

The optical power B and the optical power C each may be a power value or a power range (or may be considered as a power interval, where a width of the power interval is less than a specified threshold). When the optical power B and the optical power C each are a power range, the PDL of the optical device that is determined based on the optical power B and the optical power C may also be a PDL within a range.

During actual implementation of this embodiment of this application, polynomial curve fitting may be further performed on occurrence probabilities of different power values in the first output power in the two groups of optical powers to obtain a first curve, and polynomial curve fitting may be further performed on occurrence probabilities of different power values in the second output power in the two groups of optical powers to obtain a second curve. The PDL of the optical device is calculated based on a difference between the first curve and the second curve. For example, the PDL of the optical device is calculated based on a difference between a maximum value of the first curve and a maximum value of the second curve, or the PDL of the optical device is calculated based on a difference between a minimum value of the first curve and a minimum value of the second curve.

Certainly, in the second manner of obtaining the first target power and the second target power by the optical device, a maximum output power and a minimum output power may also be directly obtained by using the probability distribution curves of the two groups of optical powers. For example, in each of the probability distribution histograms corresponding to the two groups of optical powers in FIG. 10, all powers on a leftmost side of the probability distribution histogram are minimum output powers, and all powers on a rightmost side of the probability distribution histogram are maximum output powers.

In step 204, the optical device may determine, in the first polarization-principal-axis optical path of the first polarization signal and the second polarization-principal-axis optical path of the second polarization signal, a polarization-principal-axis optical path on which a polarization signal is subject to a greater insertion loss, and a polarization-principal-axis optical path on which a polarization signal is subject to a smaller insertion loss, so that compensation can be performed on the insertion loss of the polarization signal in a subsequent step, to reduce the PDL.

Step 205: Determine an absolute value of a difference between the first target power and the second target power as the PDL of the optical device.

FIG. 10 schematically illustrates a case in which a difference between maximum output powers in the two groups of optical powers is the PDL of the optical device. Another case is not described in detail in this embodiment of this application.

It should be noted that, when the two groups of optical powers are optical-path output powers of the two polarization principal axes of the optical device, each optical power in the two groups of optical powers may be a signal with any wavelength in polarization signals of the two polarization principal axes. Because each light spot may correspond to one wavelength, phase information may be loaded to a polarization signal corresponding to the light spot in a time-division manner, so that an optical signal output to a specified power detection port at a specific moment is a signal corresponding to a specific light spot (that is, a signal with a specific wavelength), and a PDL of the optical device at the wavelength is determined based on an optical-path output power at the wavelength.

To sum up, in the first PDL determining method, the first output power corresponding to the first polarization-principal-axis optical path of the first polarization signal and the second output power corresponding to the second polarization-principal-axis optical path of the second polarization signal can be detected, and the PDL of the optical device is determined based on the first output power and the second output power, so that the PDL of the optical device can be accurately determined on a basis of ensuring a function of the optical device. In addition, because a polarization-principal-axis optical path with a greater insertion loss can be accurately determined, compensation can be performed on the PDL more accurately and in a subsequent step.

Figure 11:
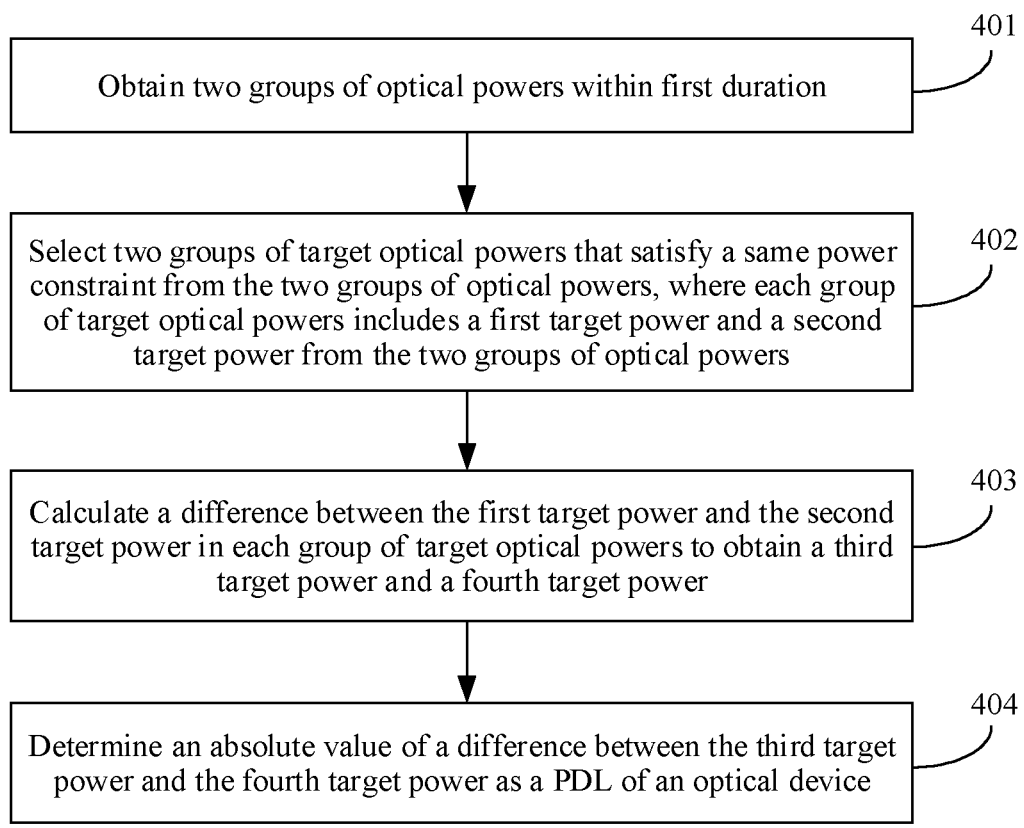
FIG. 11 is a method flowchart of still another PDL determining method according to an embodiment of this application.

An embodiment of this application further provides a second PDL determining method. The PDL determining method is applicable to the second type of optical device, that is, an optical device that cannot directly detect optical-path output powers of two polarization principal axes of the optical device by using an optical power detector. As shown in FIG. 11, the method may further include the following steps.

Step 401: Obtain two groups of optical powers within first duration.

An optical power satisfying a same power constraint exists in each of the two groups of optical powers within the first duration. The two groups of optical powers are an input power for inputting a first optical signal to the optical device and an output power for outputting the first optical signal from the optical device. The first optical signal is a signal with any wavelength in an optical signal input to the optical device, and the first optical signal is any polarization signal in a polarization multiplexing signal, or the first optical signal is a single-polarization signal. An optical power, in each of the two groups of optical powers, that satisfies the power constraint is either a maximum power or a minimum power within the first duration. To be specific, in the two groups of optical powers, a power, satisfying the power constraint, of input powers for inputting the first optical signal to the optical device is a maximum input power within the first duration or a minimum input power within the first duration, and a power, satisfying the power constraint, of output powers for outputting the first optical signal from the optical device is a maximum output power within the first duration or a minimum input power within the first duration. Step 401 may be performed by an optical power detector.

Step 402: Select two groups of target optical powers that satisfy a same power constraint from the two groups of optical powers, where each group of target optical powers includes a first target power and a second target power respectively from the two groups of optical powers.

When the optical power satisfying the power constraint is the maximum power within the first duration, the target optical powers satisfying the same power constraint are the maximum input power of the input powers of the first optical signal and the maximum output power of the output powers of the first optical signal. When the optical power satisfying the power constraint is the minimum power within the first duration, the target optical powers satisfying the same power constraint are a minimum optical-path input power of optical-path input powers of the first optical signal and a minimum optical-path output power of optical-path output powers of the first optical signal.

A process of selecting the two groups of target optical powers that satisfy the same power constraint from the two groups of optical powers may include the following steps.

Step Z1: Obtain a probability distribution curve corresponding to each group of optical powers, where the probability distribution curve is used to reflect occurrence probabilities of different optical powers.

Figure 12:
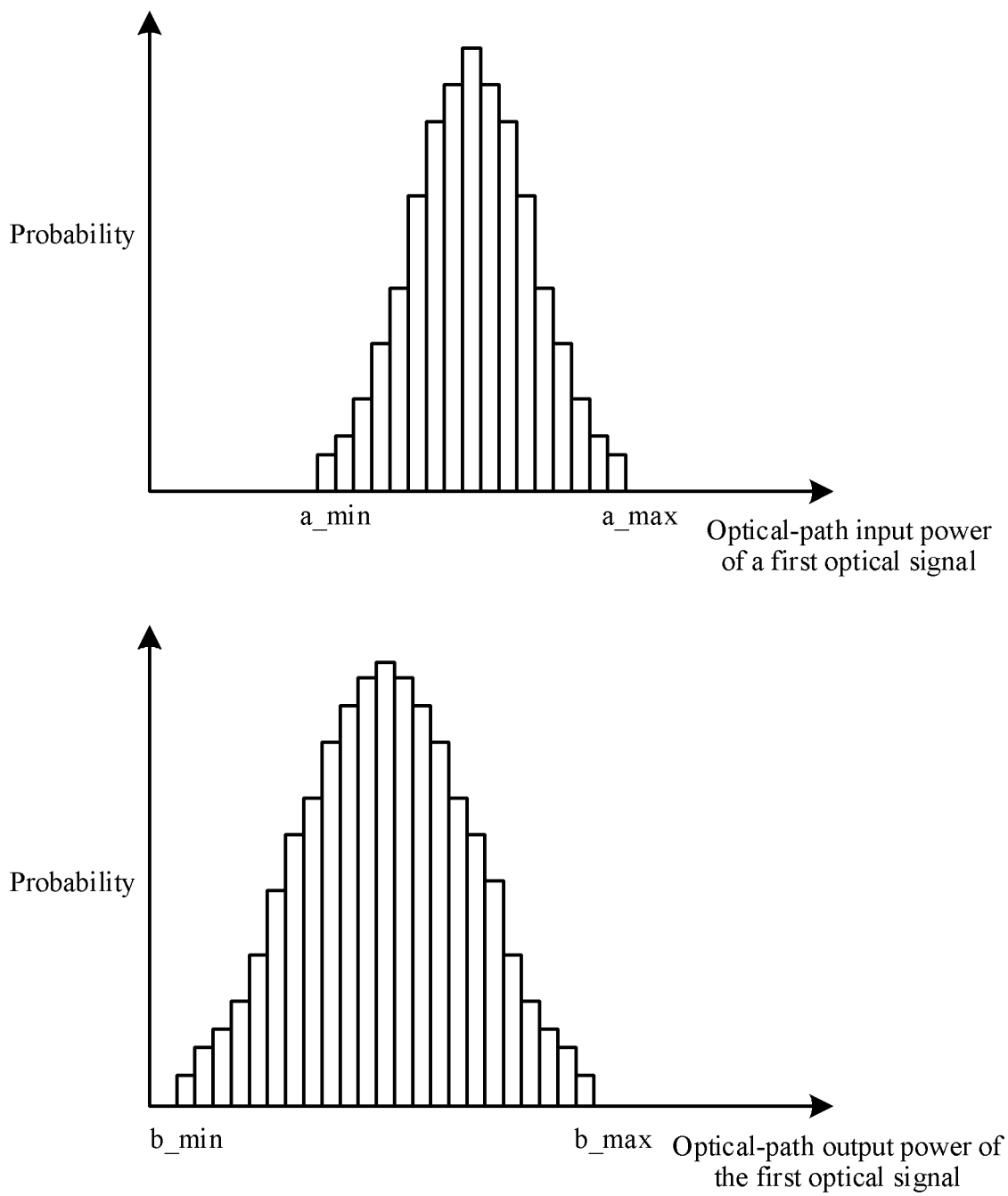
FIG. 12 is another schematic diagram in which different power values in an optical-path input power of a first optical signal and an optical-path output power of a second optical signal are distributed based on probabilities according to an embodiment of this application.

Certainly, a probability distribution histogram corresponding to each group of optical powers may be alternatively obtained. FIG. 12 shows a probability distribution histogram corresponding to the input power for inputting the first optical signal to the optical device and a probability distribution histogram corresponding to the output power for inputting the first optical signal to the optical device.

Step Z2: Determine, in two probability distribution curves corresponding to the two groups of optical powers, at least one group of optical powers that satisfy the same power constraint as the target optical powers.

Because the probability distribution curve is established based on the optical powers within the first duration and the occurrence probabilities of different optical powers, two endpoints of the probability distribution curve can represent the maximum power within the first duration or the minimum power within the first duration. For example, FIG. 12 shows a minimum input power a_min and a maximum input power a_max in a first group of optical powers within the first duration, and a minimum output power b_min and a maximum output power b_max in a second group of optical powers within the first duration.

Step 403: Calculate a difference between the first target power and the second target power in each group of target optical powers to obtain a third target power and a fourth target power.

Step 404: Determine an absolute value of a difference between the third target power and the fourth target power as a PDL of the optical device.

For example, the first target power is an optical-path input power, and the second target power is an optical-path output power. The two groups of target optical powers that satisfy the same power constraint are as follows: the minimum input power a_min in the first group of optical powers within the first duration, and the minimum output power b_min in the second group of optical powers within the first duration, the maximum input power a_max in the first group of optical powers within the first duration, and the maximum output power b_max in the second group of optical powers within the first duration. In this case, the third target power is b_min−a_min, the fourth target power is b_max−a_max, and the PDL of the optical device is |(b_max−a_max)−(b_min−a_min)|.

An optical signal input to the optical device is an optical signal whose polarization direction changes in a random manner and can traverse all polarization directions. Certainly, the first optical signal is a signal with any wavelength in the optical signal input to the optical device, and the first optical signal is any polarization signal in a polarization multiplexing signal, or the first optical signal is a single-polarization signal. At a specific moment, when the first optical signal input to the optical device has the minimum input power a_min, a polarization direction is aligned with a polarization principal axis, of the optical device, with a greater insertion loss. At this moment, the first optical signal output from the optical device has the minimum output power b_min. In this case, b_min−a_min is an insertion loss of the polarization principal axis, of the optical device, with the greater insertion loss, that is, the third target power is b_min−a_min. At another moment, when the first optical signal input to the optical device has the maximum input power a_max, a polarization direction is aligned with a polarization principal axis, of the optical device, with a smaller insertion loss. At this moment, the first optical signal output from the optical device has the maximum output power value b_max. In this case, b_max−a_max is an insertion loss of the polarization principal axis, of the optical device, with the smaller insertion loss, that is, the fourth target power is b_max−a_max. In this case, a PDL, corresponding to the wavelength, of the optical device is |(b_max−a_max)−(b_min−a_min)|.

Alternatively, the third target power may be b_max−b_min, and the fourth target power is a_max−a_min. In this case, correspondingly, a PDL, corresponding to the wavelength, of the optical device is |(b_max-b_min)−(a_max−a_min)|.

To sum up, in the second PDL determining method, an input power and an output power of any polarization signal in a polarization multiplexing signal with any wavelength in an optical signal input to the optical device, or an input power and an output power of a single-polarization signal with any wavelength in an optical signal input to the optical device may be detected, target optical powers satisfying a same power constraint are selected from the powers, and then a PDL of the optical device is determined based on the target optical powers, so that the PDL of the optical device can be accurately determined on a basis of ensuring a function of the optical device.

On a basis of determining the PDL of the optical device, an embodiment of this application further provides a PDL compensation method. The method may include compensating for the PDL of the optical device based on the determined PDL of the optical device.

As described above, an actual transmission optical-path of a polarization signal in the optical device deviates from an ideal transmission optical-path, resulting in energy losses of some polarization signals and more insertion losses. In addition, the first polarization-principal-axis optical path of the first polarization signal and the second polarization-principal-axis optical path of the second polarization signal are subject to different insertion losses, thereby causing the PDL of the optical device. Therefore, a difference between an actual transmission optical-path and an ideal transmission optical-path of each of the first polarization signal and the second polarization signal in the optical device may be adjusted to reduce a difference between insertion losses to which the first polarization signal and the second polarization signal are subject, so as to compensate for the PDL of the optical device.

A difference between a first target power and a second target power may be reduced to reduce the PDL of the optical device, that is, compensate for the PDL of the optical device. This embodiment of this application provides two manners of compensating for the PDL of the optical device. A first manner of compensating for the PDL of the optical device may be applied to the first type of optical device. A second manner of compensating for the PDL of the optical device may be applied to the foregoing two types of optical devices.

In a compensation manner, a correspondence may be queried based on the first target power and the second target power in step 204, to compensate for the PDL of the optical device. The two groups of optical powers in step 201 are the optical-path output powers of the two polarization principal axes of the optical device, and the step includes the following sub-steps.

Step A1: Query, based on the PDL, a correspondence between a PDL and an adjustment angle, where the adjustment angle is an angle by which a propagation angle of an optical signal is adjusted.

Step A2: When the PDL is recorded in the correspondence, determine an adjustment angle corresponding to the PDL.

Step A3: Compensate for the PDL of the optical device based on the adjustment angle.

A process of compensating for the PDL is actually a process of separately adjusting insertion losses generated by the optical device on the first polarization-principal-axis optical path through which the first polarization signal passes and the second polarization-principal-axis optical path through which the second polarization signal passes, to reduce a difference between the two insertion losses. The absolute value of the difference between the first target power and the second target power is the difference between the insertion losses separately generated by the optical device on the first polarization-principal-axis optical path through which the first polarization signal passes and the second polarization-principal-axis optical path through which the second polarization signal passes. The optical device may prestore correspondences between absolute values of a plurality of differences and adjustment angles. After the optical device determines an absolute value of a difference, an adjustment angle corresponding to the absolute value of the difference may be queried in the correspondences, and compensation may be performed on the PDL of the optical device based on the adjustment angle.

Manners of compensating for the optical device based on the adjustment angle may include the following two manners.

First manner: For a target region in which each light spot is located, load, by using the switching engine, third phase information to a fourth polarization signal corresponding to the target region, so that a first included angle is increased by the adjustment angle, where the first included angle is an included angle between an actual transmission optical-path through which the fourth polarization signal is reflected from the switching engine and an ideal transmission optical-path through which the fourth polarization signal is reflected from the switching engine.

Second manner: For a target region in which each light spot is located, load, by using the switching engine, fourth phase information to a fifth polarization signal corresponding to the target region, so that a second included angle is decreased by the adjustment angle, where the second included angle is an included angle between an actual transmission optical-path through which the fifth polarization signal is reflected from the switching engine and an ideal transmission optical-path through which the fifth polarization signal is reflected from the switching engine.

The fourth polarization signal is a polarization signal, in the first polarization signal and the second polarization signal, that has a greater maximum-first-output-power within the first duration. The fifth polarization signal is a polarization signal, in the first polarization signal and the second polarization signal, that has a smaller maximum-first-output-power within the first duration. A direction in which the third phase information is loaded and a direction in which the fourth phase information is loaded are both the same as or perpendicular to the dispersion direction.

Usually, a polarization signal on a polarization-principal-axis optical path with a greater target output power is subject to a smaller insertion loss, and a polarization signal on a polarization-principal-axis optical path with a smaller target output power is subject to a greater insertion loss. Therefore, a polarization signal with a greater maximum-first-output-power within the first duration and a greater maximum-second-output-power within the first duration is subject to a smaller insertion loss, and a polarization signal with a smaller maximum-first-output-power within the first duration and a smaller maximum-second-output-power within the first duration is subject to a greater insertion loss. In the first PDL determining method for the first type of optical device, a polarization signal subject to a greater insertion loss and a polarization signal subject to a smaller insertion loss may be determined in two polarization signals, to further compensate for insertion losses on polarization-principal-axis optical paths through which the two polarization signals pass. The polarization signal subject to the greater insertion loss is the fifth polarization signal, and the polarization signal subject to the smaller insertion loss is the fourth polarization signal.

It is assumed that the second output power of the second polarization signal is greater than the first output power of the third polarization signal. Therefore, the second polarization signal is the fourth polarization signal, the third polarization signal is the fifth polarization signal, and an insertion loss to which the second polarization signal (namely, the fourth polarization signal) is subject is less than an insertion loss to which the third polarization signal (namely, the fifth polarization signal) is subject. After the PDL of the optical device is determined, the corresponding adjustment angle is obtained. In this case, a method of increasing the insertion loss to which the second polarization signal (namely, the fourth polarization signal) is subject or reducing the insertion loss to which the third polarization signal (namely, the fifth polarization signal) is subject may be used to compensate for the insertion loss.

It should be noted that, based on different optical design architectures of the optical device described in step 203, the direction in which the third phase information is loaded and the direction in which the fourth phase information is loaded may vary.

As described above, the direction in which the third phase information is loaded and the direction in which the fourth phase information is loaded may be both the same as or perpendicular to the dispersion direction.

In the first implementation of step 203, the second polarization signal may form the at least one light spot on the switching engine, the third polarization signal may form the at least one light spot on the switching engine, and the light spots formed on the switching engine by the second polarization signal and the third polarization signal coincide. In this case, the direction in which the third phase information is loaded and the direction in which the fourth phase information is loaded depend on a direction along which an input optical-path and an output optical-path of a transmission optical-path are symmetric. When the input optical-path and the output optical-path are symmetric along the dispersion direction (or referred to as being symmetric in the dispersion direction), the direction in which the third phase information is loaded and the direction in which the fourth phase information is loaded may be both the same as the dispersion direction. When the input optical-path and the output optical-path are symmetric along the switching direction, the direction in which the third phase information is loaded and the direction in which the fourth phase information is loaded may be both perpendicular to the dispersion direction, that is, the direction in which the third phase information is loaded and the direction in which the fourth phase information is loaded may be both the same as the switching direction.

Figure 13:
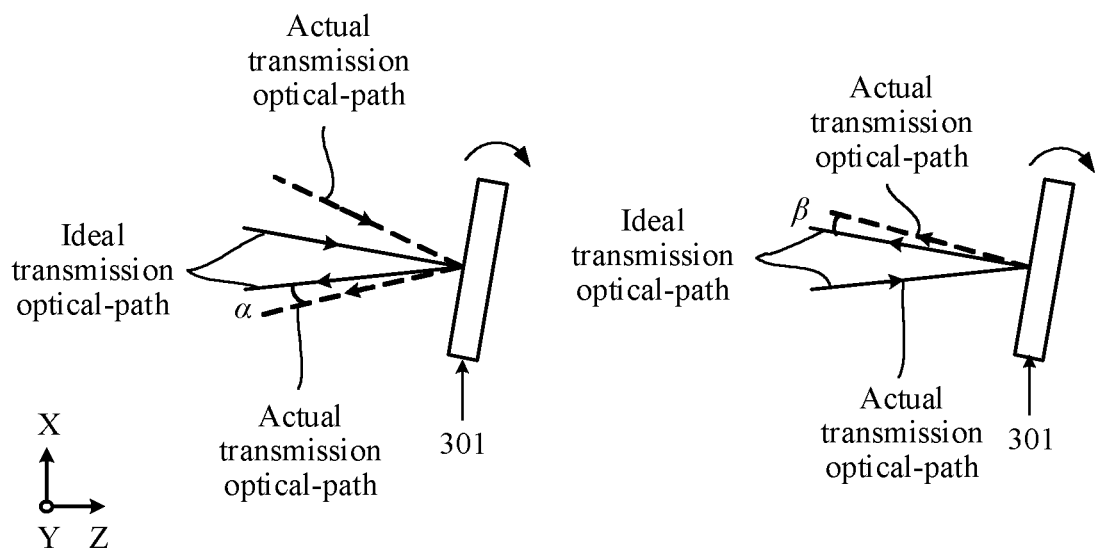
FIG. 13 is a schematic principle diagram of insertion loss adjustment according to an embodiment of this application.

For example, the input optical-path and the output optical-path of the transmission optical-path are symmetric along a dispersion direction X, that is, the input optical-path and the output optical-path are symmetric in the dispersion direction X. Refer to FIG. 13. A schematic principle diagram of reducing the insertion loss to which the third polarization signal (namely, the fifth polarization signal) is subject is shown on a left side of FIG. 13. The switching engine 301 is used to load the fourth phase information in the dispersion direction to the fifth polarization signal corresponding to the target region, so that an operating principle of the switching engine 301 is similar to that of a reflector that rotates by a second included angle α by using a switching direction Y as an axis, and the second included angle α can be decreased by the adjustment angle. A schematic principle diagram of increasing the insertion loss to which the second polarization signal (namely, the fourth polarization signal) is subject is shown on a right side of FIG. 13. The optical device loads, by using the switching engine, the third phase information in the dispersion direction to the fourth polarization signal corresponding to the target region, so that an operating principle of the switching engine 301 is similar to that of a reflector that rotates by a first included angle β by using a switching direction Y as an axis, and the first included angle β can be increased by the adjustment angle.

In the second implementation of step 203, the second polarization signal may form the at least one first light spot on the switching engine, the third polarization signal may form the at least one second light spot on the switching engine, and the at least one first light spot and the at least one second light spot formed on the switching engine by the second polarization signal and the third polarization signal do not coincide. In this case, the direction in which the third phase information is loaded and the direction in which the fourth phase information is loaded may be the dispersion direction or the switching direction. For a principle of compensating for an insertion loss when the direction in which the third phase information is loaded and the direction in which the fourth phase information is loaded are the switching direction, refer to related descriptions of FIG. 12. Details are not described herein again in this embodiment of this application.

In the second compensation manner, compensation may be performed on the PDL of the optical device based on whether an obtained current PDL of the optical device is less than a specified PDL threshold. The compensation includes the following step: perform a plurality of compensation processes until an obtained current PDL of the optical device is less than the specified PDL threshold.

The compensation process includes, for a target region in which each light spot is located, loading, by using the switching engine, fifth phase information to a polarization signal corresponding to the target region, where the fifth phase information makes a first included angle increase and a second included angle decrease, where the first included angle is an included angle between an actual transmission optical-path through which a fourth polarization signal is reflected from the switching engine and an ideal transmission optical-path through which the fourth polarization signal is reflected from the switching engine, the second included angle is an included angle between an actual transmission optical-path through which a fifth polarization signal is reflected from the switching engine and an ideal transmission optical-path through which the fifth polarization signal is reflected from the switching engine, the fourth polarization signal is a polarization signal, in the first polarization signal and the second polarization signal, that has a greater maximum-first-output-power within the first duration, the fifth polarization signal is a polarization signal, in the first polarization signal and the second polarization signal, that has a smaller maximum-first-output-power within the first duration, the third region is a region used for port switching for the optical signal, and a direction of the fifth phase information is the same as or perpendicular to the dispersion direction.

For the fourth polarization signal, the fifth polarization signal, and a manner of adjusting an included angle between an actual transmission optical-path and an ideal transmission optical-path, refer to the first compensation manner. Details are not described herein in this embodiment of this application.

It should be noted that, for the first type of optical device, the first compensation manner is a precise adjustment manner, and the second compensation manner is a compensation manner with coarse adjustment, and is a compensation manner with blind adjustment. When the first compensation manner is performed, when values recorded in the correspondence do not include a detected PDL value, the second compensation manner may be further performed.

Figure 14:
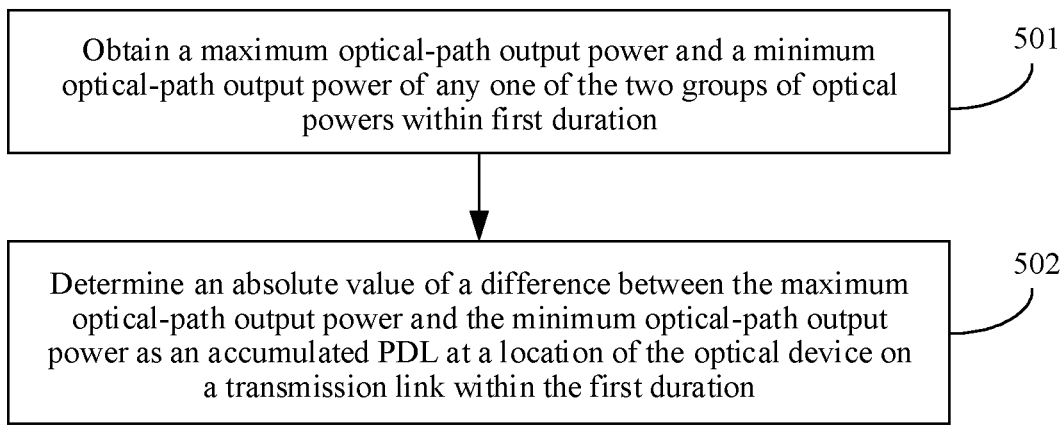
FIG. 14 is a flowchart of a method for determining an accumulated PDL at a location of an optical device on a transmission link within first duration according to an embodiment of this application.

During actual use of this embodiment of this application, the optical device may be disposed on an optical signal transmission link, and the PDL determining method provided in this embodiment of this application may be further used to determine an accumulated PDL (the accumulated PDL does not include a PDL of the optical device) before a location of the optical device on the transmission link. The accumulated PDL may be determined by using powers of a first polarization signal and a second polarization signal in an optical signal transmitted to the optical device. In this case, as shown in FIG. 14, a method for determining the accumulated PDL at the location of the optical device on the transmission link may further include the following steps.

Step 501: Obtain a maximum optical-path output power and a minimum optical-path output power of any one of two groups of optical powers within first duration.

Step 502: Determine an absolute value of a difference between the maximum optical-path output power and the minimum optical-path output power as the accumulated PDL at the location of the optical device on the transmission link within the first duration.

The first duration is duration in which a polarization direction of the optical signal input to the optical device can traverse all polarization directions.

In an example implementation, for a principle and a method for obtaining the maximum optical-path output power and the minimum optical-path output power in step

501, refer to the principle and the method for selecting the at least one group of target optical powers that satisfy the same power constraint from the two groups of optical powers in step 204.

Figure 15:
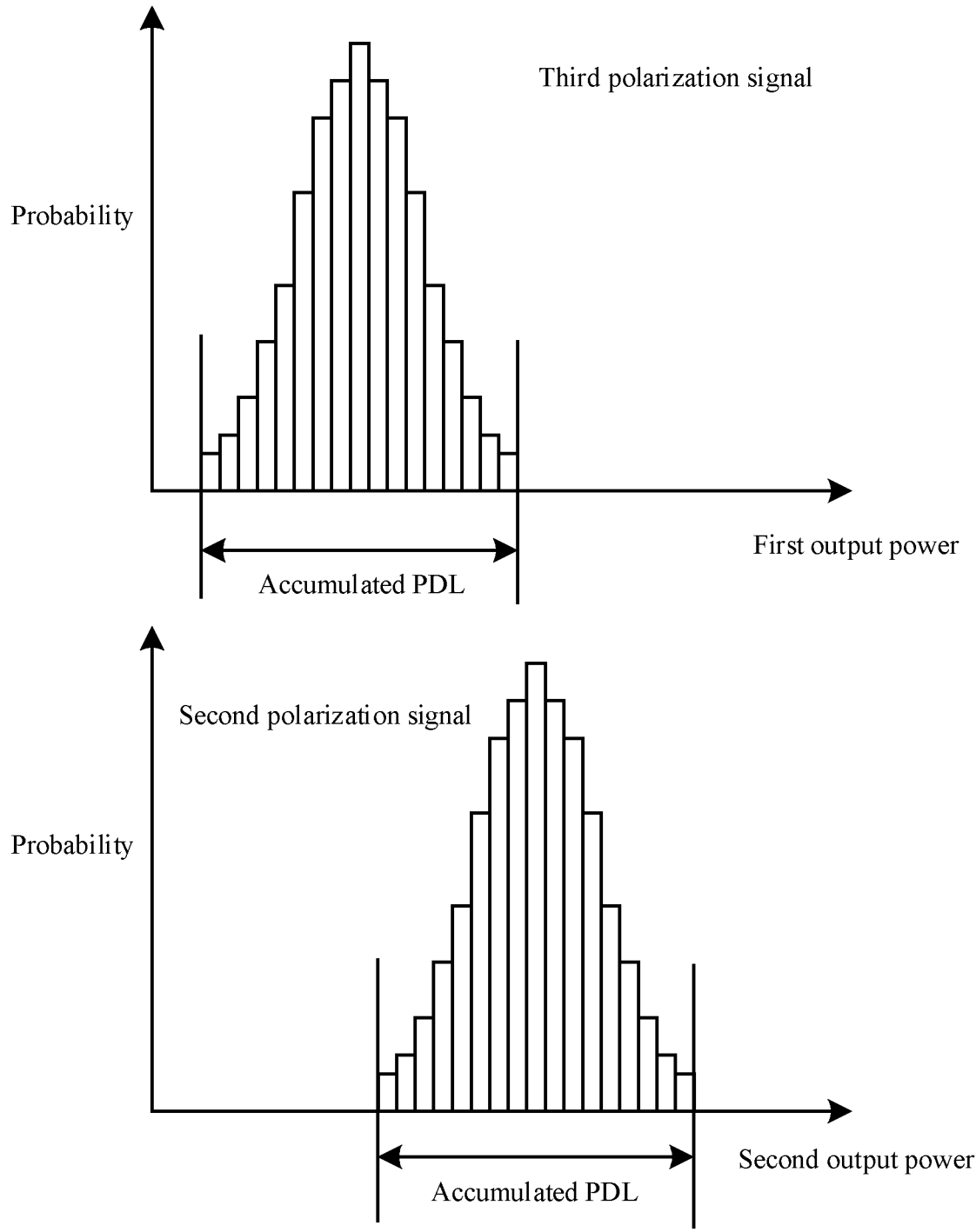
FIG. 15 is another schematic diagram in which different power values in a first output power and a second output power are distributed based on probabilities according to an embodiment of this application.

In another example implementation, step 501 may alternatively include establishing a histogram, and determining the maximum optical-path output power and the minimum optical-path output power in the histogram. For the histogram, refer to the probability distribution histograms, obtained by the optical device by collecting statistics, of the two groups of optical powers in FIG. 10. Further, FIG. 15 shows the accumulated PDL, determined based on the probability distribution histograms shown in FIG. 10, at the location of the optical device on the transmission link within the first duration. The absolute value of the difference between the maximum optical-path output power and the minimum optical-path output power of any group of optical powers is the accumulated PDL before the location of the optical device on the transmission link within the first duration.

It should be noted that, to ensure accuracy of the determined accumulated PDL before the location of the optical device on the transmission link within the first duration, the transmission link may be a transmission link with a fixed PDL in the first duration, and correspondingly, the determined accumulated PDL is a fixed accumulated PDL before the location of the optical device on the transmission link within the first duration.

To sum up, in the PDL determining method provided in this embodiment of this application, on a basis of ensuring a function of the optical device, the PDL of the optical device can be accurately determined, and compensation is performed on the PDL. In addition, the accumulated PDL before the location of the optical device on the transmission link within the first duration may be further determined.

Figure 16:
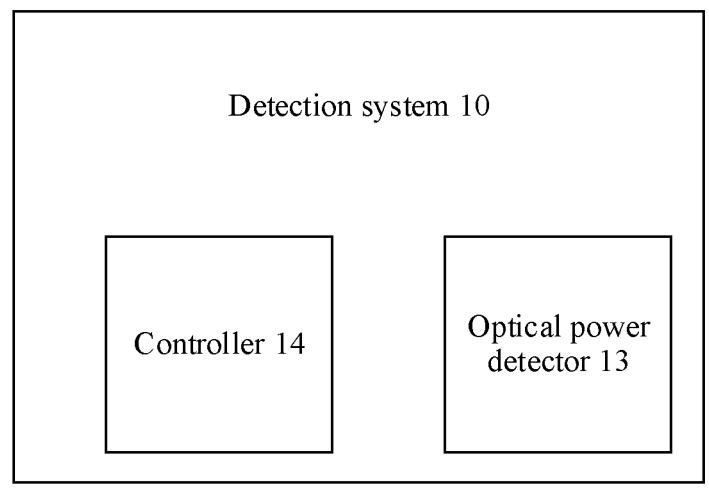
FIG. 16 is a schematic diagram of a detection system according to an embodiment of this application.

FIG. 16 shows a detection system configured to perform detection on an optical device. For example, the optical device is a WSS. The detection system may be configured to perform the PDL determining method provided in the foregoing embodiments of this application. The detection system 10 is connected to the optical device, and includes an optical power detector 13 and a controller 14.

The optical power detector 13 is connected to the optical device, and is configured to detect an optical power. In the optical device, there may be one or more optical power detectors, the optical power detector has a power detection port, and one optical power detector may have one or more power detection ports. Usually, one optical power detector corresponds to one power detection port, and a quantity of optical power detectors may be determined based on a quantity of required power detection ports.

The controller 14 is configured to obtain two groups of optical powers within first duration from optical powers detected by the optical power detector 13, where an optical power satisfying a same power constraint exists in each of the two groups of optical powers within the first duration, the two groups of optical powers are optical-path output powers of two polarization principal axes of the optical device 10, or the two groups of optical powers are an input power for inputting a first optical signal to the optical device 10 and an output power for outputting the first optical signal from the optical device 10, the first optical signal is a signal with any wavelength in an optical signal input to the optical device 10, and the first optical signal is any polarization signal in a polarization multiplexing signal, or the first optical signal is a single-polarization signal, and configured to select at least one group of target optical powers that satisfy the same power constraint from the two groups of optical powers, where each group of target optical powers includes a first target power and a second target power respectively from the two groups of optical powers, and configured to determine a PDL of the optical device 10 based on the at least one group of target optical powers. The controller 10 may be a controller of a switching engine 301, or may be a control device externally connected to the switching engine 301, or the like.

The following separately describes structures of two types of optical devices to which the two PDL determining methods described in FIG. 2 and FIG. 11 are respectively applied. In the foregoing PDL determining method that may be applied to the first type of optical device, two implementations of step 203 are provided based on the operating principle of the switching engine. This embodiment of this application provides a plurality of types of optical device structures for the two implementations herein.

In the first implementation, the second polarization signal forms at least one light spot on the switching engine, the third polarization signal forms at least one light spot on the switching engine, and the light spots formed on the switching engine by the second polarization signal and the third polarization signal coincide. In the first implementation, there are a plurality of manners of transmitting only a specified polarization signal to the power detection port. The first optional implementation is loading a plurality of types of phase information. The second optional implementation is loading phase information and changing an internal structure of the optical device. Therefore, correspondingly, there may also be a plurality of optical device structures.

Figure 17:
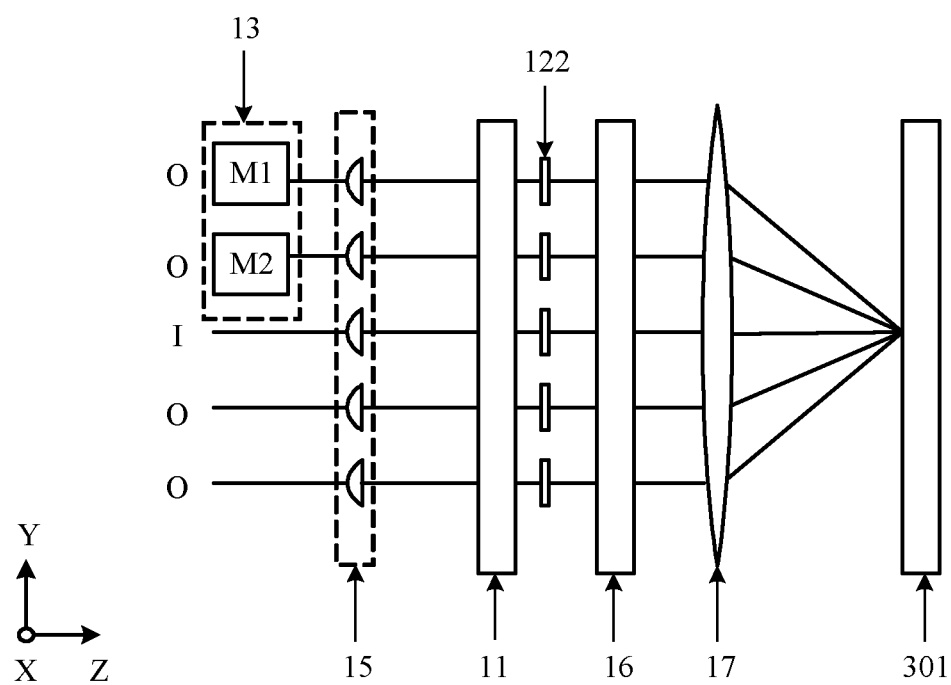
FIG. 17 is a schematic structural diagram of an optical device in a switching direction according to an embodiment of this application.
Figure 18:
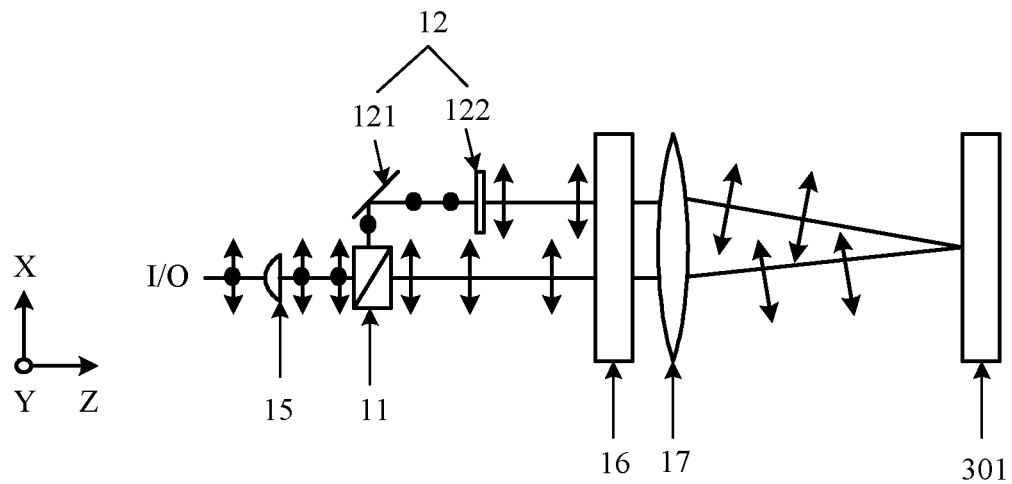
FIG. 18 is a schematic structural diagram of another optical device in a dispersion direction according to an embodiment of this application.

In a structure of an optical device corresponding to the first optional implementation, optionally, the optical device may be a WSS. For example, FIG. 17 and FIG. 18 are schematic structural diagrams of the optical device in two directions. An X direction is a dispersion direction, a Y direction is a switching direction, a Z direction is a propagation direction of an optical signal in the optical device, and the switching direction is perpendicular to both the dispersion direction and the propagation direction. It can be learned that FIG. 17 is a schematic structural diagram of the optical device in the switching direction Y, and FIG. 18 is a schematic structural diagram of the optical device in the dispersion direction, the X direction.

The optical device may include a polarization processing apparatus 11, a conversion component 12, an optical power detector 13, a controller 14 (not shown in FIG. 17 and FIG. 18), a collimator array 15, a grating 16, a lens 17, and a switching engine 301. The controller 14 may be a controller of the switching engine 301, or may be a control device externally connected to the switching engine 301, or the like. The optical power detector 13 has a power detection port.

In this embodiment of this application, an example in which the conversion component 12 includes a reflector 121 and a half-wave plate 122 is used for description. The reflector 121 and the half-wave plate 122 may be configured to convert a first polarization signal to obtain a third polarization signal, so that polarization directions of the third polarization signal and a second polarization signal are the same. Certainly, the reflector and the half-wave plate are merely examples. During actual implementation of this embodiment of this application, a conversion component including another optical structure may be alternatively included, and may be configured to convert a first polarization signal to obtain a third polarization signal, so that polarization directions of the third polarization signal and a second polarization signal are the same.

It should be noted that, to better describe a structure of the optical device, FIG. 18 is merely a schematic diagram of forming a light spot on the switching engine by an optical signal with one wavelength among optical signals with a plurality of wavelengths that are obtained through decomposition by the grating 16. Certainly, during actual implementation of this application, the grating decomposes an optical signal into optical signals with a plurality of wavelengths that are diffracted along the dispersion direction X, and forms, on the switching engine, a plurality of light spots distributed along the dispersion direction X. Details are not described herein in this embodiment of this application.

It should be noted that, in FIG. 18, a double-headed arrow and a solid dot are two polarization symbols used to identify two polarization directions.

Referring to both FIG. 17 and FIG. 18, an optical signal enters the collimator array 15 from a signal input port I, and passes through the polarization processing apparatus 11. Then referring to FIG. 18, the optical signal is split into a first polarization signal (the first polarization signal is identified by a solid dot) and a second polarization signal (the second polarization signal is identified by a double-headed arrow) whose polarization directions are perpendicular. The first polarization signal is converted into a third polarization signal whose polarization direction is the same as that of the second polarization signal after passing through the reflector 121 and the half-wave plate 122 (because the polarization direction of the third polarization signal is the same as that of the second polarization signal, the third polarization signal is also identified by a double-headed arrow). Then the grating 16 decomposes each of the second polarization signal and the third polarization signal into two groups of optical signals with a plurality of wavelengths (in the figure, only an optical signal with one wavelength is used as an example for description). Then the two groups of optical signals with different wavelengths enter the switching engine 301 through the lens 17 to form a plurality of light spots. The switching engine 301 controls a deflection angle of optical signals with different wavelengths that enter the switching engine 301. Then deflected optical signals successively pass through the lens 17, the grating 16, the conversion component 12 (only for the second polarization signal), the polarization processing apparatus 11, and the collimator array 15 in a return direction, and are finally output from at least one signal output port. The figure shows four signal output ports O. Two of the signal output ports are power detection ports, and are equipped with the optical power detector 13 a power detector M1 and a power detector M2.

Figure 19:
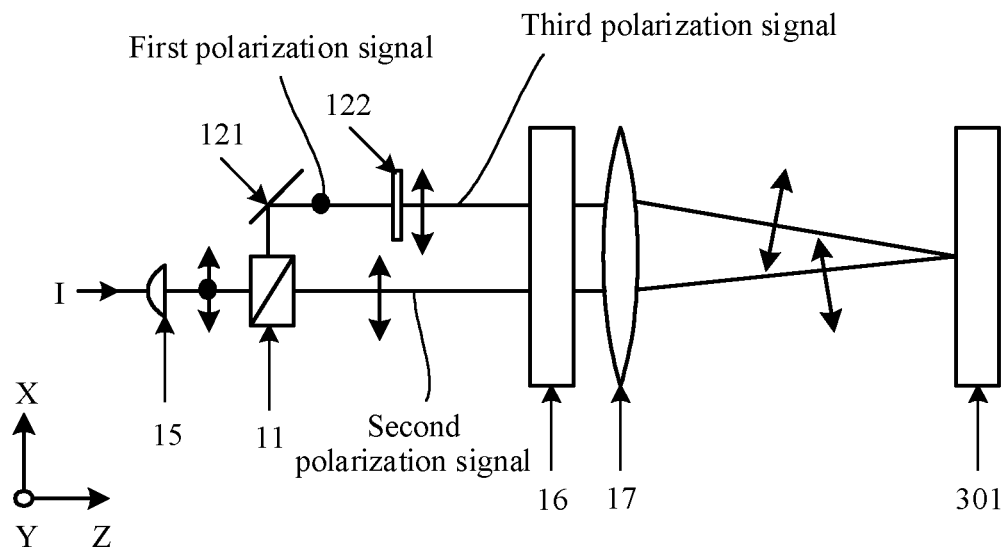
FIG. 19 is a schematic diagram of an input optical-path corresponding to inputting an optical signal to an optical device according to an embodiment of this application.
Figure 20:
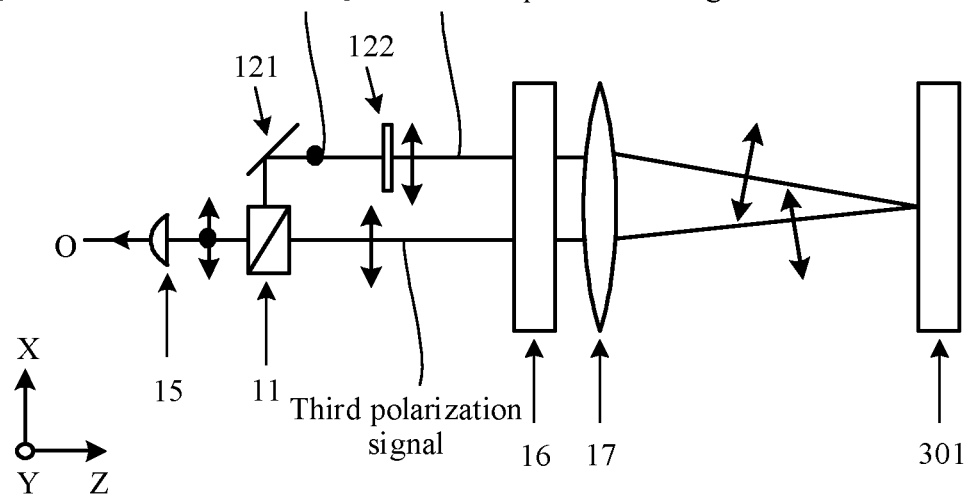
FIG. 20 is a schematic diagram of an output optical-path corresponding to outputting an optical signal from an optical device according to an embodiment of this application.

Further, FIG. 19 is a schematic diagram of an optical signal input optical-path of the optical device described in FIG. 18, and FIG. 20 is a schematic diagram of an optical signal output optical-path of the optical device described in FIG. 18. After a polarization signal is deflected by the switching engine 301, a propagation direction changes. In FIG. 19, the first polarization signal is transmitted in an upper region of space shown in FIG. 19, and the second polarization signal is transmitted in a lower region of the space shown in FIG. 19. In FIG. 20, the second polarization signal is transmitted in an upper region of space shown in FIG. 20, and the first polarization signal is transmitted in a lower region of the space shown in FIG. 20. In FIG. 20, after the second polarization signal passes through the half-wave plate 122, a polarization direction changes.

It should be noted that, in the conversion component 12 shown in FIG. 18, after the reflector 121 and the half-wave plate 122 convert the first polarization signal into the third polarization signal, the second polarization signal and the first polarization signal enter the grating 16 and the lens 17 in parallel. In this way, the second polarization signal and the third polarization signal form a group of overlapping light spots on the switching engine through focusing by the lens 17. To be specific, at least one light spot formed on the switching engine by the second polarization signal coincides with at least one light spot formed on the switching engine by the third polarization signal. In addition, the group of light spots are distributed on the switching engine 18 along the dispersion direction X (that is, a direction parallel to a paper surface).

Figure 21:
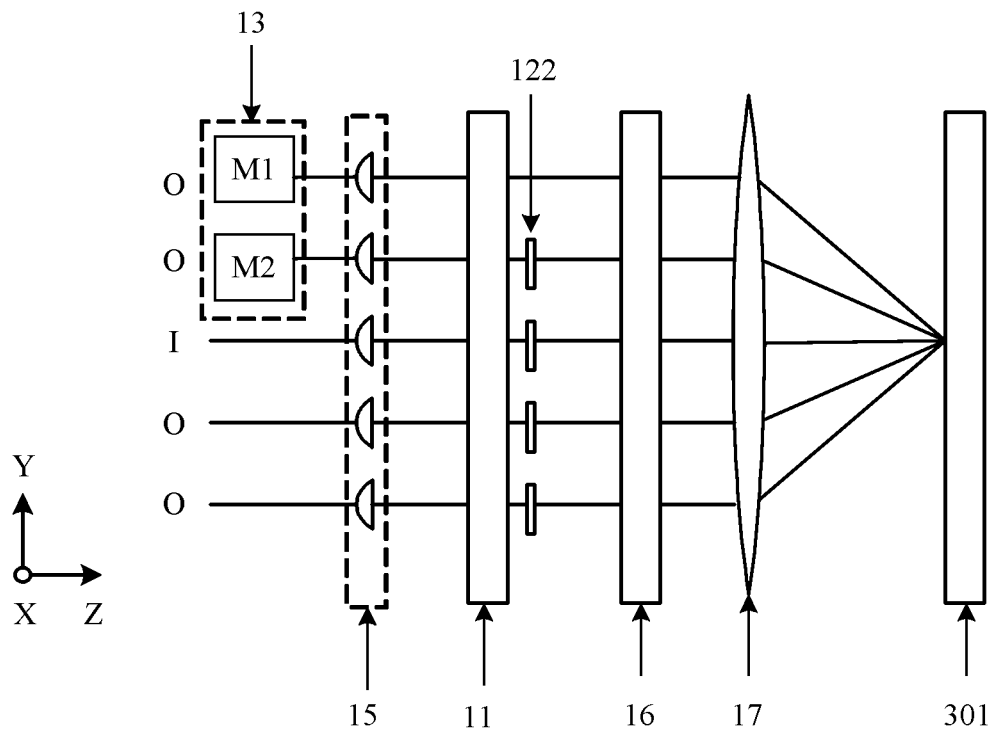
FIG. 21 is a schematic structural diagram of an optical device in a switching direction according to an embodiment of this application.
Figure 22:
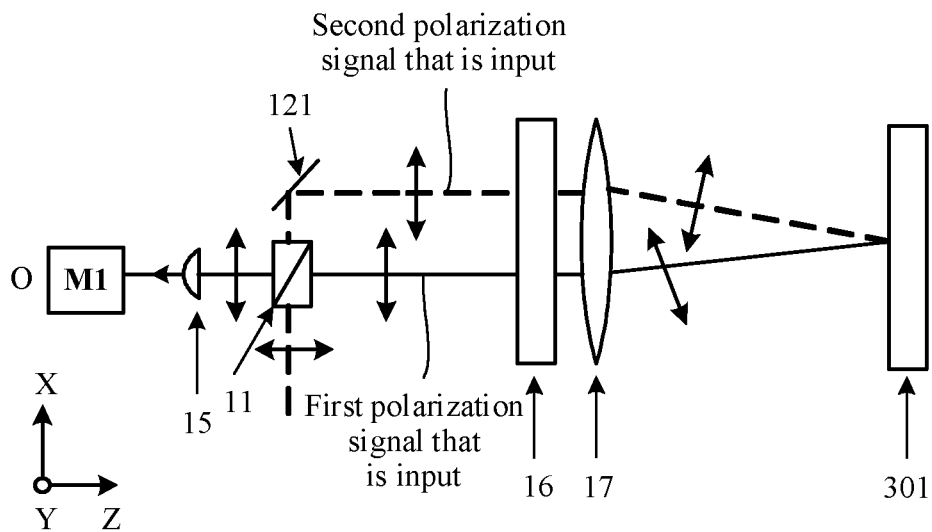
FIG. 22 is a schematic diagram of a partial structure of an optical device in a dispersion direction according to an embodiment of this application.
Figure 23:
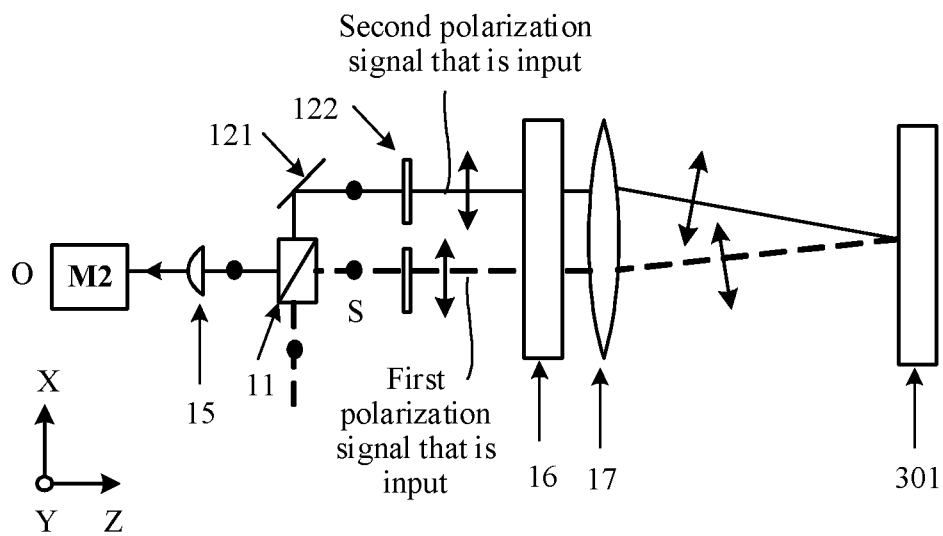
FIG. 23 is a schematic diagram of a partial structure of another optical device in a dispersion direction according to an embodiment of this application.

In a structure of an optical device corresponding to the second optional implementation, for example, FIG. 21 is a schematic structural diagram of the optical device in a switching direction Y, and FIG. 22 and FIG. 23 are schematic diagrams of a partial structure of the optical device in a dispersion direction, an X direction. It should be noted that, assuming that when an optical signal is input to the optical device, a first polarization signal is transmitted in an upper region of space shown in FIG. 22 (the transmission path and a transmission direction are not shown in FIG. 22), and a second polarization signal is transmitted in a lower region of space shown in FIG. 23 (the transmission path and a transmission direction are not shown in FIG. 23), FIG. 22 and FIG. 23 are schematic diagrams of an output optical-path corresponding to a process in which the optical signal is output from the optical device. In FIG. 22, the first polarization signal (that is, an input first polarization signal) is deflected to be transmitted in a lower region of the space shown in FIG. 22, and the second polarization signal (that is, an input second polarization signal) is deflected to be transmitted in an upper region of the space shown in FIG. 22. In FIG. 23, the first polarization signal (that is, the input first polarization signal) is deflected to be transmitted in a lower region of the space shown in FIG. 23, and the second polarization signal (that is, the input second polarization signal) is deflected to be transmitted in an upper region of the space shown in FIG. 23.

For the structure of the optical device described in FIG. 21 to FIG. 23 and reference signs thereof, refer to the descriptions of the structure of the optical device corresponding to the first optional implementation. Details are not described herein again in this embodiment of this application.

According to the foregoing descriptions, in the second optional implementation, the optical device loads phase information by using a switching engine, and then finally transmits a specified polarization signal to a specified detection port by using a polarization processing apparatus, and makes a polarization signal in another polarization direction away from the specified detection port. Optionally, during actual implementation of this embodiment of this application, a half-wave plate may be further disposed in the optical device. The half-wave plate may be configured to change a polarization direction of a polarization signal, to assist the polarization processing apparatus in transmitting only the polarization signal in the specified polarization direction to the specified detection port. For example, in this embodiment of this application, the polarization processing apparatus may allow a polarization signal in a polarization direction corresponding to a double-headed arrow to pass. In FIG. 22, both the first polarization signal and the second polarization signal are polarization signals in the polarization direction corresponding to the double-headed arrow. Therefore, both the first polarization signal and the second polarization signal may pass through the polarization processing apparatus 11. A propagation direction of the second polarization signal is changed by a reflector 121, and the second polarization signal is transmitted in a direction away from a power detector M1. Therefore, the power detector M1 can detect only a first output power of the first polarization signal. In FIG. 23, after the first polarization signal and the second polarization signal pass through the half-wave plate, both signals are polarization signals in a polarization direction corresponding to a solid dot. Therefore, both the first polarization signal and the second polarization signal are reflected by the polarization processing apparatus 11 when passing through the polarization processing apparatus 11, the second polarization signal is reflected to a power detector M2, and the first polarization signal is transmitted in a direction away from the power detector M2. Therefore, the power detector M2 can detect only a second output power of the second polarization signal.

Figure 24:
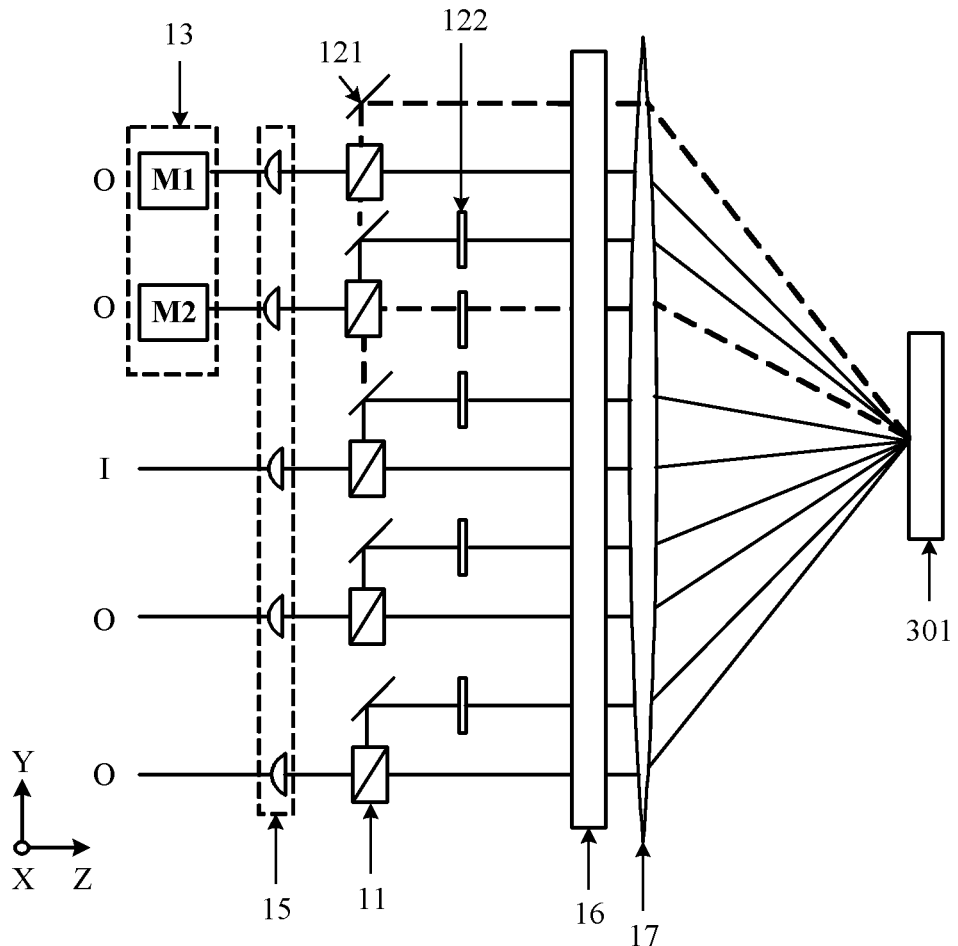
FIG. 24 is a schematic structural diagram of another optical device in a switching direction according to an embodiment of this application.
Figure 25:
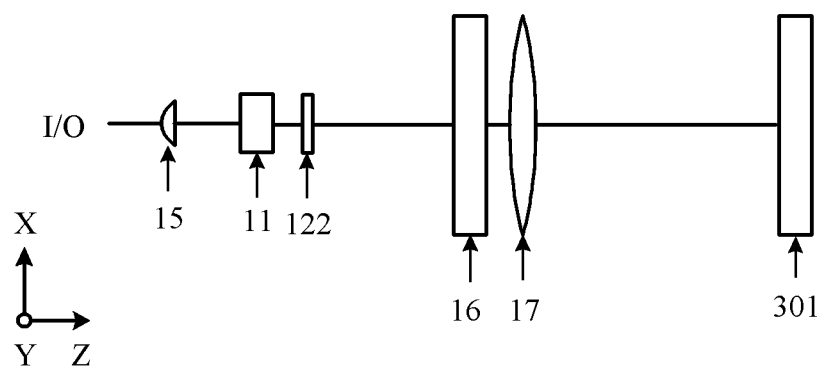
FIG. 25 is a schematic structural diagram of another optical device in a dispersion direction according to an embodiment of this application.

FIG. 22 and FIG. 23 are schematic structural diagrams of the optical device in which a structure such as the half-wave plate 122 is disposed in the dispersion direction X to change a polarization direction of a polarization signal. FIG. 24 shows another possible implementation of the structure of the optical device corresponding to the second optional implementation. In a schematic structural diagram of the optical device shown in FIG. 24, a structure such as a half-wave plate 122 is disposed in a switching direction Y to change a polarization direction of a polarization signal. For descriptions of an optical signal transmission optical-path, refer to related descriptions of FIG. 22 and FIG. 23. Details are not described herein again in this embodiment of this application. FIG. 25 is a schematic structural diagram of a structure of the optical device shown in FIG. 24 in a dispersion direction X.

It can be learned from the foregoing structure that, in an implementation of the first type of optical device, the polarization processing apparatus 11 may be configured to perform step 201: splitting an optical signal input to the optical device into a first polarization signal and a second polarization signal, where polarization directions of the first polarization signal and the second polarization signal are perpendicular, and the conversion component 12 may be configured to perform step 202: converting the first polarization signal to obtain a third polarization signal, where polarization directions of the third polarization signal and the second polarization signal are the same.

The controller 14 may be configured to perform step X1: for a target region in which each light spot is located, loading, by using the switching engine, phase information to both a second polarization signal and a third polarization signal that correspond to a first region, so that the third polarization signal corresponding to the first region is transmitted to the power detection port, and the optical power detector 13 may detect a first output power of the received third polarization signal.

The controller 14 may be configured to perform step X2: for the target region in which each light spot is located, loading, by using the switching engine, phase information to both a second polarization signal and a third polarization signal that correspond to a second region, so that the second polarization signal corresponding to the second region is transmitted to the power detection port, and the optical power detector 13 may detect a second output power of the received second polarization signal.

The optical power detector 13 is configured to detect a first output power of a signal with a specified proportion in the third polarization signal, and detect a second output power of a signal with the specified proportion in the second polarization signal.

Optionally, the controller 14 may be configured to perform step X11: for the target region in which each light spot is located, loading, by using the switching engine, first phase information and third phase information to both the second polarization signal and the third polarization signal that correspond to the first region, so that the third polarization signal corresponding to the first region is transmitted to the power detection port, and the second polarization signal corresponding to the first region is transmitted in the direction away from the power detection port, and detecting, by using the power detection port, the first output power of the received third polarization signal.

The controller 14 may be configured to perform step X21: for the target region in which each light spot is located, loading, by using the switching engine, second phase information and fourth phase information to both the second polarization signal and the third polarization signal that correspond to the second region, so that the second polarization signal corresponding to the second region is transmitted to the power detection port, and the third polarization signal corresponding to the second region is transmitted in the direction away from the power detection port, and detecting, by using the power detection port, the second output power of the received second polarization signal.

Optionally, the controller 14 may be configured to perform step X12: for the target region in which each light spot is located, loading, by using the switching engine, first phase information and third phase information to both the second polarization signal and the third polarization signal that correspond to the first region, so that the third polarization signal corresponding to the first region is transmitted to the first power detection port, and the second polarization signal corresponding to the first region is transmitted in a direction away from the first detection port, and detecting, by using the first power detection port, the first output power of the received third polarization signal.

A first direction in which the first phase information is loaded and a third direction in which the third phase information is loaded are both perpendicular to a propagation direction of the optical signal input to the optical device. A second direction in which the second phase information is loaded and a fourth direction in which the fourth phase information is loaded are both perpendicular to the propagation direction of the optical signal input to the optical device. The first direction is perpendicular to the third direction. The second direction is perpendicular to the fourth direction. The first direction and the second direction are dispersion directions. The dispersion direction is an arrangement direction of at least one light spot formed on the switching engine by optical signals with different wavelengths in a polarization signal.

The controller 14 may be configured to perform step X22: For the target region in which each light spot is located, the optical device loads, by using the switching engine, second phase information and fourth phase information to both the second polarization signal and the third polarization signal that correspond to the second region, so that the second polarization signal corresponding to the second region is transmitted to the second power detection port, and the third polarization signal corresponding to the second region is transmitted in the direction away from the second detection port, and detects, by using the second power detection port, the second output power of the received second polarization signal.

Optionally, the controller 14 may be configured to perform step X13: For the target region in which each light spot is located, the optical device loads, by using the switching engine, third phase information to the second polarization signal and the third polarization signal that correspond to the first region, so that the third polarization signal and the second polarization signal that correspond to the first region are transmitted in a direction toward the first power detection port, and the second polarization signal corresponding to the first region is transmitted in a direction away from the first power detection port by using the polarization processing apparatus, and detects, by using the first power detection port, the first output power of the received third polarization signal.

The controller 14 may be configured to perform step X23: For the target region in which each light spot is located, the optical device loads, by using the switching engine, fourth phase information to the second polarization signal and the third polarization signal that correspond to the second region, so that the third polarization signal and the second polarization signal that correspond to the second region are transmitted in a direction toward the second power detection port, and the third polarization signal corresponding to the second region is transmitted in a direction away from the second power detection port by using the polarization processing apparatus, and detects, by using the second power detection port, the second output power of the received second polarization signal.

In a second implementation, the second polarization signal forms at least one first light spot on the switching engine, the third polarization signal forms at least one second light spot on the switching engine, the at least one first light spot and the at least one second light spot formed on the switching engine by the second polarization signal and the third polarization signal do not coincide, and dispersion directions of the at least one first light spot and the at least one second light spot are the same.

Figure 26:
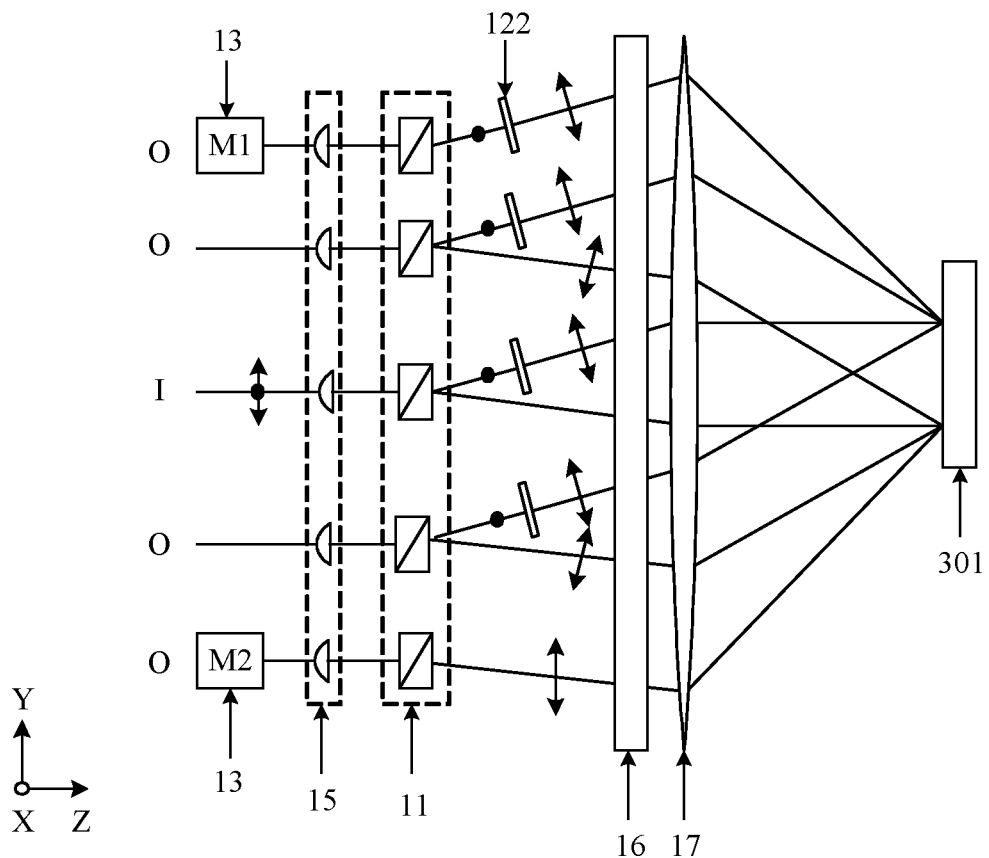
FIG. 26 is a schematic structural diagram of another optical device in a switching direction according to an embodiment of this application.

For example, FIG. 26 is a schematic structural diagram of another optical device in a switching direction Y. For a numeral designation in FIG. 26, refer to a corresponding numeral designation in FIG. 17. Details are not described herein again in this embodiment of this application.

The optical device may include a polarization processing apparatus 11, a conversion component 12, an optical power detector 13, a controller 14 (not shown in FIG. 26), a collimator array 15, a grating 16, a lens 17, and a switching engine 301. The controller 14 may be a controller of the switching engine 301, or may be a control device externally connected to the switching engine 301, or the like. The optical power detector 13 has a power detection port, and may be configured to detect an optical power. In this embodiment of this application, an example in which the conversion component 12 includes a half-wave plate 122 is used for description. The half-wave plate 122 may be configured to convert the first polarization signal to obtain a third polarization signal, so that polarization directions of the third polarization signal and the second polarization signal are the same. Certainly, the half-wave plate is merely an example. During actual implementation of this embodiment of this application, a conversion component including another optical structure may be alternatively included, and may be configured to convert a first polarization signal to obtain a third polarization signal, so that polarization directions of the third polarization signal and the second polarization signal are the same.

Similar to the transmission optical-path of the optical signal input to the first type of optical device, referring to FIG. 26, the optical signal is split into a first polarization signal (the first polarization signal is identified by a solid dot) and a second polarization signal (the second polarization signal is identified by a double-headed arrow) whose polarization directions are perpendicular. The first polarization signal is converted into a third polarization signal whose polarization direction is the same as that of the second polarization signal after passing through the half-wave plate 122 (because the polarization direction of the third polarization signal is the same as that of the second polarization signal, the third polarization signal is also identified by a solid line). Then the grating 16 decomposes each of the second polarization signal and the third polarization signal into two groups of optical signals with a plurality of wavelengths (in the figure, only an optical signal with one wavelength is used as an example for description). Then the two groups of optical signals with different wavelengths are collimated and enter the switching engine 301 through the lens 17 to form a plurality of light spots. The switching engine 301 controls a deflection angle of optical signals with different wavelengths that enter the switching engine. Then deflected optical signals successively pass through the lens 17, the grating 16, the half-wave plate 122 (only for the third polarization signal), the polarization processing apparatus 11, and the collimator array 15 in a return direction, and are finally output from at least one signal output port. The figure shows four signal output ports O. Two of the signal output ports are equipped with the optical power detector 13: a power detector M1 and a power detector M2.

Figure 27:
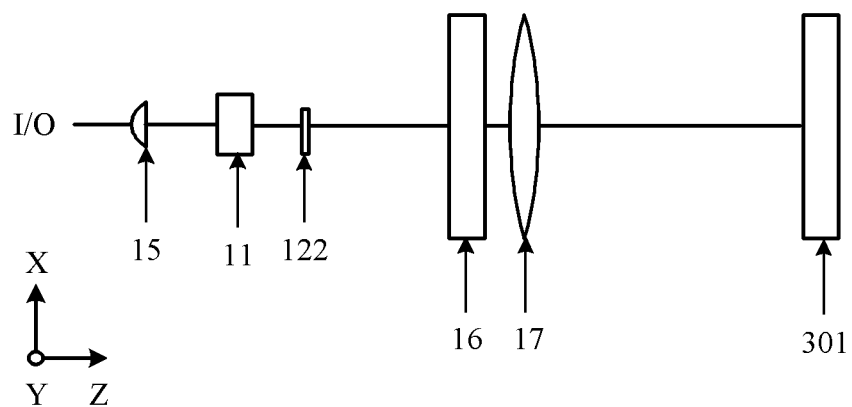
FIG. 27 is a schematic structural diagram of another optical device in a dispersion direction according to an embodiment of this application.

It should be noted that, after the half-wave plate 122 in FIG. 26 converts the first polarization signal into the third polarization signal, the third polarization signal and the first polarization signal separately enter the grating 16 and the lens 17 at specific angles, so that the second polarization signal and the third polarization signal respectively form a group of first light spots and a group of second light spots on the switching engine 301, that is, the at least one first light spot and the at least one second light spot formed on the switching engine 301 by the second polarization signal and the third polarization signal do not coincide. In addition, dispersion directions of the at least one first light spot and the at least one second light spot are distributed consistently, that is, both are perpendicular to a paper surface and face inward. Because the two groups of light spots are distributed on the switching engine 301 along a dispersion direction X (that is, a direction perpendicular to the paper surface and facing inward), FIG. 26 shows only a case in which two light spots are formed. FIG. 27 is a schematic structural diagram of the optical device shown in FIG. 26 in a dispersion direction, an X direction.

It can be learned from the foregoing structure that, in the foregoing implementation that may be applied to the first type of optical device, the polarization processing apparatus 11 may be configured to perform step 201: splitting an optical signal input to the optical device into a first polarization signal and a second polarization signal, where polarization directions of the first polarization signal and the second polarization signal are perpendicular, and the conversion component 12 may be configured to perform step 202: converting the first polarization signal to obtain a third polarization signal, where polarization directions of the third polarization signal and the second polarization signal are the same.

The controller 14 may be configured to perform step Y1: For a first target region in which each first light spot is located, the optical device loads, by using the switching engine, first phase information and third phase information to a third polarization signal corresponding to the first target region, so that a signal with the specified proportion in the third polarization signal corresponding to the first target region is transmitted to the power detection port, and the optical power detector 13 may detect a first output power of the signal with the specified proportion in the third polarization signal.

The controller 14 may be configured to perform step Y2: For a second target region in which each second light spot is located, the optical device loads, by using the switching engine, second phase information and fourth phase information to a second polarization signal corresponding to the second target region, so that a signal with the specified proportion in the second polarization signal corresponding to the second target region is transmitted to the power detection port, and the optical power detector 13 may detect a second output power of the signal with the specified proportion in the second polarization signal.

Optionally, the controller may be configured to perform step Y11: for the first target region in which each first light spot is located, loading, by using the switching engine, the first phase information and a third phase direction to the third polarization signal corresponding to the first target region, so that the signal with the specified energy proportion in the third polarization signal corresponding to the first target region is transmitted to the first power detection port, and detecting, by using the first power detection port, the first output power of the received third polarization signal.

The controller may be configured to perform step Y21: for the second target region in which each second light spot is located, loading, by using the switching engine, the second phase information and the fourth phase information to the second polarization signal corresponding to the second target region, so that the signal with the specified energy proportion in the second polarization signal corresponding to the second target region is transmitted to the second power detection port, and detecting, by using the second power detection port, the second output power of the received second polarization signal.

It should be noted that FIG. 16 and FIG. 24 show a case in which the optical power detector includes the first power detector and the second power detector. In this case, the optical device has at least two signal output ports, the first power detector and the second power detector are separately disposed on two signal output ports of the optical device, the first optical power detector is connected to a first power detection port, and the second optical power detector is connected to a second power detection port. Certainly, during actual use of this embodiment of this application, one power detector may be alternatively disposed, and the power detector has one power detection port. In this case, a loading time period of the first phase information and the third phase information is different from that of the second phase information and the fourth phase information.

It should be noted that, during actual implementation of this embodiment of this application, another optical device may be alternatively used to implement a function of the conversion component. In this embodiment of this application, the foregoing two cases are merely used as examples for description.

Figure 28:
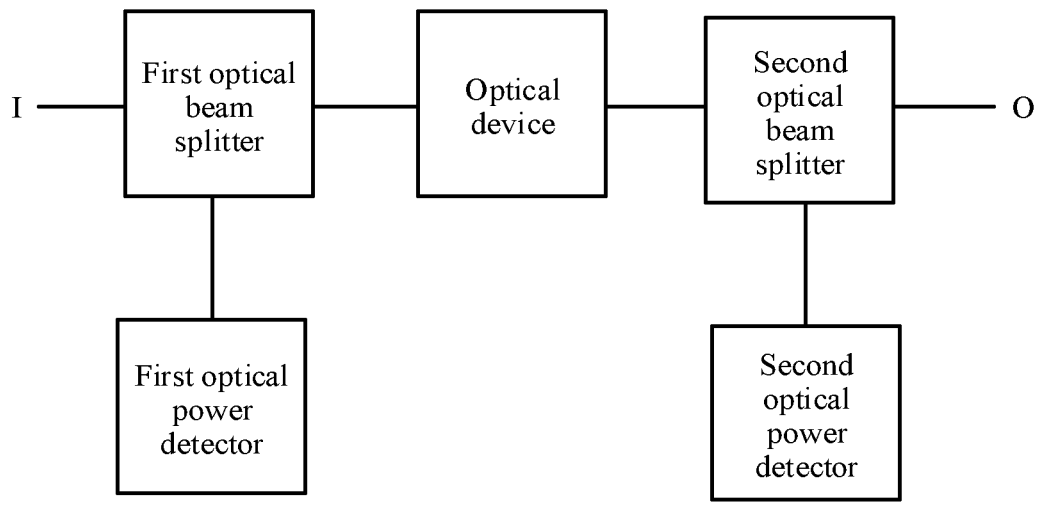
FIG. 28 is a schematic structural diagram of another detection system according to an embodiment of this application.

In the foregoing PDL determining method that may be applied to the second type of optical device, the input power for inputting the first optical signal to the optical device and the output power for outputting the first optical signal from the optical device within the first duration need to be obtained, the first optical signal is a signal with any wavelength in an optical signal input to the optical device, and the first optical signal is any polarization signal in a polarization multiplexing signal, or the first optical signal is a single-polarization signal. FIG. 28 is a schematic structural diagram of another detection system. The detection system includes a first optical beam splitter and a second optical beam splitter. The first optical beam splitter is connected to an input end of an optical device. The second optical beam splitter is connected to an output end of the optical device. An optical power detector is separately connected to the first optical beam splitter and the second optical beam splitter. The optical device may be indirectly connected to the optical power detector.

The optical device may be any optical device in a related technology. The first optical beam splitter is configured to obtain, through splitting, a signal with partial energy from an optical signal input to the optical device for optical power detection. The second optical beam splitter is configured to obtain, through splitting, a signal with partial energy from an optical signal output from the optical device for optical power detection. A first optical power detector and a second optical power detector are configured to detect a power of any polarization signal in a polarization multiplexing signal with any wavelength, or are configured to detect a power of a single-polarization signal with any wavelength. A controller may be disposed in the optical device or may be an apparatus externally connected to the optical device. The controller may be configured to perform step 401 to step 404: obtaining two groups of optical powers within first duration from optical powers, detected by the first optical power detector and the second optical power detector, of any polarization signal with any wavelength among signals with a plurality of wavelengths, where the two groups of optical powers are an input power for inputting a first optical signal to the optical device and an output power for outputting the first optical signal from the optical device, and an optical power satisfying a same power constraint exists in each of the two groups of optical powers within the first duration, selecting at least one group of target optical powers that satisfy the same power constraint from the two groups of optical powers, where each group of target optical powers includes a first target power and a second target power respectively from the two groups of optical power, and determining a PDL of the optical device based on the at least one group of target optical powers.

The first optical power detector and the second optical power detector each may be a coherent detection receiver, or an intensity detection receiver with a wavelength-tunable filter. The coherent detection receiver may perform detection on a signal with a specified frequency or a specified wavelength. The specified frequency or the specified wavelength may be specified by an operator. The coherent detection receiver may detect a power of a signal with any wavelength, and the coherent detection receiver may detect a power of any polarization signal in a polarization multiplexing signal. The intensity detection receiver with the wavelength-tunable filter may be configured to detect an optical-path input power and an optical-path output power of a single-polarization signal. The first optical power detector and the second optical power detector also have insertion losses, and the insertion losses may affect the detected PDL of the optical device. However, usually, the insertion losses of the first optical power detector and the second optical power detector are comparatively small, and can be ignored.

Optionally, an optical power, in each of the two groups of optical powers, that satisfies the power constraint is any one of a maximum output power, a minimum output power, an average value of output powers, and a weighted average value of output powers within the first duration.

Alternatively, optical powers, in the two groups of optical powers, that satisfy the power constraint are powers whose probabilities are a specified probability and that are at same locations in probability distribution curves corresponding to the two groups of optical powers, where the probability distribution curve is used to reflect occurrence probabilities of different optical powers.

Optionally, there is one group of target optical powers that satisfy the same power constraint in total, that is, a group of target optical powers that includes the first target power and the second target power, and the controller is configured to determine an absolute value of a difference between the first target power and the second target power as the PDL of the optical device.

Optionally, the two groups of optical powers are the input power for inputting the first optical signal to the optical device and the output power for outputting the first optical signal from the optical device, and an optical power, in each of the two groups of optical powers, that satisfies the power constraint is either a maximum power or a minimum power within the first duration.

Optionally, the controller is configured to obtain a probability distribution curve corresponding to each group of optical powers, where the probability distribution curve is used to reflect occurrence probabilities of different optical powers, and determine, in two probability distribution curves corresponding to the two groups of optical powers, at least one group of optical powers that satisfy the same power constraint as the target optical powers.

Optionally, there are two groups of target optical powers that satisfy the same power constraint in total, and each group of target optical powers includes a first target power and a second target power, and the controller is configured to calculate a difference between the first target power and the second target power in each group of target optical powers to obtain a third target power and a fourth target power, and determine an absolute value of a difference between the third target power and the fourth target power as the PDL of the optical device.

Optionally, the controller is further configured to after determining the PDL of the optical device based on the at least one group of target optical powers, compensate for the PDL of the optical device based on the determined PDL of the optical device.

Optionally, the two groups of optical powers are optical-path output powers of two polarization principal axes of the optical device, and the controller is configured to query, based on the PDL, a correspondence between a PDL and an adjustment angle, where the adjustment angle is an angle by which a propagation angle of an optical signal is adjusted, when the PDL is recorded in the correspondence, determine an adjustment angle corresponding to the PDL, and compensate for the PDL of the optical device based on the adjustment angle.

Optionally, the optical device includes a switching engine, the optical signal input to the optical device is split into a first polarization signal and a second polarization signal, the first polarization signal is converted to obtain a third polarization signal, polarization directions of the third polarization signal and the second polarization signal are the same, the second polarization signal forms at least one light spot on the switching engine, the third polarization signal forms at least one light spot on the switching engine, and dispersion directions of the at least one light spot formed by the second polarization signal and the at least one light spot formed by the third polarization signal are the same, and the controller is configured to, for a target region in which each light spot is located, load, by using the switching engine, third phase information to a fourth polarization signal corresponding to the target region, so that a first included angle is increased by the adjustment angle, where the first included angle is an included angle between an actual transmission optical-path through which the fourth polarization signal is reflected from the switching engine and an ideal transmission optical-path through which the fourth polarization signal is reflected from the switching engine, and the ideal transmission optical-path is a transmission optical-path with maximum coupling efficiency, or for a target region in which each light spot is located, load, by using the switching engine, fourth phase information to a fifth polarization signal corresponding to the target region, so that a second included angle is decreased by the adjustment angle, where the second included angle is an included angle between an actual transmission optical-path through which the fifth polarization signal is reflected from the switching engine and an ideal transmission optical-path through which the fifth polarization signal is reflected from the switching engine, where the fourth polarization signal is a polarization signal, in the first polarization signal and the second polarization signal, that has a greater maximum-first-output-power within the first duration, the fifth polarization signal is a polarization signal, in the first polarization signal and the second polarization signal, that has a smaller maximum-first-output-power within the first duration, and a direction in which the third phase information is loaded and a direction in which the fourth phase information is loaded are both the same as or perpendicular to the dispersion direction.

Optionally, the optical device includes a switching engine, the optical signal input to the optical device is split into a first polarization signal and a second polarization signal, the first polarization signal is converted to obtain a third polarization signal, polarization directions of the third polarization signal and the second polarization signal are the same, the second polarization signal forms at least one light spot on the switching engine, the third polarization signal forms at least one light spot on the switching engine, and dispersion directions of the at least one light spot formed by the second polarization signal and the at least one light spot formed by the third polarization signal are the same, and the controller is configured to perform a plurality of compensation processes until an obtained current PDL of the optical device reaches a specified PDL threshold, where the compensation process includes, for a target region in which each light spot is located, loading, by using the switching engine, fifth phase information to a polarization signal corresponding to the target region, where the fifth phase information makes a first included angle increase and a second included angle decrease, where the first included angle is an included angle between an actual transmission optical-path through which the fourth polarization signal is reflected from the switching engine and an ideal transmission optical-path through which the fourth polarization signal is reflected from the switching engine, the second included angle is an included angle between an actual transmission optical-path through which the fifth polarization signal is reflected from the switching engine and an ideal transmission optical-path through which the fifth polarization signal is reflected from the switching engine, the fourth polarization signal is a polarization signal, in the first polarization signal and the second polarization signal, that has a greater maximum-first-output-power within the first duration, the fifth polarization signal is a polarization signal, in the first polarization signal and the second polarization signal, that has a smaller maximum-first-output-power within the first duration, the third region is a region used for port switching for the optical signal, and a direction of the fifth phase information is the same as or perpendicular to the dispersion direction.

Optionally, there is one power detection port in total, and a loading time period of the first phase information and the third phase information is different from that of the second phase information and the fourth phase information.

Optionally, the optical device is disposed on an optical signal transmission link, and the controller is further configured to obtain a maximum optical-path output power and a minimum optical-path output power of any one of the two groups of optical powers within the first duration, and determine an absolute value of a difference between the maximum optical-path output power and the minimum optical-path output power as an accumulated PDL at a location of the optical device on the transmission link within the first duration.

To sum up, in the detection system provided in this embodiment of this application, on a basis of ensuring a function of the optical device, the PDL of the optical device can be accurately determined, and compensation is performed on the PDL. In addition, the accumulated PDL before the location of the optical device on the transmission link within the first duration may be further determined.

An embodiment of this application provides an optical signal transmission structure. The optical signal transmission structure includes at least one optical device, and a detection system corresponding to an optical device in the at least one optical device. The detection system may be the detection system shown in FIG. 16 or FIG. 28.

Optionally, the optical signal transmission structure may include a ROADM and at least one optical amplifier. The ROADM may include at least one WSS. A first WSS in the at least one WSS is the WSS shown in FIG. 17 to FIG. 27. The at least one WSS is connected to the at least one optical amplifier. A detection system is correspondingly disposed for the first WSS. The detection system may detect a PDL of the first WSS.

For example, the at least one optical amplifier includes a first-level optical amplifier and a second-level optical amplifier. The at least one WSS is connected in series and has one input end and at least one output end. The first-level optical amplifier is connected to the input end. The second-level optical amplifier is connected to a specified output end of the at least one output end.

Optionally, the optical signal transmission structure further includes one fast polarization scrambler, and the fast polarization scrambler is disposed between the first-level optical amplifier and the input end.

Optionally, the first-level optical amplifier is configured to obtain, in advance, an additional insertion loss to be generated during compensation for a PDL of the first WSS, and after receiving an optical signal input to the first-level optical amplifier, compensate for the additional insertion loss for an optical signal input to the first WSS.

Optionally, the optical amplifier is an EDFA, a Raman amplifier, or another amplifier.

In a subsequent embodiment, an example in which the optical amplifier is an EDFA is used for description. For an operating principle of the optical amplifier when the optical amplifier is another optical amplifier, refer to that of the EDFA.

Figure 29:
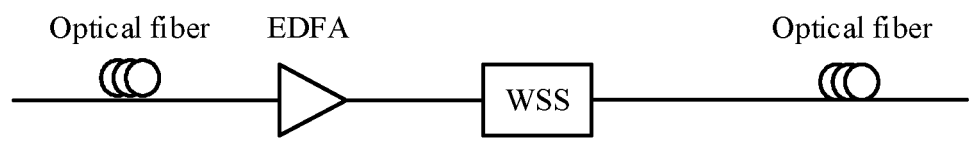
FIG. 29 is a schematic structural diagram of a ROADM according to an embodiment of this application.

In an optional implementation, FIG. 29 shows a ROADM, and the ROADM may include one WSS and one EDFA.

Figure 30:
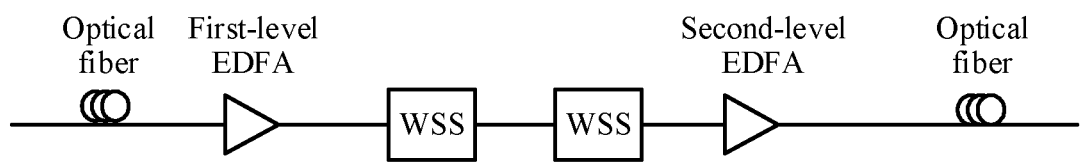
FIG. 30 is a schematic structural diagram of another ROADM according to an embodiment of this application.

In another optional implementation, referring to FIG. 30, the at least one amplifier may include a first-level EDFA and a second-level EDFA, and the ROADM includes at least one WSS (FIG. 30 shows a case in which the ROADM includes two WSSs). The at least one WSS is connected in series and has one input end and at least one output end (FIG. 30 shows only one output port). The first-level EDFA is connected to the input end, and the second-level EDFA is connected to a specified output end of the at least one output end. At least one of the two WSSs shown in FIG. 28 may be a specified WSS.

Figure 31:
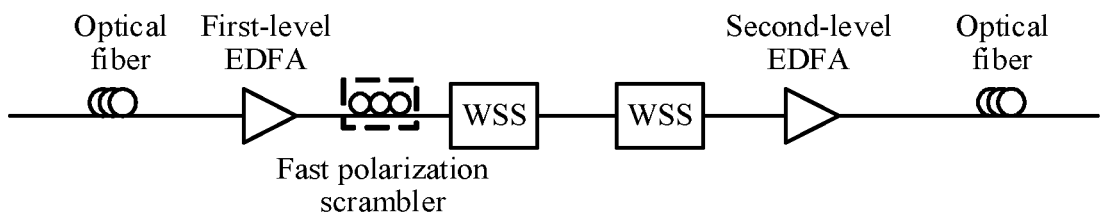
FIG. 31 is a schematic structural diagram of still another ROADM according to an embodiment of this application.

Optionally, referring to FIG. 31, the ROADM may further include one fast polarization scrambler, and the fast polarization scrambler is disposed between the first-level EDFA and the input end of the WSS.

The fast polarization scrambler may be configured to quickly disturb a polarization direction of an input optical signal, to ensure that the optical signal input to the WSS is an optical signal whose polarization direction changes in a random manner and can traverse all polarization directions within a period of time. This includes enabling a polarization direction of a polarization signal in a polarization multiplexing signal to traverse all polarization directions, so that the first target output power and the second target output power determined in step 104 are accurate, thereby ensuring accuracy of the foregoing PDL determining method. Certainly, during actual implementation of this embodiment of this application, the fast polarization scrambler may be alternatively disposed at another location on a transmission link before the WSS.

Optionally, the first-level EDFA is configured to obtain, in advance, an additional insertion loss to be generated during compensation for a PDL of a specified WSS, and after receiving an optical signal input to the first-level EDFA, compensate, by adding an additional gain, for the additional insertion loss for an optical signal input to the specified WSS, to compensate for the additional insertion loss in advance. Certainly, the first-level EDFA may be further configured to compensate for an insertion loss of a front-end optical fiber on a transmission link. A PDL of a WSS may be determined by using the PDL determining method provided in the foregoing embodiment, and an additional insertion loss of the WSS is determined based on the PDL of the WSS, and is then provided for the first-level EDFA. In this case, when an optical signal is transmitted again, the first-level EDFA may obtain the additional insertion loss in advance.

Usually, the first-level EDFA is used to compensate for an energy attenuation caused by an optical signal passing through an optical fiber, and the second-level EDFA is used to compensate for an energy attenuation caused by an optical signal passing through the at least one WSS. In the PDL compensation method provided in this application, an additional insertion loss needs to be added to a polarization-principal-axis optical path through which a polarization signal with a smaller insertion loss passes, so that insertion losses of two polarization-principal-axis optical paths are kept the same. However, this process also introduces an additional insertion loss $\Delta Loss_{pdl}$ into the WSS. As a result, although a gain of the second-level EDFA can be increased so that a power of a signal output from the second-level EDFA is the same as an output power without PDL compensation, a power of a signal input to the second-level EDFA is reduced by a specified power $|\Delta Loss_{pdl}|$ compared with a power without PDL compensation, thereby causing deterioration of an optical signal-to-noise ratio (OSNR) of the signal output from the second-level EDFA. However, if the first-level EDFA is used to compensate for the additional insertion loss $\Delta Loss_{pdl}$ generated by the optical signal of the WSS, an OSNR of an entire transmission link can be increased. This principle is analyzed below.

A formula for calculating an OSNR of an optical signal output from an EDFA is as follows:

$$OSNR_{out}(\text{dB}) = -10 * \log_{10}\left(\frac{1}{10^{\frac{OSNR_{in}}{10}}} + \left(1 - \frac{1}{10^{\frac{G}{10}}}\right)\frac{10^{\frac{-58}{10}} * 10^{\frac{NF}{10}}}{10^{\frac{P_{sig\_in}}{10}}}\right), \quad (1)$$

where $OSNR_{in}$ is an optical signal-to-noise ratio of an optical signal input to the EDFA, G is a gain (that is, an amplification multiple) of the EDFA, NF is a noise figure of the EDFA, and $p_{sig\_in}$ is a power of the optical signal input to the EDFA. Usually, two 1×N WSSs (that is, WSSs with one signal input port and a plurality of signal output ports each) connected in series are used for a ROADM to perform optical switching, and an insertion loss of the two WSSs connected in series is usually 15 dB or above. In this case, $$1 - \frac{1}{10^{\frac{G}{10}}} \approx 1.$$

Therefore, the foregoing formula (1) may be simplified as follows:

$$OSNR_{out}(\text{dB}) = -10 * \log_{10}\left(\frac{1}{10^{\frac{OSNR_{in}}{10}}} + \frac{10^{\frac{-58}{10}} * 10^{\frac{NF}{10}}}{10^{\frac{P_{sig\_in}}{10}}}\right). \quad (2)$$

It can be learned from the formula (2) that, when the second-level EDFA is used to add the additional gain to compensate for the additional insertion loss introduced due to compensation for the PDL of the WSS, although the gain of the second-level EDFA can be increased to ensure that the power of the signal output from the second-level EDFA is the same as the power without PDL compensation (ensure that a power for entering the optical fiber does not change), the power $P_{sig\_in}$ of the optical signal input to the second-level EDFA is reduced by the specified power $|\Delta Loss_{pdl}|$ compared with the power without PDL compensation. As a result, the optical signal-to-noise ratio of the signal output from the second-level EDFA greatly deteriorates.

This embodiment of this application provides a method for compensating, by adding the additional gain by using the first-level EDFA, for the additional insertion loss introduced due to compensation for the PDL of the WSS. The first-level EDFA may not only compensate for the insertion loss of the front-end optical fiber, but also compensate for the additional insertion loss introduced due to compensation for the PDL of the WSS, thereby ensuring that the power $P_{sig\_in}$ of the optical signal input to the second-level EDFA is the same as the power without PDL compensation. It can be learned from the formula (2) that, when the gain of the EDFA is increased while the noise figure of the EDFA remains unchanged, because the power and the optical signal-to-noise ratio of the input signal of the EDFA remain unchanged, an optical signal-to-noise ratio of an output signal of the EDFA almost remains unchanged. In this method, optical signal-to-noise ratios of optical signals output from the first-level EDFA and the second-level EDFA can almost remain unchanged compared with those without PDL compensation.

Figure 32:
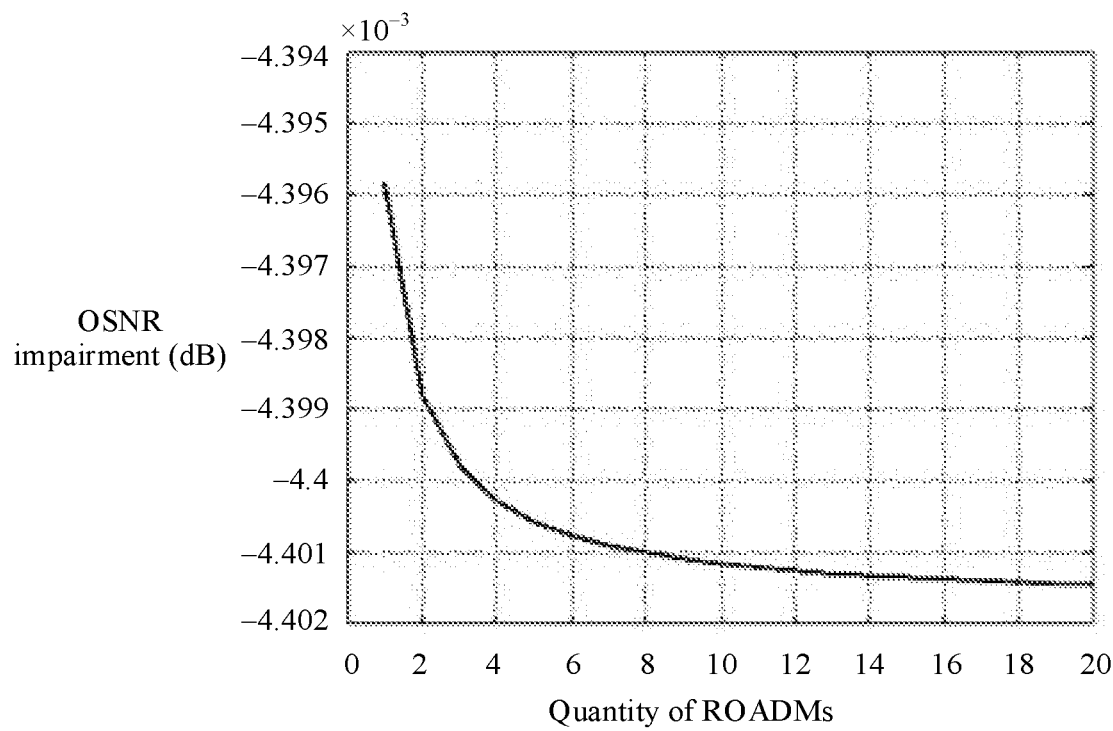
FIG. 32 is a schematic diagram in which an optical signal-to-noise ratio loss of an optical signal output from a second-level EDFA changes with a quantity of concatenated ROADMs when a 2-decibel (dB) gain is added by using a first-level EDFA to compensate for an additional 2-dB insertion loss introduced due to compensation for a PDL of a WSS in a case of a common transmission link configuration according to an embodiment of this application.
Figure 33:
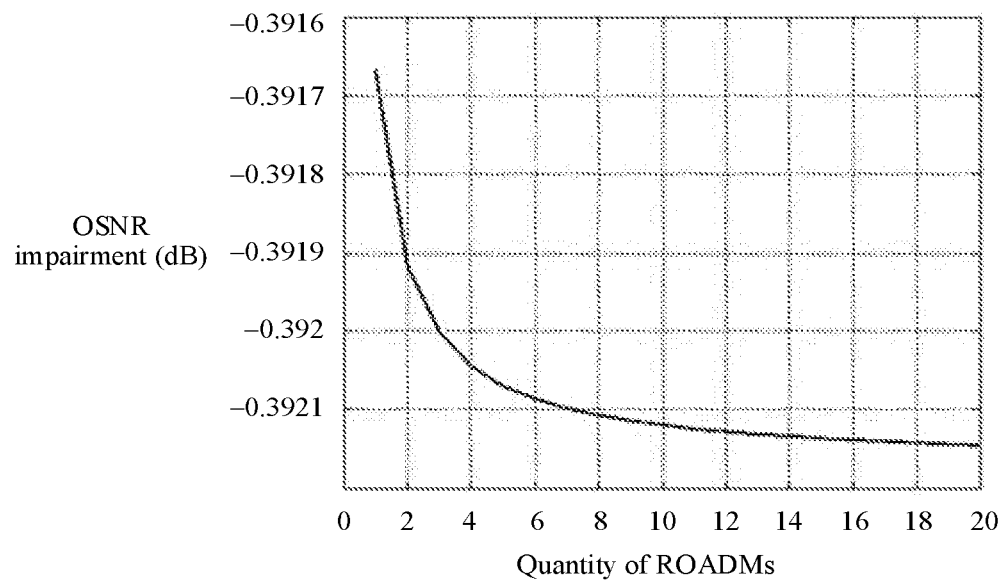
FIG. 33 is a schematic diagram in which an optical signal-to-noise ratio loss of an optical signal output from a second-level EDFA changes with a quantity of concatenated ROADMs when a 2-dB gain is added by using the second-level EDFA to compensate for an additional 2-dB insertion loss introduced due to compensation for a PDL of a WSS in a case of a same transmission link configuration according to an embodiment of this application.

As shown in FIG. 32, an optical signal-to-noise ratio loss of an optical signal output from the second-level EDFA changes with a quantity of concatenated ROADMs when a 2-dB gain is added by using the first-level EDFA to compensate for an additional 2-dB insertion loss introduced due to compensation for a PDL of a WSS in a case of a common transmission link configuration. As shown in FIG. 33, an optical signal-to-noise ratio loss of an optical signal output from the second-level EDFA changes with a quantity of concatenated ROADMs when a 2-dB gain is added by using the second-level EDFA to compensate for an additional 2-dB insertion loss introduced due to compensation for a PDL of a WSS in a case of a same transmission link configuration. It can be learned that, compensating, by using the first-level EDFA, for the additional insertion loss of the optical signal input to the specified WSS can greatly reduce deterioration of the optical signal-to-noise ratio of the optical signal caused by the additional insertion loss introduced due to compensation for the PDL of the specified WSS.

To sum up, the optical signal transmission structure provided in this embodiment of this application includes the at least one optical device, and the detection system corresponding to the optical device of the at least one optical device, and a PDL of the optical device corresponding to the detection system can be accurately detected. In addition, in the ROADM of the optical signal transmission structure, the first-level EDFA is configured to obtain, in advance, an additional insertion loss to be generated during compensation for a PDL of a specified WSS, and after receiving an optical signal input to the first-level EDFA, compensate for the additional insertion loss for an optical signal input to the specified WSS. This avoids a problem that an optical signal-to-noise ratio of an output signal of the second-level EDFA is decreased because the additional insertion loss is generated due to the compensation for the PDL of the WSS, thereby maximally avoiding deterioration of an optical signal-to-noise ratio of an entire transmission link.

In this application, the terms "first", "second", "third", "fourth", and "fifth" are merely used for a purpose of description, and cannot be understood as an indication or implication of relative importance. The term "a plurality of" means two or more, and the term "at least one" represents one or more, unless otherwise specified.

In this application, the term "at least one" includes "one" and "at least two".

A person of ordinary skill in the art may understand that all or some of the step s of the embodiments may be implemented by hardware or a program instructing related hardware. The program may be stored in a computer-readable storage medium. The storage medium may include a read-only memory (ROM), a magnetic disk, or an optical disc.

The foregoing descriptions are merely example embodiments of this application, but are not intended to limit this application. Any modification, equivalent replacement, or improvement made without departing from the and principle of this application should fall within the protection scope of this application.

The invention claimed is:

1. A method applied to a detection system comprising an optical device, wherein the method comprises:
obtaining two groups of optical powers within a first duration, wherein an optical power satisfying a power constraint exists in each of the two groups of optical powers, wherein the two groups of optical powers are either optical-path output powers of two polarization principal axes of the optical device, wherein obtaining the two groups of optical powers comprises:

splitting a first optical signal into a first polarization signal and a second polarization signal, wherein a first polarization direction of the first polarization signal and a second polarization direction of the second polarization signal are perpendicular;

converting the first polarization signal to obtain a third polarization signal, wherein a third polarization direction of the third polarization signal and the second polarization direction are the same;

detecting, within the first duration, a first output power of a first signal with an energy proportion in the third polarization signal; and detecting, within the first duration, a second output power of a second signal with the energy proportion in the second polarization signal, and wherein the optical-path output powers are the first output power and the second output power;

selecting, from the two groups of optical powers, at least one group of target optical powers that satisfy the power constraint, wherein each of the at least one group of target optical powers comprises a first target power and a second target power; and determining a polarization-dependent loss (PDL) of the optical device based on the at least one group of target optical powers.

2. The method of claim 1, wherein the second polarization signal forms a first light spot on a switching engine of the optical device, wherein the third polarization signal forms a second light spot on the switching engine, wherein the first light spot and the second light spot coincide, and wherein detecting the first output power and detecting the second output power comprises:

loading, using the switching engine, first phase information for a target region in which each light spot is located to both a fourth polarization signal and a fifth polarization signal that correspond to a first region to transmit the fifth polarization signal to a power detection port of the optical device and to transmit the fourth polarization signal in a direction away from the power detection port;

detecting, using the power detection port, a third output power of the fifth polarization signal;

loading, using the switching engine, second phase information for the target region to both a sixth polarization signal and a seventh polarization signal that correspond to a second region to transmit the sixth polarization signal to the power detection port and to transmit the seventh polarization signal in the direction away from the power detection port; and detecting, using the power detection port, a fourth output power of the sixth polarization signal, wherein both the first region and the second region are located in the target region, wherein the first region and the second region correspond to the same light spot energy, and wherein a ratio of light spot energy corresponding to each of the first region and the second region to light spot energy corresponding to the target region is the energy proportion.

3. The method of claim 2, wherein loading the first phase information comprises loading, using the switching engine, third phase information in a first direction and fourth phase information in a third direction to both the fourth polarization signal and the fifth polarization signal to transmit the fifth polarization signal to the power detection port and to transmit the fourth polarization signal in the direction away from the power detection port, wherein loading the second phase information comprises loading, using the switching engine, fifth phase information in a second direction and sixth phase information in a fourth direction to both the sixth polarization signal and the seventh polarization signal to transmit the sixth polarization signal to the power detection port and to transmit the seventh polarization signal in the direction away from the power detection port, wherein the first direction and the third direction are both perpendicular to a propagation direction of the first optical signal, wherein the second direction and the fourth direction are both perpendicular to the propagation direction, wherein the first direction is perpendicular to the third direction, wherein the second direction is perpendicular to the fourth direction, wherein the first direction and the second direction are dispersion directions, and wherein the dispersion direction is an arrangement direction of a third light spot formed on the switching engine by optical signals with different wavelengths in an eighth polarization signal.

4. The method of claim 3, wherein loading the first phase information and detecting the third output power comprises:

loading, using the switching engine, the third phase information and the fourth phase information to both the fourth polarization signal and the fifth polarization signal to transmit the fifth polarization signal to a first power detection port of the optical device and to transmit the fourth polarization signal in a third direction away from the first power detection port; and detecting, using the first power detection port, the third output power, wherein loading the second phase information and detecting the fourth output power comprises:

loading, using the switching engine, the fifth phase information and the sixth phase information to both the sixth polarization signal and the seventh polarization signal to transmit the sixth polarization signal to a second power detection port of the optical device and to transmit the seventh polarization signal in a fourth direction away from the second power detection port; and detecting, using the second power detection port, the fourth output power.

5. The method of claim 2, wherein loading the first phase information and detecting the third output power comprises:

loading, using the switching engine, third phase information in a third direction to the fourth polarization signal and the fifth polarization signal to transmit the fourth polarization signal and the fifth polarization signal in a direction toward a first power detection port of the optical device and to transmit, using the polarization processing apparatus, the fourth polarization signal in a direction away from the first power detection port; and detecting, using the first power detection port, the third output power, wherein loading the second phase information and detecting the fourth output power comprises:

loading, using the switching engine, fourth phase information in a fourth direction to the sixth polarization signal and the seventh polarization signal to transmit the sixth polarization signal and the seventh polarization signal in a direction toward a second power detection port of the optical device and to transmit, using the polarization processing apparatus, the seventh polarization signal in a direction away from the second power detection port; and detecting, using the second power detection port, the fourth output power, wherein the third direction is perpendicular to a propagation direction of the first optical signal, wherein the fourth direction is perpendicular to the propagation direction, wherein the third direction and the fourth direction are switching directions, wherein each of the switching directions is perpendicular to a dispersion direction, and wherein the dispersion direction is an arrangement direction of a third light spot formed on the switching engine by optical signals with different wavelengths in an eighth polarization signal.

6. The method of claim 1, wherein the second polarization signal forms a first light spot on a switching engine of the optical device, wherein the third polarization signal forms a second light spot on the switching engine, wherein the first light spot and the second light spot do not coincide, wherein dispersion directions of the first light spot and the second light spot are the same, and wherein detecting the first output power and detecting the second output power comprises:

loading, using the switching engine for a first target region in which the first light spot is located, first phase information in a first direction and third phase information in a second direction to a fourth polarization signal corresponding to the first target region to transmit a third signal with the energy proportion in the fourth polarization signal to a power detection port of the optical device;

detecting, using the power detection port, a third output power of the fourth polarization signal;

loading, using the switching engine for a second target region in which each second light spot is located, second phase information in a third direction and fourth phase information in a fourth direction to a fifth polarization signal corresponding to the second target region to transmit a fourth signal with the energy proportion in the fifth polarization signal to the power detection port; and detecting, using the power detection port, a fourth output power of the fifth polarization signal, wherein the first direction, the second direction, the third direction, and the fourth direction are all the same and are all switching directions, and wherein each of the switching directions is perpendicular to a propagation direction of the first optical signal and is perpendicular to the dispersion directions.

7. The method of claim 6, wherein loading the first phase information and the third phase information and detecting the third output power comprises:

loading, using the switching engine, the first phase information and the third phase information to the fourth polarization signal to transmit the third signal to a first power detection port of the optical device; and detecting, using the first power detection port, the third output power, wherein loading the second phase information and the fourth phase information and detecting the fourth output power comprises:

loading, using the switching engine, the second phase information and the fourth phase information to the fifth polarization signal to transmit the fourth signal to a second power detection port of the optical device; and detecting, using the second power detection port, the fourth output power.

8. The method of claim 1, wherein the optical power satisfying the power constraint is one of a maximum output power, a minimum output power, an average value of output powers, or a weighted average value of output powers within the first duration, or wherein optical powers, in the two groups of optical powers, that satisfy the power constraint comprise probabilities of a first probability and are located in a same location in probability distribution curves corresponding to the two groups of optical powers, and wherein each of the probability distribution curves reflects occurrence probabilities of different optical powers.

9. The method of claim 1, further comprising a group of target optical powers that comprises the first target power and the second target power, wherein determining the PDL comprises determining an absolute value of a difference between the first target power and the second target power as the PDL.

10. The method of claim 1, wherein the first duration is a duration in which a polarization direction of the first optical signal can traverse all polarization directions.

11. The method of claim 1, wherein the first duration is based on a software simulation or a manual experiment.

12. The method of claim 1, wherein the first duration is preset.

13. A detection system comprising:
an optical device comprising:
a polarization processing apparatus configured to split a first optical signal into a first polarization signal and a second polarization signal, wherein a first polarization direction of the first polarization signal and a second polarization direction of the second polarization signal are perpendicular; and
a conversion component coupled to the polarization processing apparatus and configured to convert the first polarization signal to obtain a third polarization signal, wherein a polarization direction of the third polarization signal and the second polarization direction are the same;
an optical power detector coupled to the optical device and configured to:
detect optical powers;
detect, within a first duration, a first output power of a first signal with an energy proportion in the third polarization signal; and
detect, within the first duration a second output power of a second signal with the energy proportion in the second polarization signal, wherein optical-path output powers of two polarization principal axes of the optical device are the first output power and the second output power; and
a controller coupled to the optical power detector and configured to:
obtain two groups of optical powers within the first duration from the optical powers, wherein an optical power satisfying a power constraint exists in each of the two groups of optical powers, wherein the two groups of optical powers are the optical-path output powers;
select, from the two groups of optical powers, at least one group of target optical powers that satisfy the power constraint, wherein each of the at least one group of target optical powers comprises a first target power and a second target power; and
determine a polarization-dependent loss (PDL) of the optical device based on the at least one group of target optical powers.

14. The detection system of claim 13, wherein the optical device comprises a switching engine and a power detection port, wherein the second polarization signal forms a first light spot on the switching engine, wherein the third polarization signal forms a second light spot on the switching engine, wherein the first light spot and the second light spot coincide, wherein the controller is further configured to load, using the switching engine, first phase information for a target region in which each light spot is located to both a fourth polarization signal and a fifth polarization signal that correspond to a first region to transmit the fifth polarization signal to the power detection port and to transmit the fourth polarization signal in a direction away from the power detection port, wherein the optical power detector is further configured to detect, using the power detection port, a third output power of the fifth polarization signal, wherein the controller is further configured to load, using the switching engine, second phase information for the target region to both a sixth polarization signal and a seventh polarization signal that correspond to a second region to transmit the sixth polarization signal to the power detection port and to transmit the seventh polarization signal in the direction away from the power detection port, wherein the optical power detector is further configured to detect, using the power detection port, a fourth output power of the sixth polarization signal, wherein both the first region and the second region are located in the target region, wherein the first region and the second region correspond to the same light spot energy, and wherein a ratio of light spot energy corresponding to each of the first region and the second region to light spot energy corresponding to the target region is the energy proportion.

15. The detection system of claim 14, wherein the controller is further configured to:
  load, using the switching engine, third phase information for the target region in a first direction and fourth phase information for the target region in a third direction to both the fourth polarization signal and the fifth polarization signal to transmit the fifth polarization signal to the power detection port and to transmit the fourth polarization signal in the direction away from the power detection port; and
  load, using the switching engine, fifth phase information for the target region in a second direction and sixth phase information for the target region in a fourth direction to both the second polarization signal and the seventh polarization signal to transmit the sixth polarization signal to the power detection port and to transmit the seventh polarization signal in the direction away from the power detection port,
  wherein the first direction and the third direction are both perpendicular to a propagation direction of the first optical signal, wherein the second direction and the fourth direction are both perpendicular to the propagation direction, wherein the first direction is perpendicular to the third direction, wherein the second direction is perpendicular to the fourth direction, wherein the first direction and the second direction are dispersion directions, and wherein the dispersion direction is an arrangement direction of a third light spot formed on the switching engine by optical signals with different wavelengths in an eighth polarization signal.

16. The detection system of claim 15, further comprising a first power detection port and a second power detection port, wherein the controller is further configured to load, using the switching engine, the third phase information for the target region and the fourth phase information for the target region to both the fourth polarization signal and the fifth polarization signal to transmit the fifth polarization signal to the first power detection port and to transmit the fourth polarization signal in a third direction away from the first power detection port, wherein the optical power detector is further configured to detect, using the first power detection port, the third output power, wherein the controller is further configured to load, using the switching engine, the fifth phase information for the target region and the sixth phase information for the target region to both the sixth polarization signal and the seventh polarization signal to transmit the sixth polarization signal to the second power detection port to transmit the seventh polarization signal in a fourth direction away from the second power detection port, and wherein the optical power detector is further configured to detect, using the second power detection port, the fourth output power.

17. The detection system of claim 14, further comprising a first power detection port and a second power detection port, wherein the controller is further configured to load, using the switching engine, third phase information for the target region in a third direction to the fourth polarization signal and the fifth polarization signal to transmit the fourth polarization signal and the fifth polarization signal in a direction toward the first power detection port, wherein the polarization processing apparatus is further configured to transmit the fourth polarization signal in a direction away from the first power detection port, wherein the optical power detector is further configured to detect, using the first power detection port, the third output power, wherein the controller is further configured to load, using the switching engine, fourth phase information for the target region in a fourth direction to the sixth polarization signal and the seventh polarization signal to transmit the sixth polarization signal and the seventh polarization signal in a direction toward the second power detection port, wherein the polarization processing apparatus is further configured to transmit the seventh polarization signal in a direction away from the second power detection port, wherein the optical power detector is further configured to detect, using the second power detection port, the fourth output power, wherein the third direction is perpendicular to a propagation direction of the first optical signal, wherein the fourth direction is perpendicular to the propagation direction, wherein the third direction and the fourth direction are switching directions, wherein each of the switching directions is perpendicular to a dispersion direction, and wherein the dispersion direction is an arrangement direction of a third light spot formed on the switching engine by optical signals with different wavelengths in an eighth polarization signal.

18. The detection system of claim 13, wherein the optical device comprises a switching engine and a power detection port, wherein the second polarization signal forms a first light spot on the switching engine, wherein the third polarization signal forms a second light spot on the switching engine, wherein the first light spot and the second light spot do not coincide, wherein dispersion directions of the first light spot and the second light spot are the same, wherein the controller is further configured to load, using the switching engine, first phase information for a first target region in which each first light spot is located in a first direction and third phase information for the first target region in a second direction to a fourth polarization signal corresponding to the first target region to transmit a third signal with the energy proportion in the fourth polarization signal to the power detection port, wherein the optical power detector is further configured to detect, using the power detection port, a third output power of the fourth polarization signal, wherein the controller is further configured to load, using the switching engine, second phase information for a second target region in which each second light spot is located in a third direction and fourth phase information for the second target region in a fourth direction to a fifth polarization signal corresponding to the second target region to transmit a fourth signal with the energy proportion in the fifth polarization signal to the power detection port, wherein the optical power detector is further configured to detect, using the power detection port, a fourth output power of the fifth polarization signal, wherein the first direction, the second direction, the third direction, and the fourth direction are all the same and are all switching directions, and wherein each of the switching directions is perpendicular to a propagation direction of the first optical signal and is perpendicular to the dispersion directions.

19. The detection system of claim 18, further comprising a first power detection port and a second power detection port, wherein the controller is further configured to load, using the switching engine, the first phase information for the first target region and the third phase information for the first target region to the fourth polarization signal to transmit the third signal to the first power detection port, wherein the optical power detector is further configured to detect, using the first power detection port, the third output power, wherein the controller is further configured to load, using the switching engine, the second phase information for the second target region and the fourth phase information for the second target region to the fifth polarization signal to transmit the fourth signal to the second power detection port, and wherein the optical power detector is further configured to detect, using the second power detection port, the fourth output power.

20. The detection system of claim 13, wherein the optical power satisfying the power constraint is one of a maximum output power, a minimum output power, an average value of output powers, or a weighted average value of output powers within the first duration, or wherein optical powers, in the two groups of optical powers, that satisfy the power constraint comprise probabilities of a first probability and are located in a same location in probability distribution curves corresponding to the two groups of optical powers, and wherein each of the probability distribution curves reflects occurrence probabilities of different optical powers.

21. The detection system of claim 13, further comprising a group of target optical powers that comprises the first target power and the second target power, wherein the controller is further configured to determine an absolute value of a difference between the first target power and the second target power as the PDL.

* * * * *